United States Patent [19]

Becker

[11] Patent Number: 5,052,097
[45] Date of Patent: Oct. 1, 1991

[54] METHOD AND APPARATUS FOR FORMING HOLES IN WOOD BOARD OR THE LIKE

[75] Inventor: Mark H. Becker, Vista, Calif.

[73] Assignee: Doorway Mfg. Co., Vista, Calif.

[21] Appl. No.: 476,177

[22] Filed: Feb. 7, 1990

[51] Int. Cl.$^5$ ........................ B27C 9/04; B65G 17/08
[52] U.S. Cl. ...................... 29/563; 29/558; 83/423; 144/3 R; 144/365; 144/367; 408/30; 408/39; 408/70
[58] Field of Search .............. 29/33 D, 563, 558; 83/133, 618, 620, 423, 23; 409/225; 144/3 R, 3 E, 93 R, 353, 365, 367; 198/345.1, 345.2, 345.3, 456; 408/1 R, 30, 39, 44, 70

[56] References Cited

U.S. PATENT DOCUMENTS

| | | | |
|---|---|---|---|
| 1,318,023 | 10/1919 | Stevenson | 83/133 |
| 3,547,171 | 12/1970 | Jacumin | 144/325 |
| 3,670,420 | 6/1972 | Kiewicz | 33/174 L |
| 3,670,421 | 6/1972 | Kiewicz | 33/174 L |
| 3,918,825 | 11/1975 | Alberti | 408/43 |
| 3,979,985 | 9/1976 | Daniels | 83/410 |
| 4,090,287 | 5/1978 | Selander | 20/568 |
| 4,132,253 | 1/1979 | Mills | 144/133 |
| 4,243,081 | 1/1981 | Pritelli | 144/3 A |
| 4,477,976 | 10/1984 | Suzuki | 33/169 R |
| 4,516,326 | 5/1985 | Calcagno | 33/169 B |
| 4,631,831 | 12/1986 | Bacher | 33/169 B |
| 4,682,401 | 7/1987 | Tadashi | 29/568 |
| 4,691,684 | 9/1987 | Negron-Crespo | 125/3 |
| 4,694,871 | 9/1987 | Jenkner | 144/35 R |
| 4,753,555 | 6/1988 | Thompson | 408/1 R |

Primary Examiner—Z. R. Bilinsky
Attorney, Agent, or Firm—Dressler, Goldsmith, Shore, Sutker & Milnamow, Ltd.

[57] ABSTRACT

An improved method for forming holes in a board and an improved apparatus for practicing the improved method. Two or three linear arrays of holes are punched through the board, through its expansive faces, in a punching zone. A punch and a die coacting with the punch are used to punch each punched hole, in a press comprising a pressing ram and a pressing bed, upon relative movement of the pressing ram and the pressing bed toward each other. The board is registered in the pressing zone, in a predetermined position, by engaging its opposite edges and its opposite ends. Plural holes are drilled into each end of the board in a drilling zone. A physical measurement is conducted in an inspecting zone, by inserting a probe into each drilled hole, so as to determine whether such drilled hole has been drilled to a minimum depth. These punching, drilling, and inspecting steps of the improved method are carried out in a series of automated operations of the improved apparatus.

26 Claims, 17 Drawing Sheets

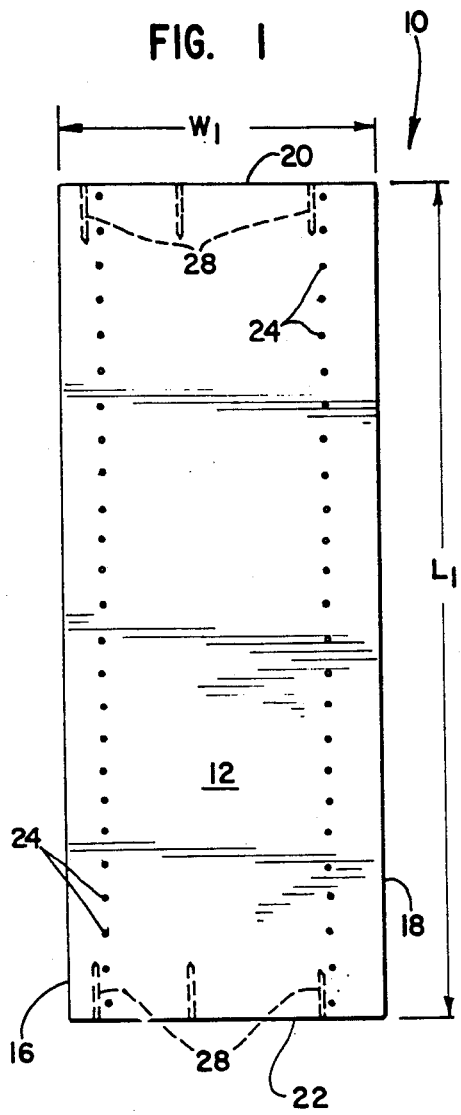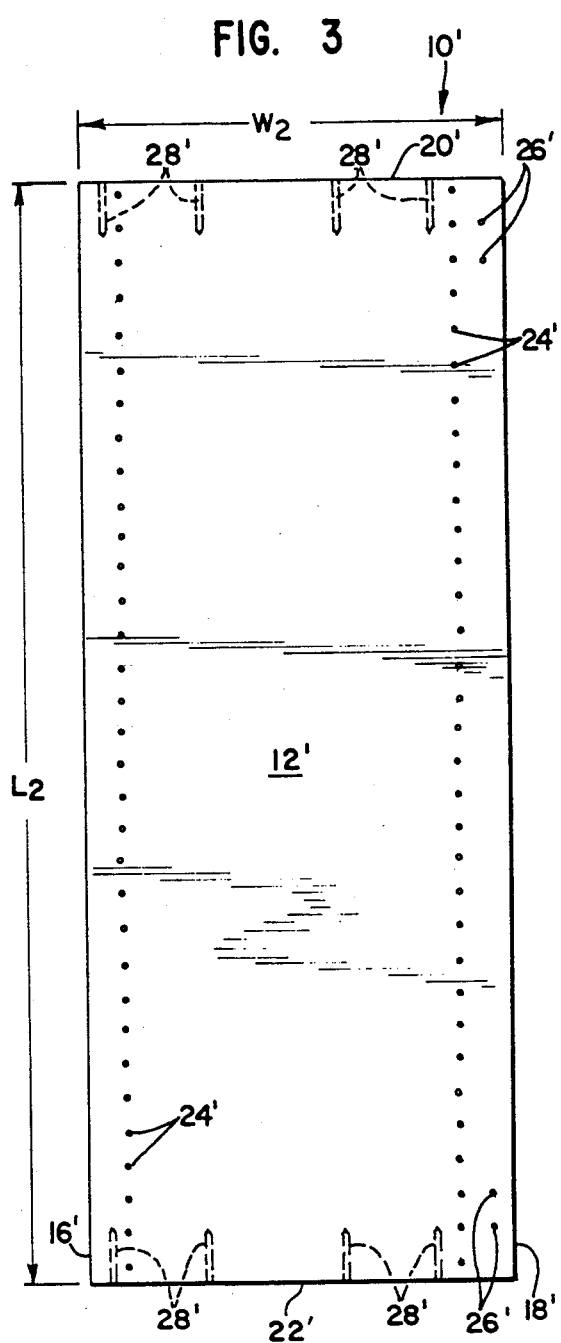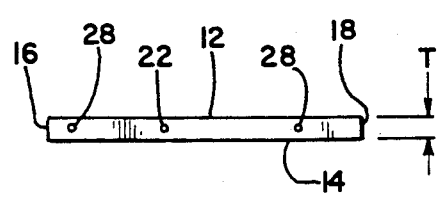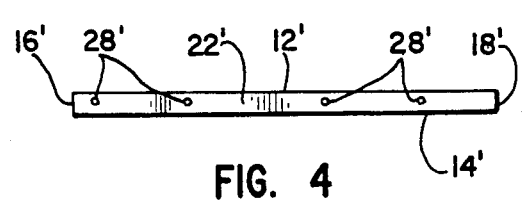

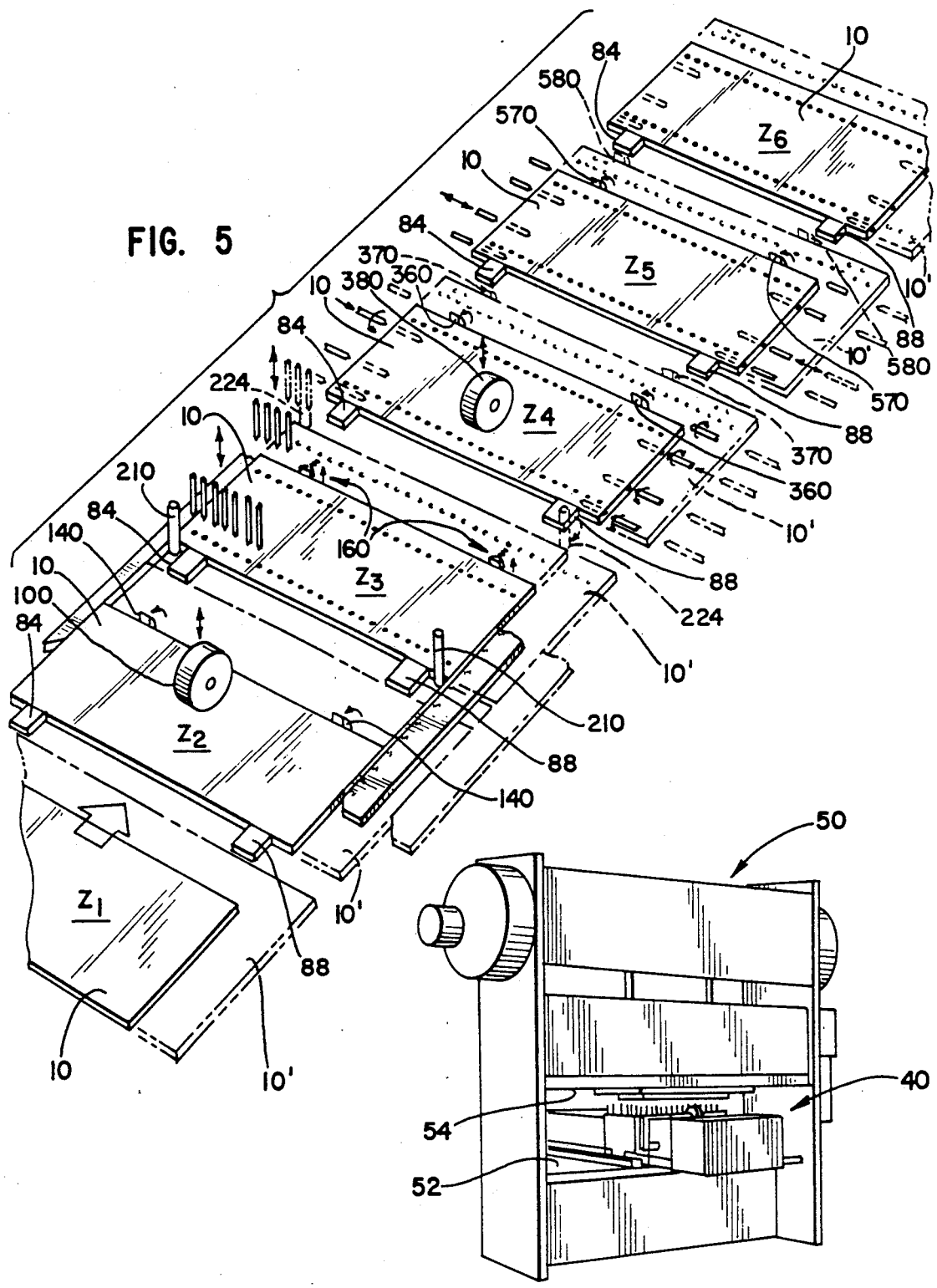

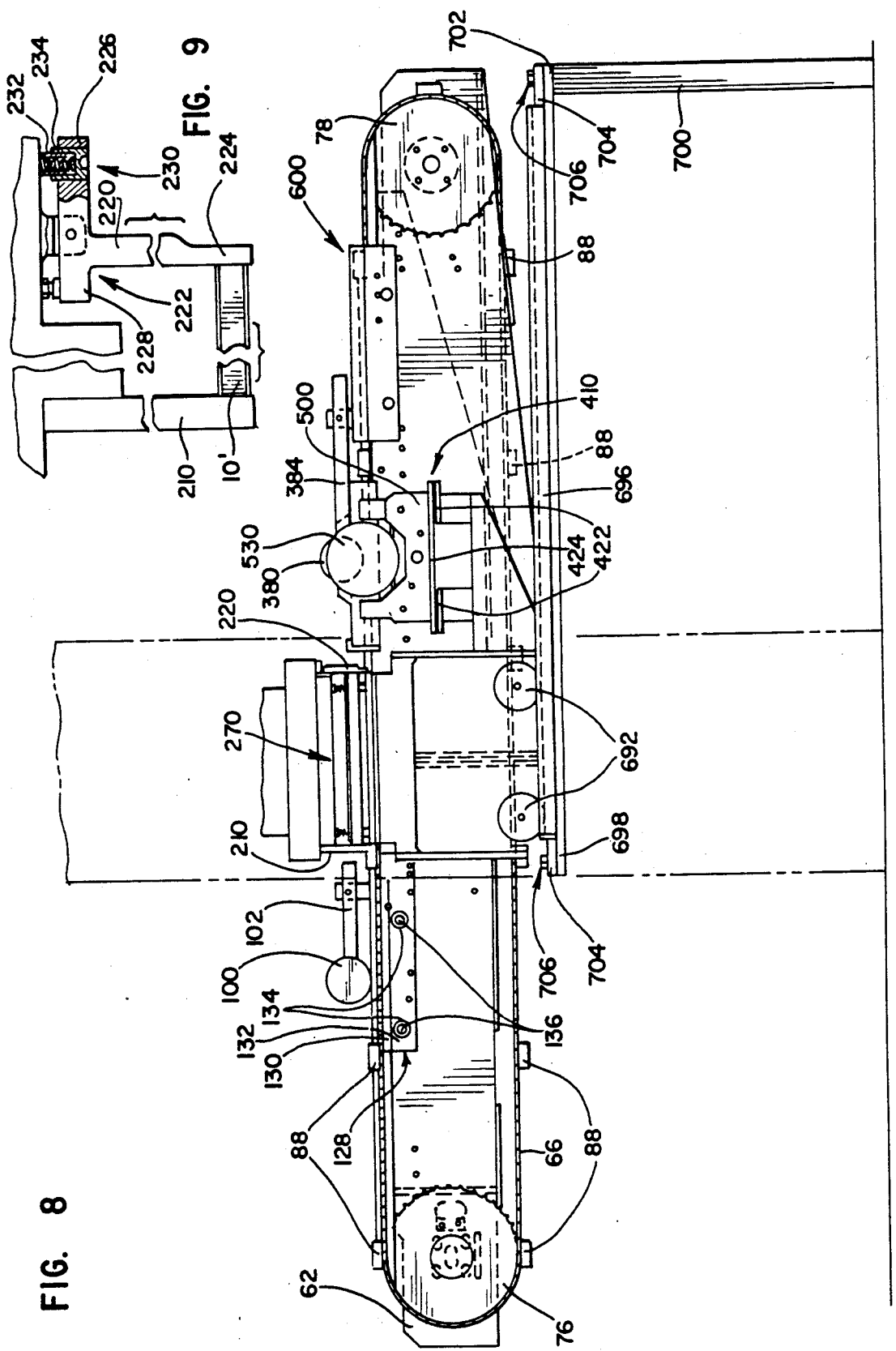

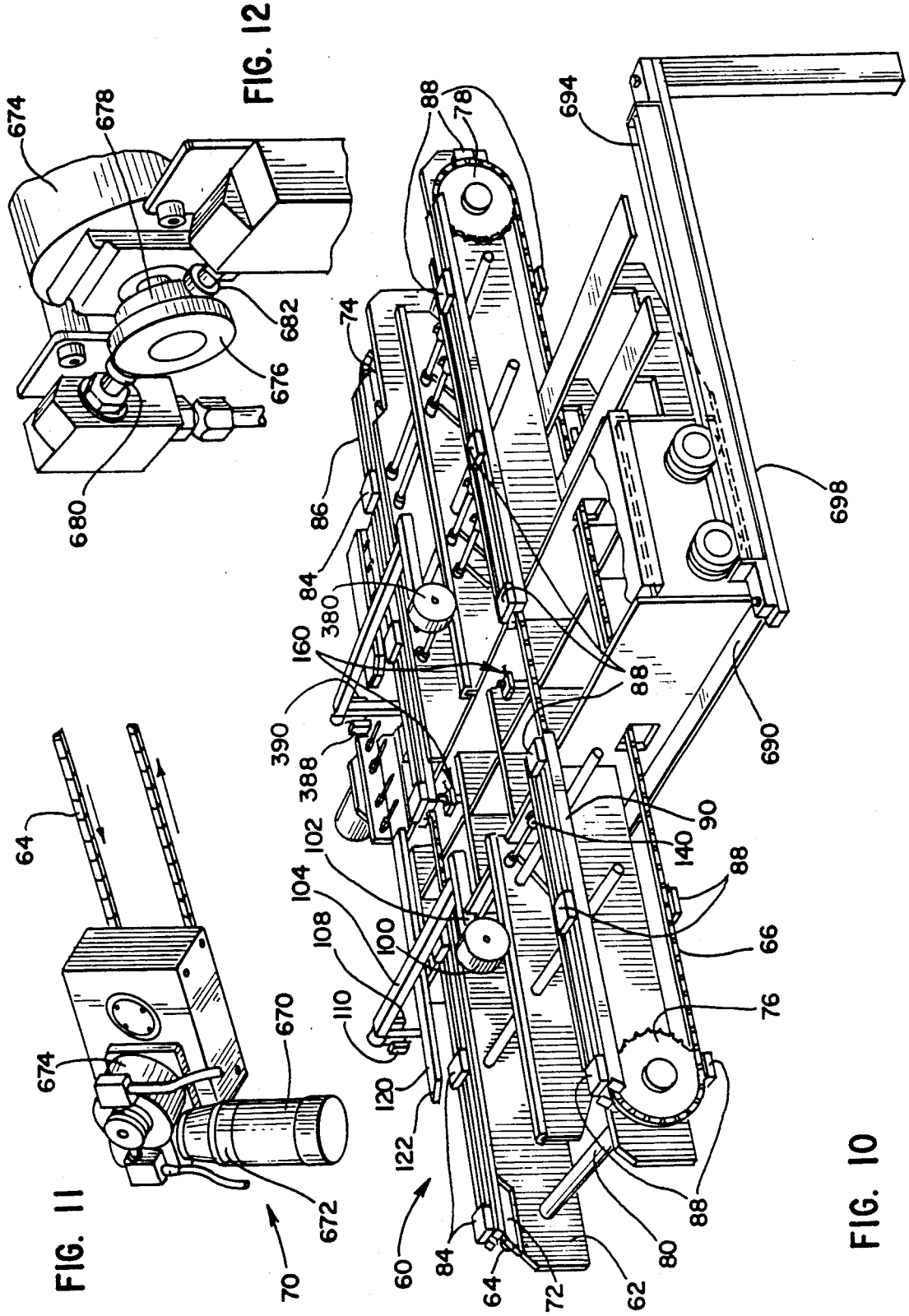

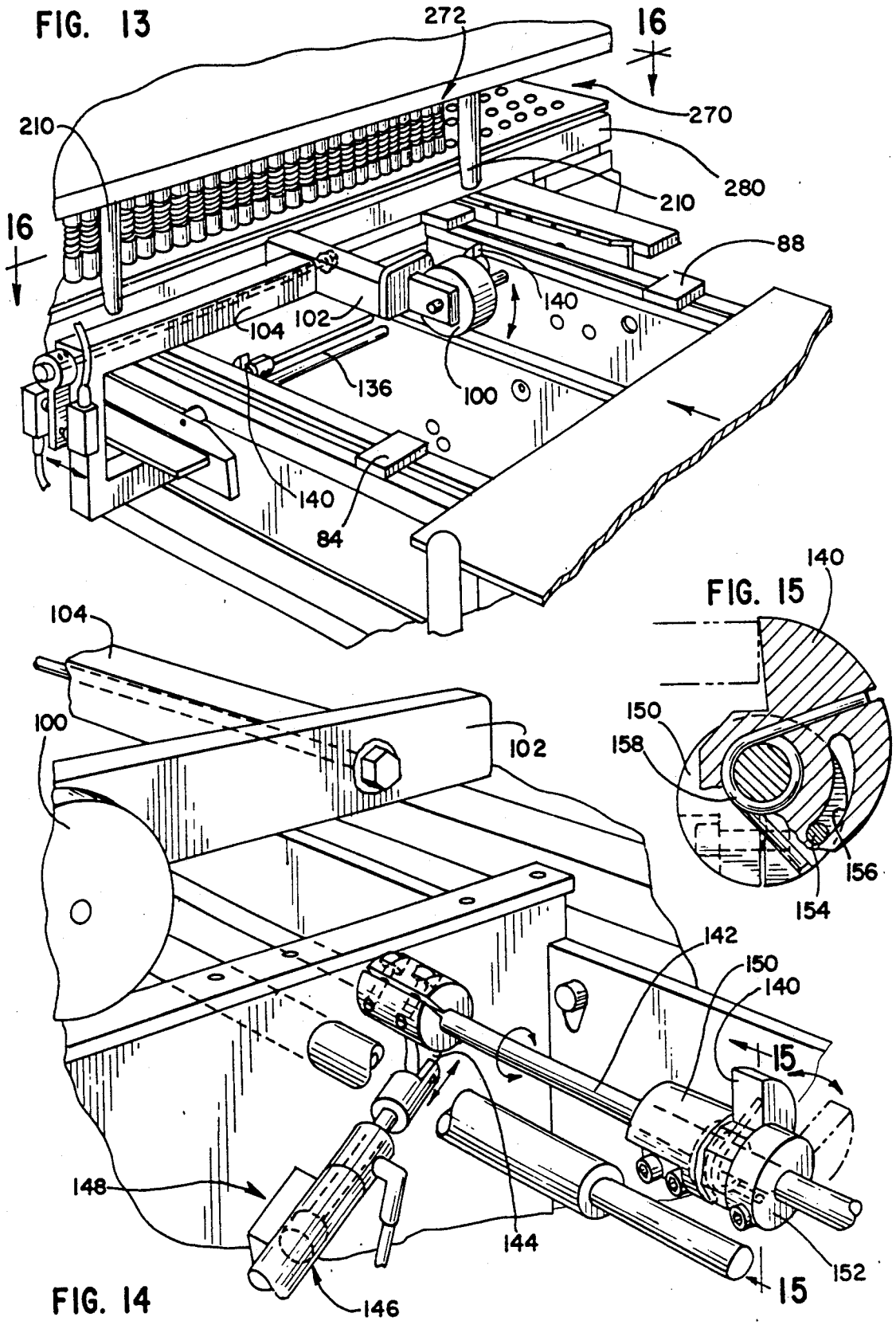

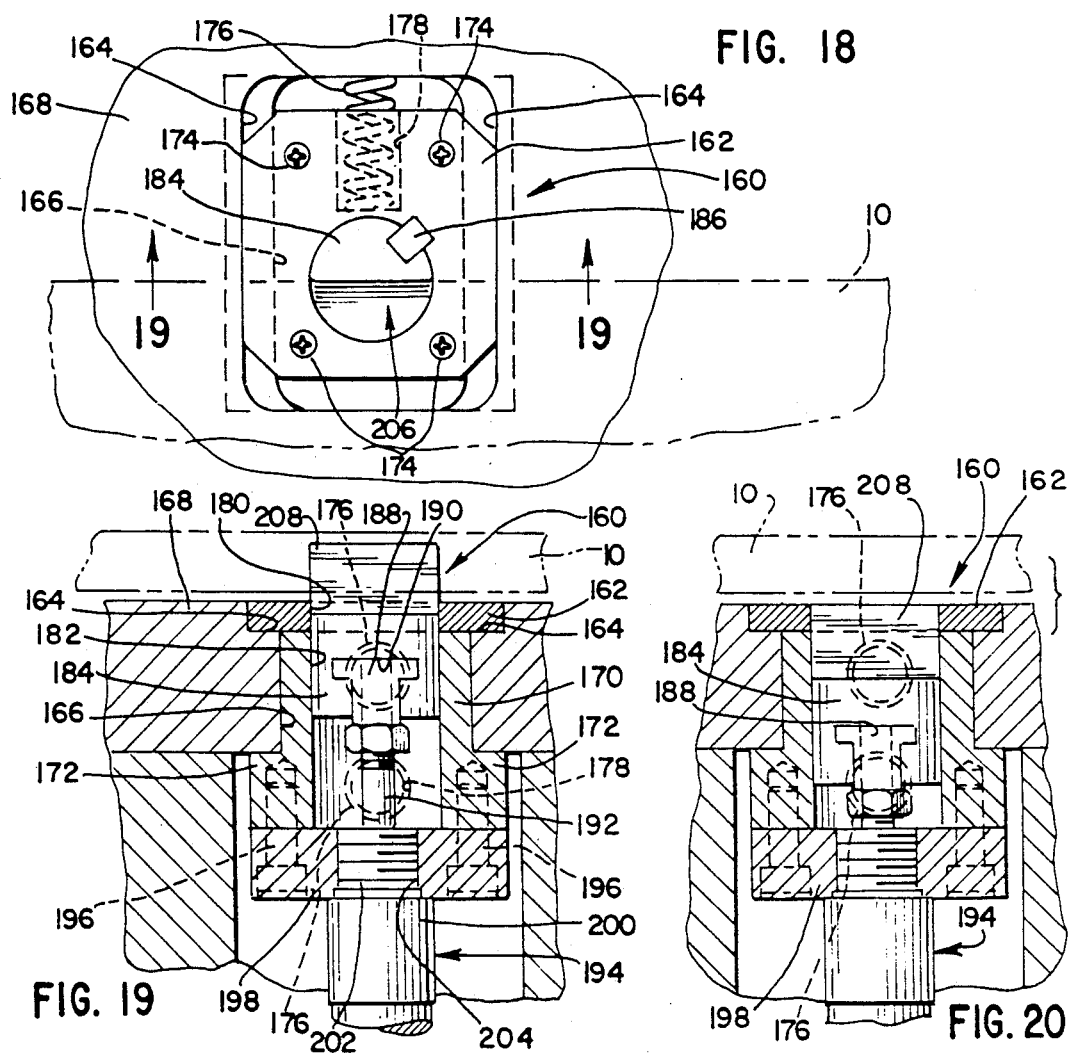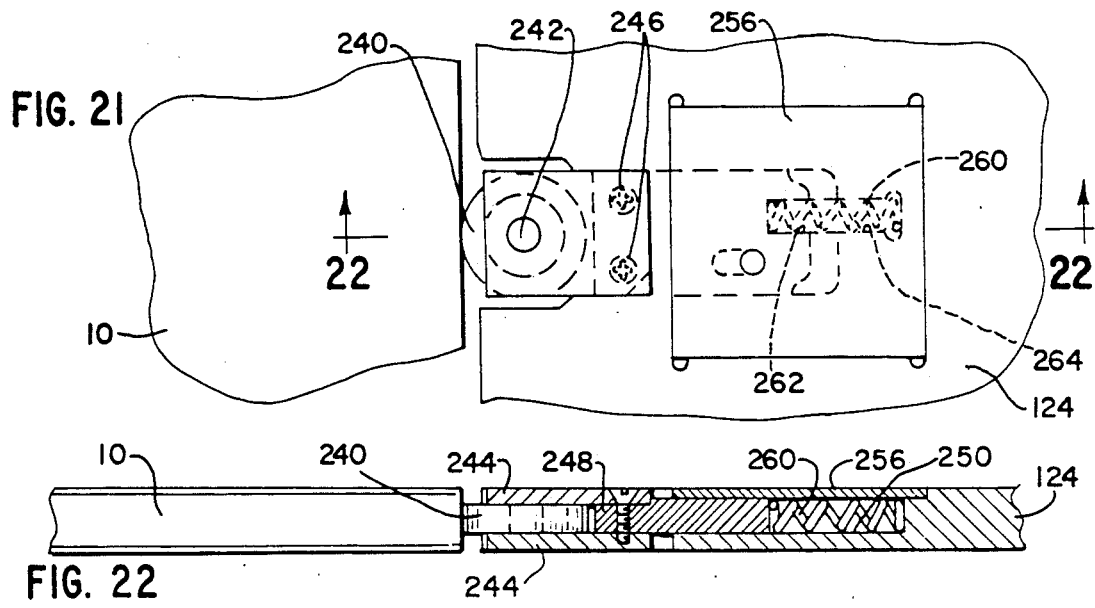

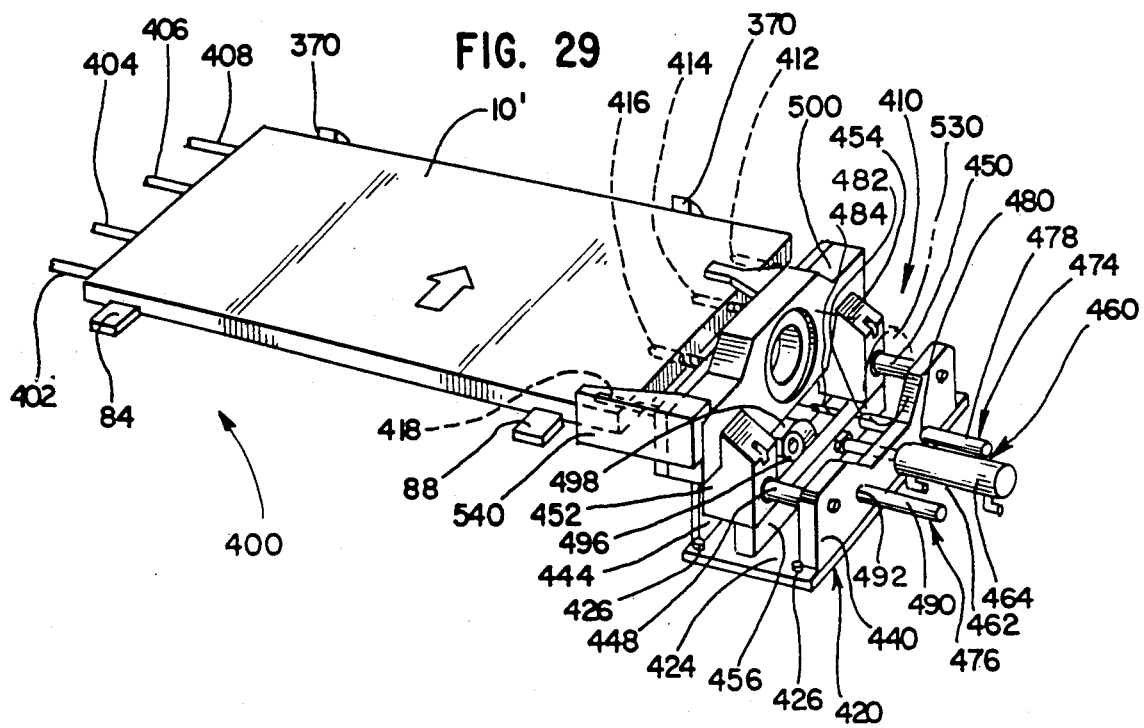
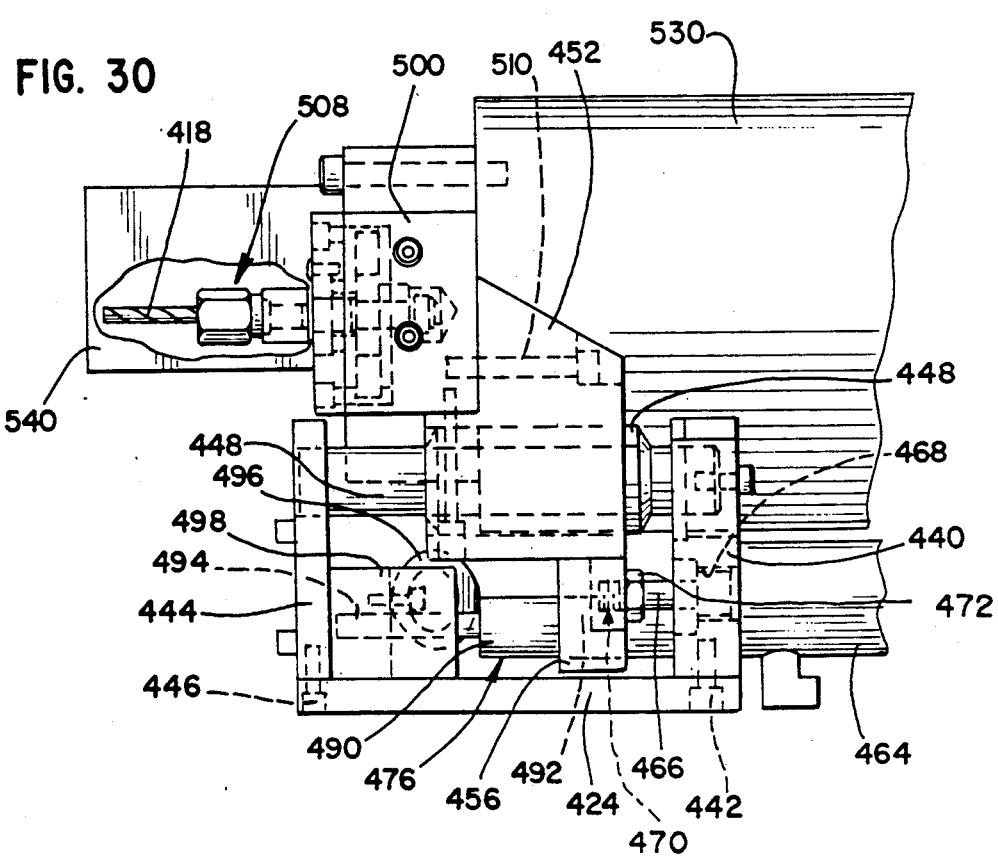

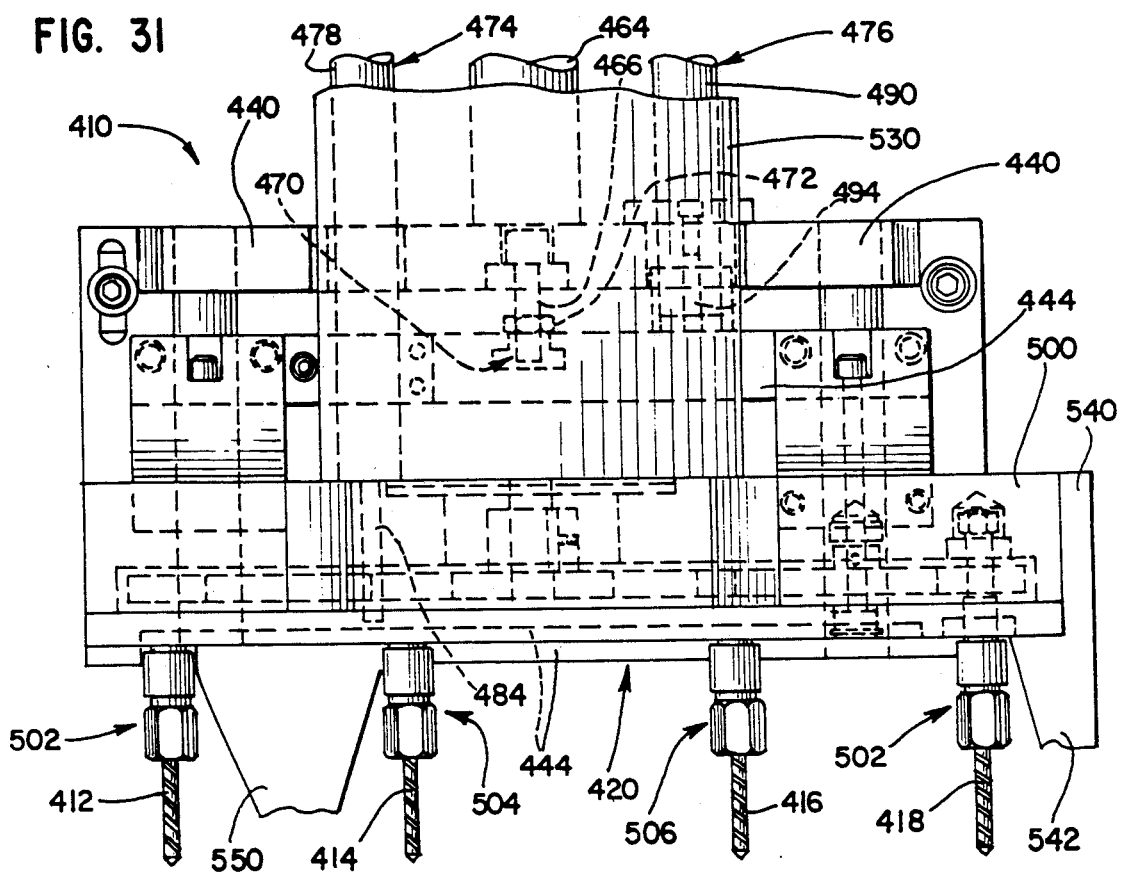

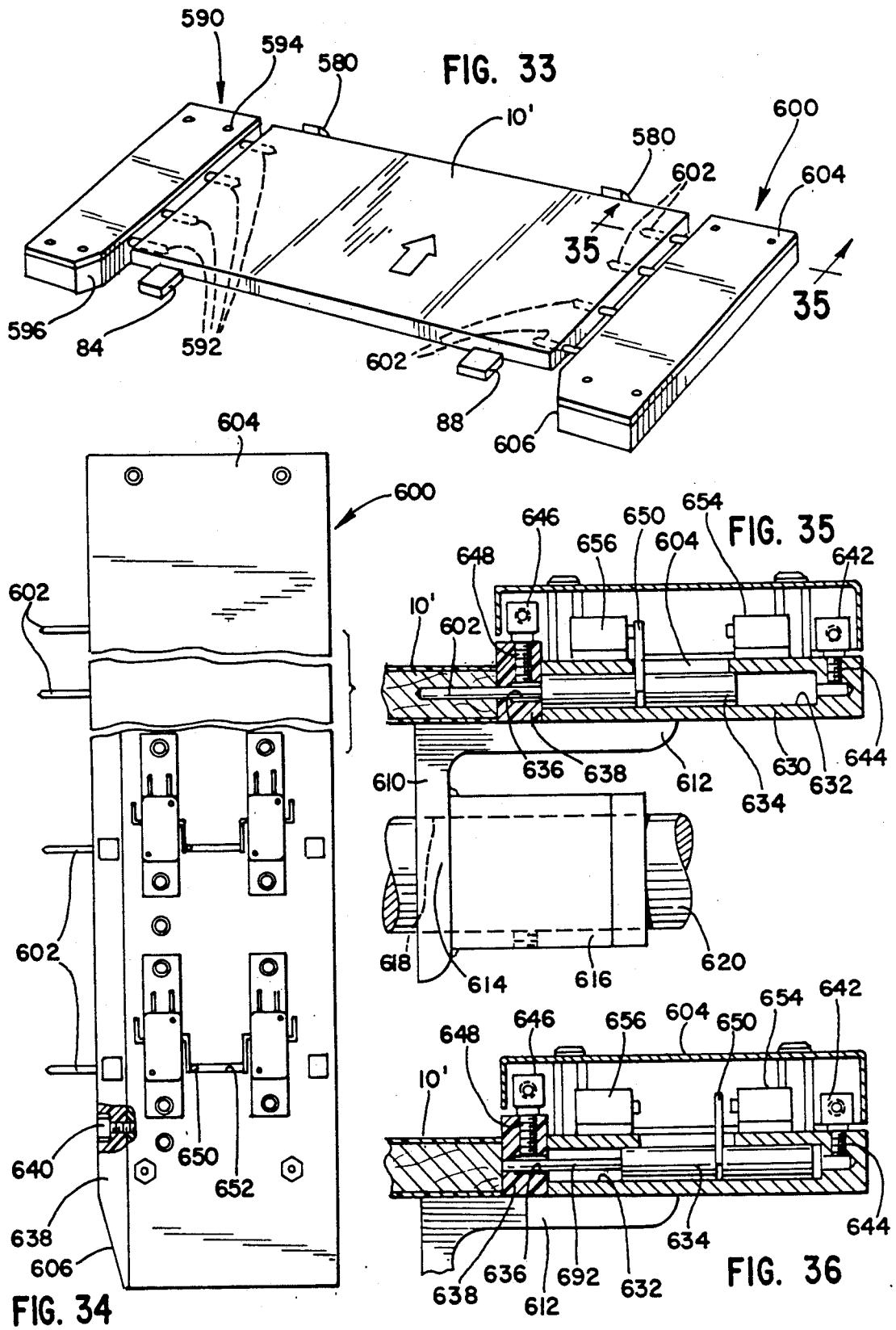

METHOD AND APPARATUS FOR FORMING HOLES IN WOOD BOARD OR THE LIKE

TECHNICAL FIELD OF THE INVENTION

This invention pertains to a method and apparatus for forming holes in a board made predominately of wood, wood byproducts, or like material, whereby one or more holes are punched through the board, one or more holes may be also drilled into one or both of its opposite ends, and the drilled holes may be then inspected.

BACKGROUND OF THE INVENTION

Boards made predominately of wood, wood byproducts, such as presswood or particle board, or like material are used in modular shelving systems, closet-organizing systems, and like constructions. Typically, each expansive face of such a board is covered with a protective veneer. Commonly, a decorative, polymeric veneer, such as a melamine veneer, is used. Some or all of its edges may be similarly covered.

Typically, multiple holes are drilled through such a board, each hole being drilled through both of its expansive faces. Such holes are used to receive shelf-supporting hardware or other hardware. It has been known, heretofore, to use ganged drilling bits to drill multiple holes through such a board.

Alberti U.S. Pat. No. 3,918,825 discloses an apparatus comprising ganged drilling bits, which are described as useful to drill multiple holes through wooden boards, planks, and panels.

It has been known, moreover, to use ganged drilling bits to drill two or more holes into each end of such a board. Such holes are used to receive threaded fasteners or other hardware.

Drilling bits, as mentioned above, are subject to wear and breakage. Damage to their tips can occur but may be quite difficult to detect. Replacement of such bits can be time-consuming and difficult. Drilling bits tend to produce excessive dust. Moreover, drilling bits tend to wander whereby it is difficult to control hole location.

Furthermore, drilling bits tend to cause visible damage at the veneered faces of such a board at margins of the drilled holes, particularly where such bits exit, and particularly if a polymeric veneer is used. It is known to use backing boards to reduce such damage.

Such boards with multiple holes drilled therethrough have been perceived as useful principally if not exclusively in modular shelving systems, closet-organizing systems, and like constructions for closets, basements, garages, and other areas where minor flaws on the veneered faces of such boards are not bothersome.

There has been a need, to which this invention is addressed, for a better, automated system for providing holes in such a board, particularly but not exclusively for providing multiple holes through such a board.

SUMMARY OF THE INVENTION

This invention provides an improved method comprising automated steps and an improved apparatus, by which the improved method can be effectively practiced by a series of automated operations, for forming holes in a board made predominately of wood, wood byproducts, such as presswood or particle board, or like material. Each board can be a relatively narrow or relatively wide board of any length within a range of possible lengths.

Each board has two expansive faces, two transverse edges, and two opposite ends. A polymeric veneer, such as a melamine veneer, may be optionally provided on one or both of the expansive faces. Such a veneer may be also provided on one or both of the transverse edges and on one or both of the opposite ends.

Minimally, one or more holes are punched through each board, each hole extending through its expansive faces. Preferably, two or three linear arrays of such holes are punched through each board, each hole extending in a direction perpendicular to the expansive faces of the board. Preferably, the linear arrays are parallel to each other and to the transverse edges of the board. More such holes may be also punched through each board.

Moreover, one or more holes may be also drilled into one or both of the opposite ends of each board. Each hole drilled into one of the opposite ends of each board extends in a direction parallel to its expansive faces.

Broadly, therefore, the improved method comprises automated steps of conveying each board into a punching zone, in a forward direction with its transverse edges constituting a leading edge and a trailing edge respectively, and punching one or more holes through such board in the punching zone. Each punched hole is punched through the expansive faces of such board and extends in a direction perpendicular to such faces.

Preferably, each punched hole is punched by a punch defining an axis and a die coacting with the punch. The punch and die used to punch each punched hole are mounted in a press, between a pressing ram and a pressing bed, so that relative movement of the pressing ram and the pressing bed toward each other causes such punch to be axially pressed toward the die coacting with such punch. Thus, the punching step is effected by relative movement of the pressing ram and the pressing bed toward each other.

Also, the improved method may comprise, as an automated step between the conveying and punching steps, a step of registering each board in a predetermined position in the punching zone. Preferably, each board is registered in a longitudinal sense and in a transverse sense, by engaging its transverse edges and its opposite ends.

Moreover, the improved method may comprise automated steps of conveying each board from the punching zone into a drilling zone and drilling at least one hole into such board, in the drilling zone. Thus, at least one hole is drilled into at least one of the opposite ends of such board. Preferably, two or four holes are drilled into each of its opposite ends. Each drilled hole extends in a direction parallel to the expansive faces of such board.

Furthermore, the improved method may comprise automated steps of conveying each board from the drilling zone into an inspecting zone and conducting a physical measurement of each drilled hole, in the inspecting zone, so as to determine whether such drilled hole has been drilled to a minimum depth. The step of conducting a physical measurement, in a preferred mode, comprises inserting a probe into each drilled hole.

As discussed above, this invention also provides an improved apparatus, by which the improved method can be effectively practiced by a series of automated operations. Broadly, the improved apparatus comprises respective means for carrying out the respective steps of the improved method, as described above. The improved apparatus, in a preferred embodiment, can accommodate a relatively wide board or a relatively narrow board.

In the preferred embodiment, the improved apparatus is combined with a press comprising a pressing ram and a pressing bed, as arranged for relative movement of the pressing ram and the pressing bed toward each other. In the press, a punch and a die coacting with the punch are used to punch each punched hole, as described above.

Also, in the preferred embodiment, a conveyor is provided for conveying each board at successive intervals into a punching zone, from the punching zone into a drilling zone, and from the drilling zone into an inspecting zone, in a forward direction with its transverse edges constituting a leading edge and a trailing edge respectively, so that its expansive faces are disposed horizontally.

Preferably, the conveyor comprises a pair of flexible elements arranged to be selectively driven in endless loops and to be selectively stopped, such as a pair of endless chains. Preferably, the conveyor comprises a pair of board-engaging pads, each pad being carried by one of the pair of flexible elements and being arranged to engage each board at its trailing edge so as to convey such board in the forward direction when the flexible elements are driven.

Moreover, in the preferred embodiment, a pair of board-engaging arms mounted rigidly to the pressing ram are provided, which are used for registering each relatively wide or relatively narrow board in a longitudinal sense. Likewise, in the preferred embodiment, a pair of board-engaging arms mounted pivotally to the pressing ram are provided, which are used with the rigidly mounted arms for registering each relatively wide board in a longitudinal sense.

The rigidly mounted arms are adapted to engage the trailing edge of each relatively wide or relatively narrow board upon relative movement of the pressing ram and the pressing bed toward each other. The pivotally mounted arms are adapted to engage the leading edge of each relatively wide board upon relative movement of the pressing ram and the pressing bed toward each other so as to urge the leading edge of such board against the pair of rigidly mounted arms.

Furthermore, in the preferred embodiment, a pair of detents are provided, which are used with the rigidly mounted arms to register each relatively narrow board in a longitudinal sense, in a predetermined position in the punching zone. Each detent is movable between an operative position and an inoperative position.

In the operative position, each detent bears against the leading edge of each relatively narrow board so as to urge the trailing edge of such board backwardly, against the pair of rigidly mounted arms. In the inoperative position, each detent is displaced so as not to interfere with each relatively wide or relatively narrow board when such board is conveyed from the punching zone.

These and other objects, features, and advantages of this invention are evident from the following description of a preferred mode for carrying out the improved method and of a preferred embodiment of the improved apparatus, with reference to the accompanying drawings.

BRIEF DESCRIPTION OF THE DRAWINGS

FIG. 1 is a plan view of a relatively narrow, relatively short board formed with holes punched through its expansive faces, and with holes drilled into its opposite ends, such punched and drilled holes having been formed by an improved method according to this invention.

FIG. 2 is an end view of the board shown in FIG. 1.

FIG. 3 is a plan view of a relatively wide, relatively long board formed similarly with punched holes and drilled holes.

FIG. 4 is an end view of the board shown in FIG. 2.

FIG. 5 is a diagrammatic, perspective view illustrating a series of automated steps contemplated by the improved method.

FIG. 6 is an overall, perspective view of an improved apparatus for practicing the improved method, in a preferred embodiment combined with a press comprising a pressing ram and a pressing bed.

FIG. 8 is an elevational view of the same apparatus.

FIG. 9 is an enlarged, fragmentary, elevational detail of certain elements shown in FIG. 8.

FIG. 10 is an overall, perspective view of the same apparatus, except for some elements that have been removed.

FIGS. 11 and 12 respectively are enlarged, fragmentary, perspective details of certain elements of the same apparatus.

FIG. 13 is a fragmentary, perspective view of the same apparatus as taken at its inlet end.

FIG. 14 is an enlarged, fragmentary, perspective view of the same apparatus, as taken from a different vantage.

FIG. 15 is a further enlarged, cross-sectional view taken along line 15—15 in FIG. 14, in a direction indicated by arrows.

FIG. 16 shows a relatively narrow, relatively short board being registered in a punching zone.

FIG. 18 is an enlarged, plan view of an exemplary one of two board-registering means shown in FIG. 16.

FIG. 19 is a fragmentary, sectional view taken along line 19—19 of FIG. 18, in a direction indicated by arrows. FIG. 20 is a similar view showing the board-registering means of FIGS. 18 and 19 in a changed position.

FIG. 21 is an enlarged, plan view of an exemplary one of three board-registering means shown in FIGS. 16 and 17.

FIG. 22 is a fragmentary, cross-sectional view taken along line 22—22 of FIG. 21, in a direction indicated by arrows.

FIG. 29 is a fragmentary, perspective detail showing means provided in the same apparatus for drilling end holes into such a board. A motor of the drilling means is shown in phantom lines FIGS. 30, 31, and 32 respectively are end elevation, top plan, and side elevation views of the drilling means shown in FIG. 29. The motor of the drilling means is shown in full lines.

FIG. 33 is a fragmentary, perspective detail showing means provided in the same apparatus for conducting a physical measurement of the holes drilled into such a board, by inserting a probe into each drilled hole.

FIG. 34 is a plan view of one of the means shown in FIG. 33 with a cover partly broken away so as to reveal interior details.

FIGS. 35 and 36 are cross-sectional views taken along line 35—35 in FIG. 33, in a direction indicated by arrows, to show operation of different limit switches respectively when an exemplary probe has been inserted into a drilled hole to at least a minimum depth and when such probe cannot be even partially inserted into such a hole.

DETAILED DESCRIPTION OF PREFERRED EMBODIMENT

Figure 7:
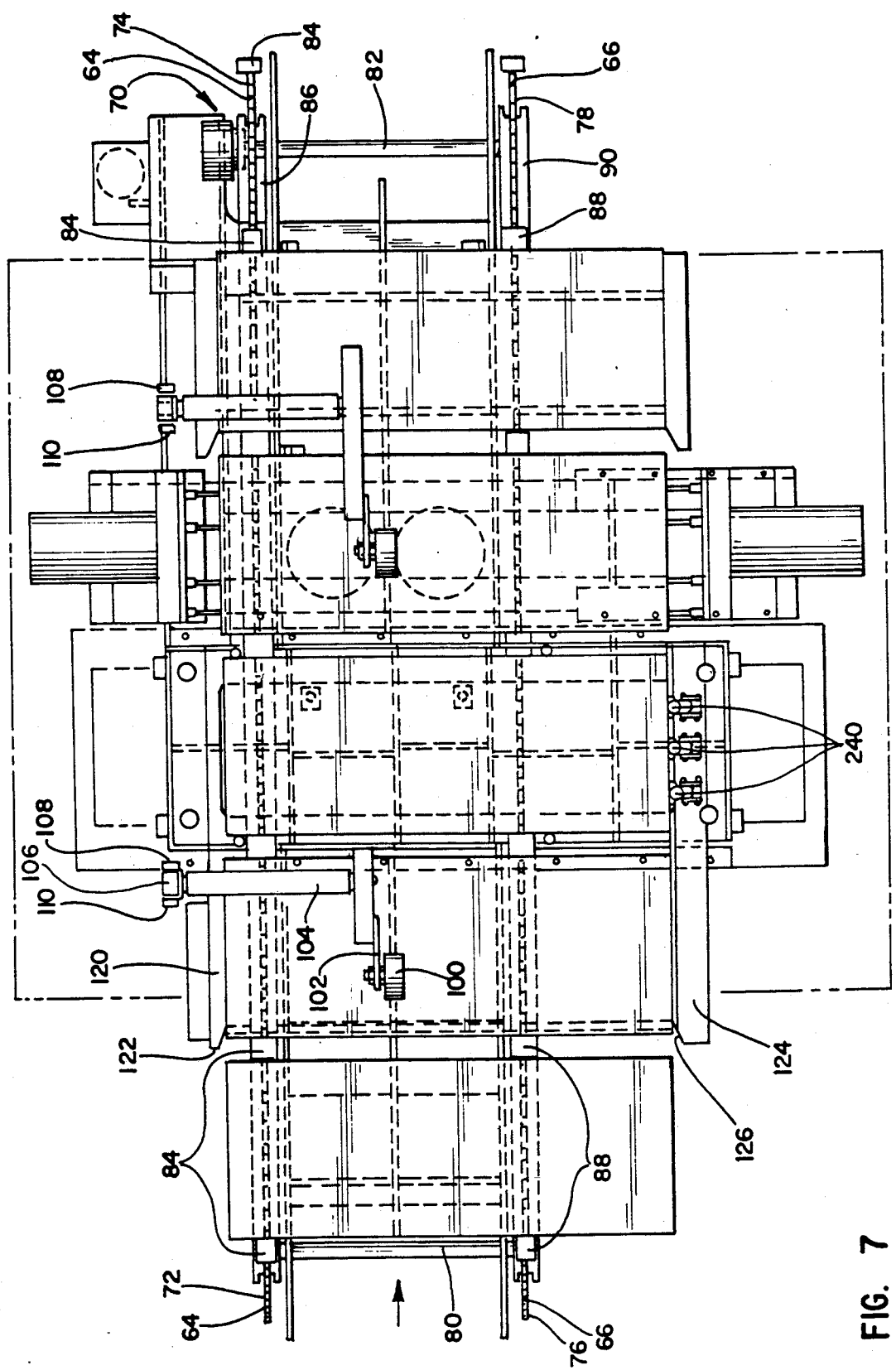
FIG. 7 is a plan view of the apparatus shown in FIG. 6.
Figure 16:
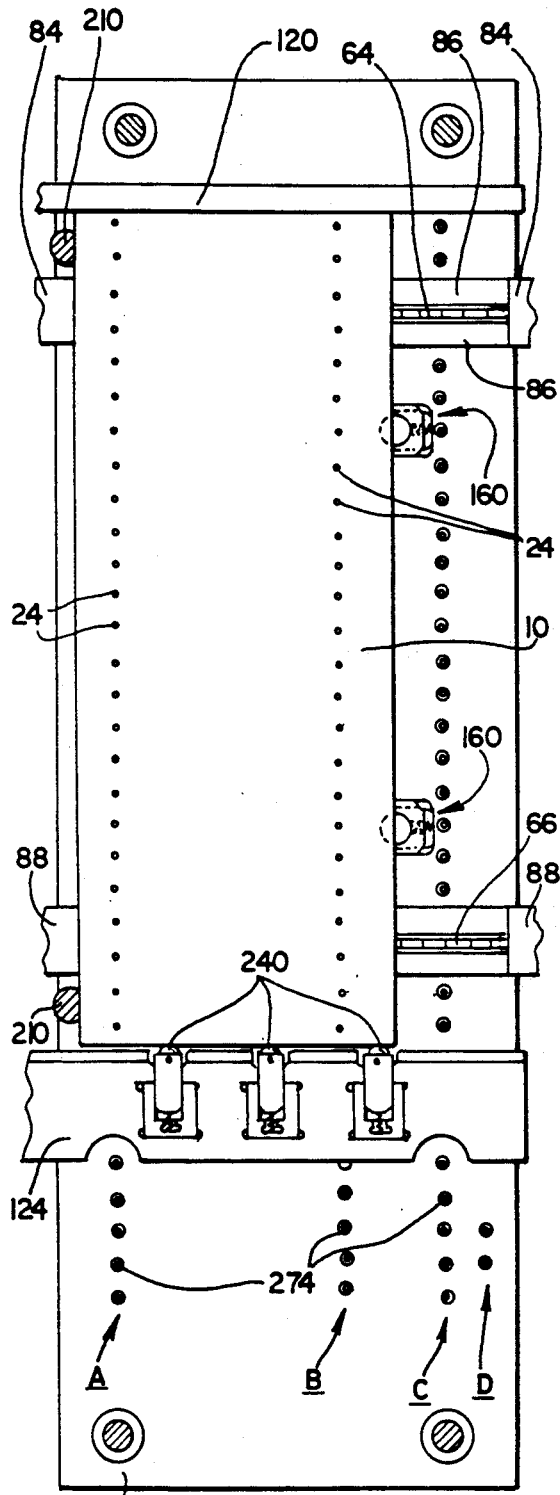
FIG. 16 is a fragmentary, sectional view taken along line 16—16 of FIG. 13, in a direction indicated by arrows
Figure 17:
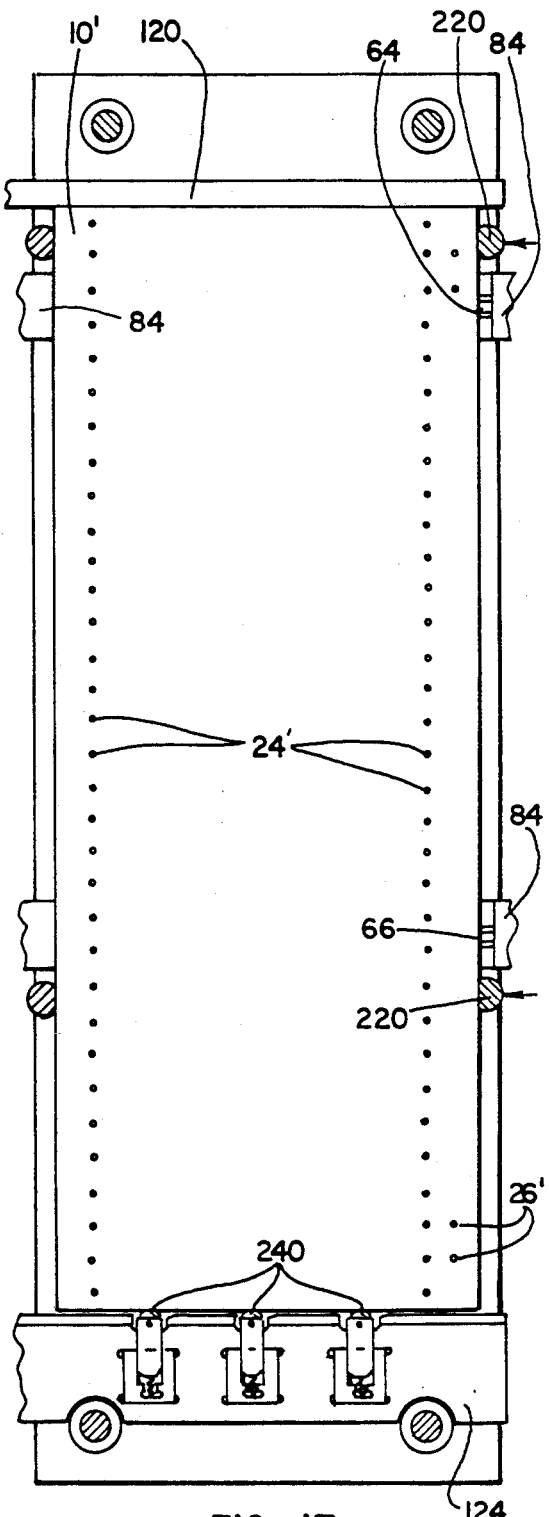
FIG. 17 is a similar view showing a relatively wide, relatively long board being registered in the punching zone.

While this invention is susceptible to being embodied in various forms, there is shown in the drawings and will be hereinafter described a preferred embodiment, with the understanding that the present disclosure is to be considered as an exemplification of this invention and is not intended to limit this invention to any particular embodiment.

General Overview

A typical relatively narrow, relatively short board 10 is shown in FIGS. 1 and 2, as formed with holes by the improved method provided by this invention. The board 10 has two expansive faces 12, 14, which are rectangular, two transverse edges 16, 18, and two opposite ends 20, 22. The board 10 is made predominately of wood, wood byproducts, such as presswood or particle board, which is preferred, or like material. Preferably, the board 10 is covered on each of its expansive faces 12, 14, on each of its transverse edges 16, 18, and on each of its opposite ends 20, 22, with a polymeric veneer, such as a melamine veneer, which is preferred.

A typical relatively wide, relatively long board 10' is shown in FIGS. 3 and 4, as formed with holes by the same method. The board 10' is covered on each of its expansive faces 12', 14', on each of its transverse edges 16', 18', and on each of its opposite Exemplary dimensions for each board 10 are a length ($L_1$) of about 32 inches, a width ($W_1$) of about 12 inches, and a thickness ($T_1$) of about 0.5 inch, 0.62 inch, or 0.75 inch, a thickness ($T_1$) of about 0.5 inch being preferred. Exemplary dimensions for each board 10' are a length ($L_2$) of about 42 inches, a width ($W_2$) of about 16 inches, and a thickness ($T_2$) of about 0.5 inch. The length of each board 10 (or 10') can be varied so as to equal any length within a range of possible lengths, e.g., a range from about 32 inches to about 42 inches.

Each board 10 is formed, as shown, with two linear arrays of regularly spaced holes 24 (with 25 such holes 24 in each such array), which are punched through such board 10. Each punched hole 24 is punched through the expansive faces 12, 14, and extends in a direction perpendicular to the expansive faces 12, 14. The linear arrays of such holes 24 are parallel to each other and to the transverse edges 16, 18, as shown. Preferably, the punched holes 24 in each such array are spaced about 32 mm from center to center so as to conform to industry practice.

Each board 10' is formed, as shown, with two similar but longer arrays of punched holes 24' (with 34 such holes 24' in each such array) and with two pairs of punched holes 26' aligned with one another in a linear array parallel with the arrays of punched holes 24'. Each punched hole 24', 26', is punched through the expansive faces 14', and extends in a direction perpendicular to the expansive faces 12', 14'. The linear arrays of such holes 24', 26' are parallel to each other and to the transverse edges 16', 18', as shown. Preferably, the punched holes 24', 26, in each such array are spaced about 32 mm (1.26 inches) from center to center so as to conform to industry practice.

Two blind holes 28 are drilled into each of the opposite ends 20, 22, of each board 10. Each hole drilled hole 28 extends in a direction parallel to the expansive faces 12, 14, of such board 10.

Four blind holes 28' are drilled into each of the opposite ends 20', 22', of each board 10'. Each drilled hole 28' extends in a direction perpendicular to the expansive faces 12', 14', of such board 10'.

Such punched and drilled holes are formed in a series of such boards 10 (or 10') by a series of automated steps according to this invention, as illustrated diagrammatically in FIG. 5. In FIG. 5, six such relatively narrow, relatively short boards 10 are shown in full lines and six such relatively wide, relatively long boards 10' are shown in phantom lines—respectively in a loading zone $Z_1$, in a sensing zone $Z_2$, in a punching zone $Z_3$, in a drilling zone $Z_4$, in an inspecting zone $Z_5$, and in an unloading zone.

At the loading zone $Z_1$, each board 10 (or 10') is loaded manually onto a conveyor to be later described. The conveyor is used to index each board 10 (or 10') remains for a timed interval (dwell) in each of the sensing, punching, drilling, and inspecting zones. Such a board of a given size may be present in each of the successive zones, so long as such boards of different size are not intermixed in a given run.

In the sensing zone $Z_2$, into which each board 10 (or 10') is conveyed from the loading zone $Z_1$, means to be later described are provided for sensing whether such board 10 (or 10') is present.

In the punching zone $Z_3$, into which each board 10 (or 10') is conveyed from the sensing zone $Z_2$, means to be later described are provided for registering such board 10 (or 10') in a longitudinal sense and in a transverse sense, in a predetermined position in the punching zone $Z_3$. Moreover, in the punching zone $Z_3$, means to be later described are provided for punching the holes 24 (or 24', 26') through such board 10 (or 10').

In the drilling zone $Z_4$, into which each board 10 (or 10') is conveyed from the punching zone $Z_3$, means to be later described are provided for sensing whether such board 10 (or 10') is present. Moreover, in the drilling zone $Z_4$, means to be later described are provided for drilling the plural holes 28 (or 28') into each of the opposite ends of such board 10 (or 10').

In the inspecting zone $Z_5$, into which each board 10 (or 10') is conveyed from the drilling zone $Z_4$, means to be later described are provided for conducting a physical measurement of each drilled hole 28 (or 28') so as to determine whether such drilled hole 28 (or 28') has been drilled to a minimum depth.

In the unloading zone $Z_6$, into which each board 10 (or 10') is conveyed from the inspecting zone $Z_5$, such board 10 (or 10') is unloaded manually.

Mechanical Features

The conveyor and other means noted above in a context of FIG. 5 are elements of an apparatus 40 constituting a preferred embodiment of this invention. The apparatus 40 can be easily set-up to accommodate, in a given run, a series of similar, relatively narrow boards, as exemplified by the boards 10, or a series of similar, relatively wide boards, as exemplified by the boards 10'. As shown in FIG. 6, the apparatus 40 is installed in a press 50 of a known type. Broadly, the press 50 comprises a pressing bed 52, a pressing ram 54, which is arranged to be downwardly driven toward the pressing bed 52 and to be upwardly retracted from the pressing bed 52, and mechanical means (not shown) for driving the pressing ram 54 downwardly and for retracting the pressing ram 54 upwardly.

A Niagra TM (Model PN 150-108-30) punch press is suitable for the press 50 and is available commercially from Niagara Machine and Tool Works, Buffalo, New York. Details of its construction and its operation are known and, except as explained below, do not have to be explained herein.

The conveyor noted above, hereinafter the conveyor 60, is mounted operatively on a framework 62 of the apparatus 40 and comprises a pair of endless chains 64, 66, which are driven by an indexing drive 70 to be later described.

The chain 64 is deployed around and coacts with a pair of sprocket wheels 72, 74, respectively at the inlet and outlet ends of the apparatus 40. The chain 66 is deployed around and coacts with a pair of sprocket wheels 76, 78, respectively at the inlet and outlet ends of the apparatus 40. The sprocket wheel 72 for the chain 64 and the sprocket wheel 76 for the chain 66 are mounted on a common shaft 80, which is journalled to the framework 62, so as to be conjointly driven. The sprocket wheel 74 for the chain 64 and the sprocket wheel 78 for the chain 66 are mounted on a common shaft 82, which is journalled to the framework 62, and which is driven by the indexing drive 70, so as to be conjointly driven.

The chain 64 carries an endless series of driving pads 84, which are spaced from one another by a sufficient distance (about 18 inches) to permit one of the relatively wide boards 10' (with its leading and trailing edges oriented transversely) to fit between two such pads 84. The pads 84 are arranged to slide along a pair of rails 86, which are fixed to the framework 62 of the conveyor 60, when the chain 64 is driven. Each pad 84 is connected to the chain 64 by a link (not shown) between the rails 86.

The chain 66 carries an endless series of driving pads 88, which are similar to the pads 84, and which are spaced similarly so as to permit one of the relatively wide boards 10' (with its leading and trailing edges oriented transversely) to fit between two such pads 88. The pads 88 are arranged to slide along a pair of rails 90, which are fixed to the framework 62 of the conveyor 60, when the chain 66 is driven. Each pad 84 is connected to the chain 46 by a link (not shown) extending between the rails 90.

The pads 84 and the rails 86, as associated with the chain 64, and the pads 88 and the rails 90, as associated with the chain 66, are made from a rigid polymeric material, such as an acetal polymer, which tends to be inherently lubricious. When each board 10 (or 10') is conveyed by the conveyor 60, such board (10 or 10') with its leading and trailing edges oriented transversely is slidable along the rails 86, 90, and is driven by a trailing one of the pads 84 and a trailing one of the pads 88, as engaged with such board 10 (or 10') at its trailing edge.

In the loading zone $Z_1$, into which each board 10 (or 10') is conveyed from the loading zone $Z_1$, such board 10 (or 10') may be manually or automatically loaded onto the rails 86, 90, between two of the pads 84 and between two of the pads 88. Such board 10 (or 10') may be then conveyed by the conveyor 60 successively into the sensing zone $Z_2$, into the punching zone $Z_3$, into the drilling zone $Z_4$, into the inspecting zone $Z_5$, and into the unloading zone $Z_6$. Such board 10 (or 10') remains in each such zone for a timed interval (dwell).

Each board 10 (or 10') is sensed in the sensing zone $Z_2$ by a roller 100, which is arranged to engage such board 10 (or 10') at its leading edge, to roll onto such board 10 (or 10') and to roll upon such board 10 (or 10'), as such board 10 (or 10') is driven into the sensing zone $Z_2$. The roller 100 is journalled to a first arm 102 of a crank 104, which is journalled to the framework 62. The crank 104 has a second arm 106, which is deployed between two limit switches 108, 110. The roller 100 has sufficient weight to bias the crank 104 (which also is biased by a spring not shown) such that the second arm 106 actuates the limit switch 108 when no such board is present in the sensing zone $Z_2$. When the roller 100 is lifted by the leading edge of such a board 10 (or 10') the crank 104 is rotated such that the limit switch 108 no longer is actuated by the second arm 106. Neither of the limit switches 108, 110, is actuated by the second arm 106 if one such board is present in the sensing zone $Z_2$. However, if a stack of two or more such boards 10 (or 10') is engaged by the roller 100, or if one such board 10 (or 10') is lying on one or more of the pads 84, 88, when it is engaged by the roller 100, the crank 104 is rotated such that the second arm 106 engages the limit switch 110.

In the sensing zone $Z_2$, each board 10 (or 10') is registered in a transverse sense, in an approximately centered position, by being conveyed between a fixed rail 120, which has a beveled surface 122 at an inlet end of the sensing zone $Z_2$, and an adjustable rail 124, which has a similar beveled surface 126. The rail 120 is fixed to the framework 62. The rail 124 is mounted adjustably to the framework adjusted to accommodate the nominal length of each board 10 (or 10') being handled by the apparatus 40 in a given run. The beveled surface 122 or the beveled surface 126 cams each board 10 (or framework 62, so as to be conjointly rotatable. The shaft 142 is linked via a crank 144 to a pneumatic piston-cylinder mechanism 146 equipped with a Hall-effect sensor 148. The piston-cylinder mechanism 146 is used to rotate the detents 140 between an inoperative position, in which the detents 140 are disposed below a plane comprising the upper surfaces of the rails 86, 90, and an operative position, in which the detents 140 extend above such plane so as to position the detents 140 to engage the leading edge of such board 10.

As shown in FIGS. 14 and 15, each detent 140 is mounted on the shaft 142, between two clamps 150, 152, so as to permit rotation of such detent 140 relative to the shaft 142 over a limited range of relative rotation. The limited range of relative rotation is defined by a pin 154 extending axially from the clamp 150 through an arcuate slot 156 in such detent 140. A coiled spring 158 is arranged, as shown, so as to bias such detent 140 in one rotational sense, namely the rotational sense causing such detent 140 to extend above the plane comprising the upper surfaces of the rails 86, 90, when such detent 140 is in its operative position. Thus, the coiled spring 158 enables such detent 140 to compensate for minor width variations from board to board.

As shown in FIG. 13, two spaced, vertical bars 210 are mounted rigidly to the pressing ram 54 so as to extend downwardly from the pressing ram 54, and so as to be conjointly movable upwardly and downwardly with the pressing ram 54. The vertical bars 210 have sufficient lengths that, when the pressing ram 54 is moved downwardly toward the pressing bed 52, the vertical bars 210 penetrate the plane comprising the upper surfaces of the rails 86, 90. However, their lengths are such that, when the pressing ram 54 is retracted upwardly, the vertical bars 210 are retracted sufficiently to permit a board 10 (or 10') to be then conveyed beneath the vertical bars 210 without interference from such bars 210.

In the punching zone $Z_3$, each board 10 (or 10') is registered in a longitudinal sense by means engaging such board 10 (or 10') at its leading edge and urging such bard 10 (or 10') backwardly against the vertical bars 210, as the pressing ram 54 is moved downwardly such that the vertical bars 210 penetrate the plane comprising the upper surfaces of the rails 86, 90. Different means, as described below, are used for urging each relatively narrow board 10 in the punching zone $Z_3$ backwardly against the vertical bars 210 and for urging each relatively wide board 10' in the punching Zone$_3$ backwardly against the vertical bars 210.

As shown in FIGS. 18, 19, and 20, two vertically retractable, spring-loaded devices 160 are used for urging each relatively narrow board 10 in the punching zone $Z_3$ backwardly against the vertical bars 210. Each device 160 is linked to a pneumatic piston-cylinder mechanism 194 so as to be vertically positionable between an operative position, in which such device 160 is positioned to urge each relatively narrow board 10 in the punching zone $Z_3$ backwardly against the vertical bars 210, and an inoperative position, in which such device 160 is withdrawn so as to permit each board 10 (or 10') to pass over such device 160. One such device 160 is shown in its operative position in FIGS. 18 and 19, in which such a relatively narrow board 10 is shown in phantom lines, and in its inoperative position in FIG. 20, in which the same board 10 again is shown in phantom lines.

Each device 160, as shown in FIGS. 18, 19, and 20, comprises a cross-slide 162, which is disposed in spaced notches 164 on opposite sides of a generally rectangular aperture 166 machined through a cross-piece 168, so as to be slidable in a longitudinal sense over a limited range of slidable motion. The cross-piece 168 is mounted rigidly to the framework 62. A block 170, which has a flange 172 at each side, is mounted beneath and to the cross-slide 162 by screws 174 so as to be conjointly slidable with the cross-slide 162. The flanges 172 extend beneath opposite sides of the aperture 166. Two springs 176, which are seated in respective sockets 178 in the block 170, bias the block 170 backwardly, as shown.

A cylindrical bore 180 defined vertically through the cross-slide 162 and a cylindrical bore 182 defined vertically through the block 170 communicate with each other, as shown, and receive a plunger 184, which is movable axially within the cylindrical bores 180, 182. The plunger 184 is keyed to the cylindrical bore 182 by a key 186, as shown, so as to be non-rotatable within the cylindrical bores 180, 182. The plunger 184 is linked by a T-shaped fitting 188, which coacts with a T-shaped socket 190 in the plunger 184, to the rod 192 of a pneumatic piston-cylinder mechanism 194, which is mounted beneath and to the block 170 by screws 196 passing through a mounting flange 198 attached to the nose 200 of such mechanism 194. A threaded neck 202 on the nose 200 is threaded into a threaded aperture 204 through the mounting flange 198. Thus, the cross-slide 162, the block 170, the plunger 184, and the piston-cylinder mechanism 194 are slidable conjointly and are biased backwardly by the springs 176, within the limited range of slidable motion of the cross-slide 162 in the notches 164.

The plunger 184 is formed with a notch 206 defining a wall 208 facing backwardly. The plunger 184, as linked to the piston-cylinder mechanism 194, is movable vertically between an operative position, in which the plunger 184 is elevated so as to engage the leading edge of each relatively narrow board 10 in the punching zone $Z_3$, at the wall 208, and an inoperative position, in which the plunger 184 is lowered so as to permit each board 10 (or 10') to pass over the plunger 184.

Because of the springs 176, which bias the plungers 184 of the respective devices 160 backwardly, such plungers 184 engage the leading edge of each relatively narrow board 10 in the punching zone $Z_3$, at the wall 208, so as to urge such board 10 backwardly against the vertical bars 210, which engage the trailing edge of such board 10.

As shown in FIG. 9 and elsewhere, two spaced, asymmetrical, T-shaped members 220 are mounted pivotally to the pressing ram 54, each being mounted at a pivot 222 defining a transverse axis, so as to be conjointly movable upwardly and downwardly with the pressing ram 54. Each member 220 has an upright leg 224 extending downwardly from the pivot 222, a relatively long leg 226 extending forwardly from the pivot 222, and a relatively short leg 228 extending backwardly from the pivot 222. A biasing device 230 of a conventional type comprising an internal spring 232 and an externally threaded sleeve 234 is mounted in a threaded aperture 236 in the forwardly extending leg 226, as shown, so as to bear upwardly against the pressing ram 54. An adjustable stop 238 is mounted on the backwardly extending leg 228, as shown, so as to point upwardly toward the pressing ram 54.

The biasing devices 230 bias the members 220 on the pivots 222, in a clockwise sense in FIG. 9, so as to cause the upright legs 224 to be backwardly pivoted. Also, the adjustable stops 238 limit pivotal movement of the upright legs 224, in a clockwise sense in FIG. 9. Thus, the upright legs 224 engage the leading edge of each relatively wide board 10' in the punching zone $Z_3$, as shown in FIG. 9, so as to urge such board 10' backwardly against the vertical bars 210, which engage the In the punching zone $Z_3$, three spring-loaded rollers 240, as shown in FIGS. 7, 16, 17, 21, and 22, are used for urging each relatively short board 10 or each relatively long board 10' (whichever the rail 124 has been adjusted to accommodate) transversely against the fixed rail 120, by bearing against the adjacent end of such board, thereby to cause the fixed rail 120 to engage the opposite end of such board. One such roller 240 is shown as bearing against the adjacent end of such a relatively narrow board 10 in FIGS. 21 and 22.

Each spring-loaded roller 240, as shown in FIGS. 21 and 22, is journalled on a pin 242, between two spaced plates 244 fastened by screws 246 to a tongue 248, and is accommodated by a notch 250 in the rail 124. The tongue 248 fits into a groove defined by the notch 250 in the rail 124 and by a plate 256 covering the notch 254 and being fastened to such rail 124. A spring 260, which is disposed within a socket 262 notched into the tongue 248 and within a socket 264 notched into the rail 124, biases the roller 240 transversely, as shown, so as to urge each board 10 (or 10') against the fixed rail 120. The sockets 262, 264, are covered by the plate 256.

In the punching zone $Z_3$, a punching mechanism 270 is mounted operatively. Broadly, the punching mechanism 270 comprises a plurality of punch assemblies 272 and a plurality of dies 274, each punch assembly 272 defining an axis and coacting with one of the dies 274. Each punch assembly 272 and the die 274 coacting with such punch assembly 272 are used (depending on the setup of the apparatus 40) to punch one of the holes 24 in each relatively narrow board 10 or to punch one of the holes 24' in each relatively wide board 10'. In FIGS. 25 through 28, one such punch assembly 272 and one such die 274 coacting with the same punch assembly 272 are shown as being used to punch one of the holes 24 in one of the relatively narrow boards 10 by removing a slug 276, which leaves such a hole 24.

The punching mechanism 270 comprises a die-mounting plate 280, which has a die-mounting aperture 282 at each location where one of the dies 274 is mountable. The die-mounting plate 280 is mounted fixedly to the framework 62 so as to rest firmly on the pressing bed 52. Each die-mounting aperture 282 is circular in cross-section. Each die 274 has an upper, annular shoulder 284, as shown, and is held in place by a button-head cap screw 286.

Each die 274 is shaped, as shown, so as to permit such die 274 to be installed in such an aperture 282 such that the upper portion 284 including a cutting edge 288 (which is circular) extends above the plate 280 by a slight distance and such that a lower portion 290 fits under the button-head cap screw 284. Each die 274 is made of hardened tool steel or other suitable material.

The die-mounting plate 280 has one die-mounting aperture 282 for each of the holes 24 to be possibly punched in a relatively narrow, relatively short board 10 and one such aperture 282 for each of the holes 24', 26', to be possibly punched in a relatively wide, relatively long board 10'.

Minimally, such a die 274 is installed in the die-mounting aperture 282 for each of the holes to be actually punched in each board, whether such a board 10 or such a board 10'. It is permissible but not necessary for such a die 274 to be also installed in each of the remaining apertures 282. The die-mounting plate 280 is mounted fixedly to the framework 62.

The die-mounting apertures 282 are arranged in several linear arrays, each corresponding to one of the previously described, linear arrays of punched holes. One linear array A of such apertures 282 near the trailing edge of a board in the punching zone $Z_3$ is used whether the board is a relatively narrow board 10 or a relatively wide board 10'. A selected one of two linear arrays B, C, of such apertures 282 near the leading edge of a board in the punching zone $Z_3$ also is used. Which one is used depends upon whether the board is a relatively narrow board 10 or a relatively wide board 10'. There is nothing to prevent all three arrays from being used. A different array D of such apertures 282 is used for each of the pairs of punched holes 26' of a relatively wide board 10'.

Figures 25, 26, 27, 28:
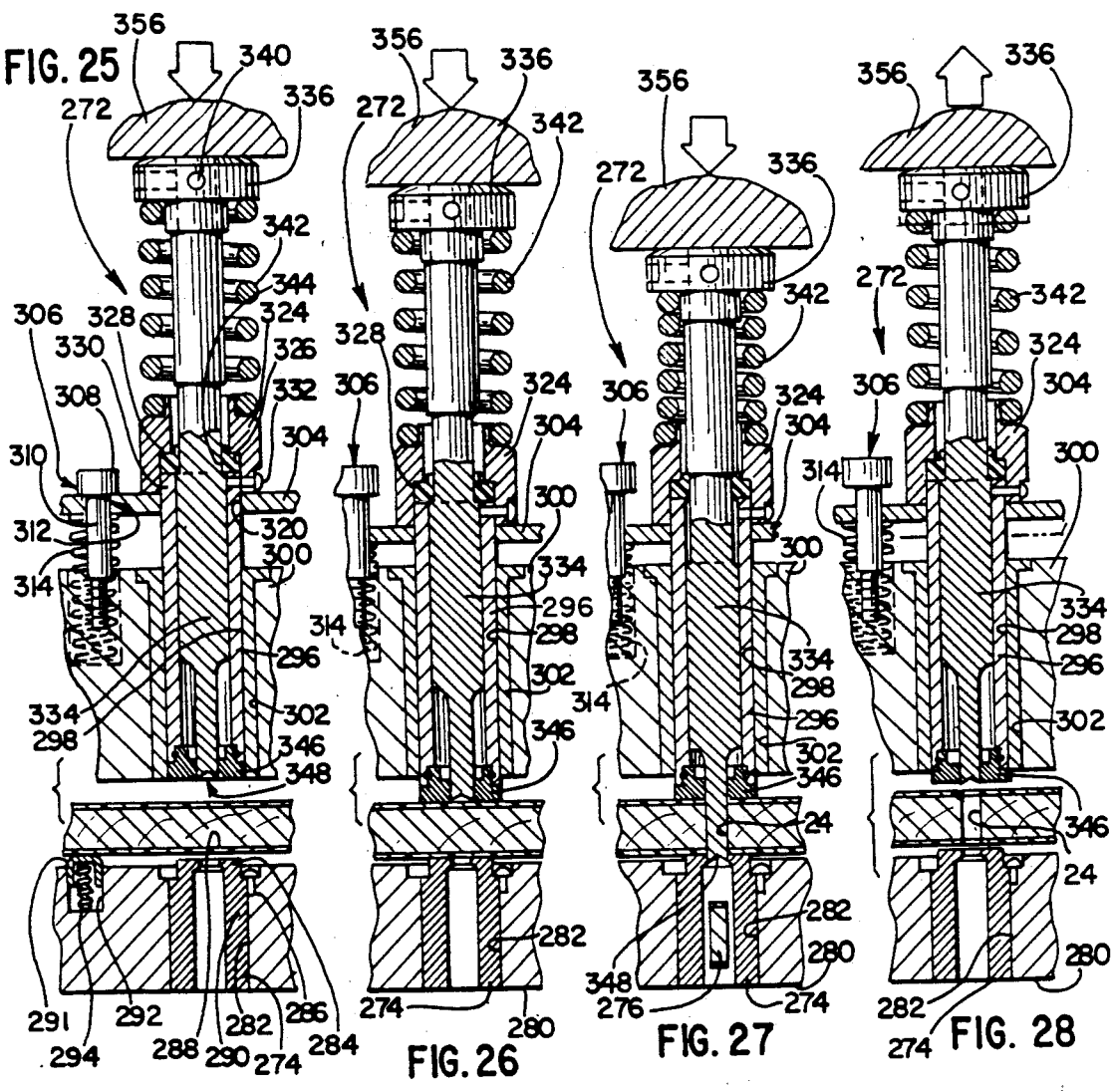
FIGS. 25, 26, 27, and 28 respectively are fragmentary, cross-sectional views taken axially along such a punch and a die coacting therewith, at successive stages in their coaction.

Plural spring-loaded rails 291 are used to elevate each board 10 (or 10') in the punching zone $Z_3$ above the upper portions 284 of the respective dies 274 by a slight distance but to permit such board 10 (or 10') to be downwardly pressed against the upper portions of the respective dies 274. One such rail 291 is shown in FIG. 25 as elevating a relatively narrow board 10. Each such rail 291 is fitted operatively into a slot 292 in the die-mounting plate 280 and is biased upwardly by a spring 294 in the slot 292. Each such rail 291 is beveled, as shown, so as to provide a smooth transition when engaged by the leading edge of each board 10 (or 10') being conveyed into the pressing zone $Z_3$.

The punching mechanism 270 comprises a bushing-holding plate 300, which is mounted fixedly to the framework 62, above and in spaced, parallel relation to the die-mounting plate 280. The bushing-holding plate 300 has a bushing-holding aperture 302 corresponding to and aligned axially with the annular shoulder 284 of each die-mounting aperture 282 of the die-mounting plate 280. Each bushing-holding aperture 302 holds and is lined by a bushing 296 defining a bushing-holding passageway 298, which is circular in cross-section. Each bushing 296 is secured by a button-head cap screw (not shown) removably to the bushing-holding plate 300.

The punching mechanism 270 also comprises a punch-lifting plate 304, which is supported above and in spaced, parallel relation to the bushing-holding plate 300. Plural shoulder screws or studs 306 having enlarged heads 308 and elongate shanks 310, which pass loosely through respective apertures 312 in the punch-lifting plate 304, and which are mounted fixedly to the bushing-holding plate 300, are used to assemble the bushing-holding plate 300 to the punch-lifting plate 304. Springs 314 are deployed in sockets (not shown) in the bushing-holding plate 300 so as to bear against the bushing-holding plate 300 and against the punch-lifting plate 304. As shown in FIGS. 25 through 28, in which one such stud 306 and one such spring 314 are shown, the springs 314 bias the punch-lifting plate 304 upwardly against the enlarged heads 308 of the studs 306, such heads 308 bearing against upper margins of the apertures 312. However, the springs 314 permit the punch-lifting plate 304 to be downwardly pressed toward the bushing-holding plate 300. The punch-lifting plate 304 has a punch-admitting aperture 320 corresponding to and being aligned axially with each bushing-holding aperture 302 of the bushing-holding plate 300.

Each punch assembly 272 comprises a bushing-holding sleeve 322 fitting slidably in a selected one of the punch-admitting apertures 320 and the corresponding one of the bushing-holding apertures 302. An upper, annular collar 324 having a lower, annular notch 326, which contains an punch-retaining ring 328 and receives an upper portion 330 of the sleeve 322, is fastened to such portion 330 of the sleeve 322 by a screw 332.

Each punch assembly 272 comprises a punch pin 334 having stepped diameters along its axial length, as shown, and extending axially through the collar 324, through the ring 328, and through the sleeve 322. An enlarged head 336 is attached to the upper end of the pin 334, by a set screw 340. A coiled spring 342 is deployed and is secured around the punch 334, between the collar 324 and the head 336, so as to bias the punch 334 upwardly within the sleeve 322. An annular shoulder 344 formed on the punch 334 engages the ring 328 contained by the notch 326 in the collar 324 so as to prevent the punch 334 from becoming disassociated from the collar 324, the ring 328, and the sleeve 322.

An annular member 346 made of a soft steel, such as AISI C 1018 steel, is affixed to the lower end of the sleeve 322 of each punch assembly 272, by an epoxy bead 347. The sleeve 322 serves to guide the punch 334. The annular member 346 serves to strip the panel 10 (or 10') from the punch 334.

Figure 23:
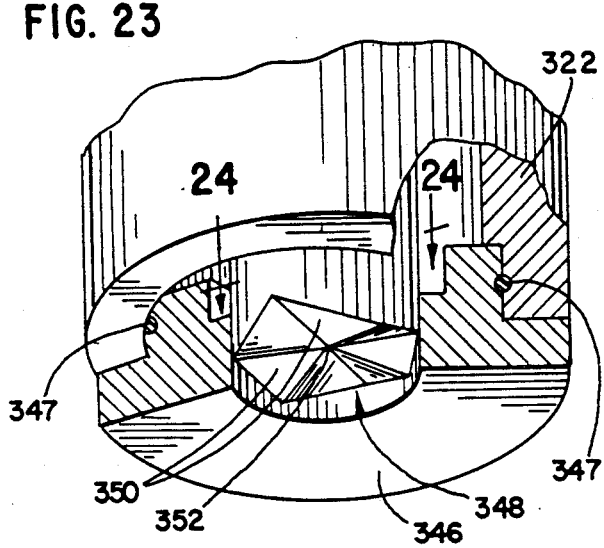
FIG. 23 is a fragmentary perspective view of the working end of an exemplary punch used in the same apparatus.
Figure 24:
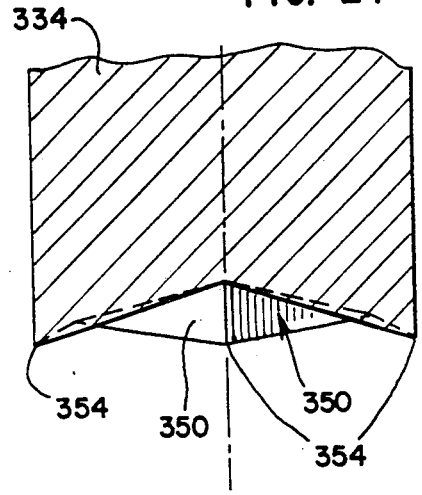
FIG. 24 is a fragmentary, sectional view taken through line 24—24 of FIG. 23, in a direction directed by arrows.

The punch 334 is made of tool steel or similar material and has a specially shaped, hardened tip 348, as shown in FIGS. 23 and 24. The tip 348 has eight triangular facets 350 meeting at the axial center 352 of the pin 334 and forming four chisel points 354. Such 25 points 354 tend to cut cleanly through the veneered faces of a panel 10 (or 10') being punched.

The enlarged heads 336 of the punching pins 334 of the respective punch assemblies 272 are disposed beneath rigid rails 356 (one shown) which are mounted rigidly beneath and to the pressing ram 54. One such rail 356 is provided for each linear array of such punch assembly 272. Thus, when the pressing ram 54 is driven downwardly toward the pressing bed 52 with a board elevated by the spring-loaded rails 291 between the die-mounting plate 280 and the bushing-holding plate 300, a punching sequence occurs, as shown in FIGS. 25 through 28, in which a board is shown.

As the pressing ram 54 is driven downwardly, the enlarged head 336 of the punch 334 of each punch assembly 272 is engaged by one of the rigid rails 356, as shown in FIG. 25. Next, such punch assembly 272, the spring 342 included in such punch assembly 272, and the bushing-holding sleeve 322 associated with such punch assembly 272 are driven downwardly. As such punch assembly 272, such spring 342, and such sleeve 322 are driven downwardly, the hardened tip 348 of such punch assembly 272 begins to penetrate the board 10 (or 10'). Also, such sleeve 322 is pressed downwardly against the board 10 (or 10') and the board 10 (or 10') is pressed downwardly against the upper portion 286 of the die 274 associated with such punch assembly 272, as shown in FIG. 27. Further movement of the pressing ram 54 downwardly drives the hardened tip 348 through the board 10 (or 10') whereby such tip 348 coacts with the cutting edge 288 of such die 274.

Upon subsequent retraction of the pressing ram 4 upwardly away from the pressing bed 52, the springs 42 included in the punch assemblies 272 drive the punches 334 upwardly through the sleeves 322 included in the punch assemblies 272, and the springs 314 drive the punch-lifting plate 304 upwardly, whereupon the punch-lifting plate 304 engages the collars 324 and drives the sleeves 322 as shown in FIG. 27. Thus, the punches 334 are stripped upwardly from the board 10, which engages the bushing-holding plate 300 if the board 10 is pulled upwardly with such sleeves 322.

In the drilling zone $Z_4$, each relatively narrow board 10 is engaged at its leading edge by two detents 360, which are similar to the detents 140 in the sensing zone $Z_2$, and which operate similarly. Moreover, each relatively wide board 10' is engaged at its leading edge by two detents 370, which also are similar to the detents 140, and which also operate similarly. The detents 370 are displaced longitudinally from the detents 360, as shown in FIG. 10. If the detents 360 are actuated, the detents 370 are deactuated, and vice-versa. The detents 370 are shown in FIG. 29 as engaged with the leading edge of a relatively wide board 10'.

Each board 10 (or 10') in the drilling zone $Z_4$ is sensed by a roller 380, which is similar to the roller 100 in the sensing zone $Z_2$, and which operates similarly. The roller 380, via a crank 384 similar to the crank 104, coacts with two limit switches 388, 390, which are similar to the limit switches 108, 110, and which operate similarly.

In the drilling zone $Z_4$, a drilling assembly 400 equipped with as many as four ganged drilling bits 402, 404, 406, 408, is used (depending upon the set-up of the apparatus 40) to drill two holes 28 into the nearer end 20 of each relatively narrow board 10 or to drill, four holes 28' into the near end 20' of a relatively wide board 10'. Likewise, a drilling assembly 410 similar to the drilling assembly 400 and equipped with as many as four ganged drilling bits 412, 414, 416, 418, is used (depending upon the set-up of the apparatus 40) to drill two holes 28 into the nearer end 22 of a relatively narrow board 10 or four holes 28' into the nearer end 22' of a relatively narrow board 10'. The drilling assembly 410 equipped with such ganged drilling bits 412, 414, 416, 418, is shown in FIGS. 29 through 32. Also, a relatively wide board 10' (in which the punched holes are omitted to simplify illustration) is shown in FIG. 29, which also shows such ganged drilling bits 402, 404, 406, 408, of the drilling assembly 400.

The drilling assembly 410 comprises a rigid base 420, which is mounted adjustably to a pair of spaced mounting flanges 422. Such flanges 422 are mounted fixedly to the framework 62. The base 420 comprises a lower plate 424, which is mounted adjustably on the mounting flanges 422 by cap screws 426 coacting with respective apertures 428 in the lower plate 424 and with respective apertures 430 in the mounting flanges 422. A sufficient number of such apertures 430 are provided in the flanges 422 to enable the plate 424 to be mounted at either of two possible positions on the flanges 422. A key 432, which fits into one of two keyways 434 provided in the plate 424 and into a keyway 436 in one of the flanges 422, permits transverse adjustment of the plate 424 along the flanges 422 when the screws 426 are loosened. The other keyway 434 is not used.

The base 420 comprises an outer wall 440, which is mounted rigidly to the plate 424 by machine screws 442, and an inner wall 444, which is mounted rigidly to the plate 424 by screws 446. Two transverse rods 448, 450, are mounted between and to the outer wall 440 and the inner wall 444. A guide block 452 is mounted slidably on the transverse rod 448. A guide block 454 is mounted slidably on the transverse rod 450. A lower brace 456 is mounted fixedly between and to such blocks 452, 454, so as to be conjointly slidable with such blocks 452, 454.

A pneumatic piston-cylinder mechanism 460 equipped with a Hall-effect sensor 462 is provided, which has a cylinder 464 mounted fixedly to the outer wall 440, and which has a rod 466 extended from the cylinder 464, through an enlarged aperture 468 in such wall 440. The rod 466 is attached to the lower brace 456, at a threaded connection 470, which is secured by a threaded nut 472.

The pneumatic-piston cylinder mechanism 460 is arranged to push the lower brace 456 toward the inner wall 444 when the rod 466 is advanced from the cylinder 464 and to pull the lower brace 456 toward the outer wall 440 when the rod 466 is retracted into the cylinder 464. Two hydraulic devices 474, 476, are provided. The hydraulic device 474 includes a cylinder 478, which extends loosely through an aperture 480 in the outer wall 440, and which is mounted fixedly to the lower brace 456 so as to extend through an aperture 482 in the lower brace 456, and a rod 484, which is arranged to engage the inner wall 444 when the lower brace 456 is pushed toward the inner wall 444. The hydraulic device 474, which may be also called a constant velocity control, is used to control the pneumatic piston-cylinder mechanism 460, in a known manner, such that such mechanism 460 advances the piston 466 at a uniform velocity. The hydraulic device 476, which serves as a shock absorber, includes a cylinder 490, which is mounted fixedly to the outer wall 440 so as to extend through an aperture 492 in the outer wall 440, and a rod 494, which is arranged to engage the lower brace 456 when the lower brace 456 is pulled toward the outer wall 440. An annular elastomeric bumper 496 is mounted to a spacer 498, as shown, so as to provide further shock absorbency as the lower brace 456 is moved toward the inner wall 444.

A gear housing 500 comprising four drilling bit-mounting chucks 502, 504, 506, 508, is mounted to the guide blocks 452, 454, by screws 510. Each chuck is adapted to hold one of the drilling bits. As indicated by curved arrows in FIG. 31, the drilling bit 412 held by the chuck 502 and the drilling bit 414 held by the chuck 504 are left-hand bits, and the drilling bits 416 held by the chuck 506 and the drilling bit 418 held by the chucks 508 are right-hand bits.

Various gears including a driving gear 512 and other gears driven directly or indirectly by the driving gear 512 are mounted operatively in the gear housing 500, in which lower portions of such gears tend to be continuously immersed in lubricating oil. Two pinions 514, 516, are mounted so as to be driven by the driving gear 512. The pinion 514 is coaxial with the chuck 504. A larger gear 518 is mounted so as to be driven by the pinion 514. A pinion 520, which is coaxial with the chuck 502, is mounted so as to be driven by the larger gear 518. A pinion 522, which is coaxial with the chuck 506, is mounted so as to be driven by the pinion 516. A larger gear 524 is mounted so as to be driven by the pinion 522. A pinion 526, which is coaxial with the chuck 508, is mounted so as to be driven by the larger gear 524.

The pinion 520 is coupled to the chuck 502 such that the left-hand bit 412, if held by the chuck 502, is driven conjointly with the pinion gear 520. The pinion 514 is coupled to the chuck 504 such that the left-hand bit 414, if held by the chuck 504, is driven conjointly with the pinion gear 514. The pinion 522 is coupled to the chuck 506 such that the right-hand bit 416, if held by the chuck 506, is driven conjointly with the pinion 522. The pinion 526 is coupled to the chuck 508 such that the right-hand bit 418, if held by the chuck 508, is driven conjointly with the pinion 520.

An electric motor 530 is mounted to the gear housing 500 and is coupled to the driving gear 512 such that the electric motor 530 when actuated drives the driving gear 512. Thus, when the electric motor 530 is actuated, whichever drilling bits held by the chucks 502, 504, 506, 508, are driven. If two holes 28 are to be drilled into the nearer end 22 of a relatively narrow board 10, the drilling bits 414, 418, are installed respectively in the chucks 504, 508 but no drilling bits are installed in the chucks 502, 506. If four holes 28' are to be drilled into the nearer end 22' of a relatively wide board 10', as shown in FIG. 28, the drilling bits 412, 414, 416, 418, are installed respectively in the chucks 502, 504, 506, 508.

A board-registering member 540 is mounted fixedly to the gear housing 500. The board-registering member 540 has a channel portion 542, which is formed with a tapered groove 544, as shown in FIG. 32. When each board 10 (or 10') in the drilling zone $Z_4$ is engaged at its leading edge by the cams 360, the trailing edge of such board 10 (or 10') is urged backwardly into the tapered groove 544, whereby such board 10 (or 10') is registered in a longitudinal sense.

A board-stabilizing member 550 having a lower, tapered portion 552 and an upper, tapered portion 556 is mounted fixedly to the gear housing 500. The tapered portions 552, 556, define a tapered groove 558, as shown in FIG. 32. The tapered groove 558 confines the nearer end 22 (or 22') of each board 10 (or 10') in the drilling zone $Z_4$ so as to stabilize (and locate vertically) the board 10 (or 10') as the holes 28 (or 28') are being drilled.

Each relatively narrow board 10 in the inspecting zone $Z_5$, is engaged at its leading edge by two detents 570, which are similar to the detents 140 in the sensing zone $Z_2$, and which operate similarly. Each relatively wide board 10' in the inspecting zone $Z_5$ is engaged at its leading edge by two detents 580, which also are similar to the detents 140, and which also operate similarly. The detents 570 are displaced longitudinally from the detents 580, as shown in FIG. 10. If the detents 570 are actuated, the detents 580 are deactuated, and vice-versa. When the detents 570 are actuated, the detents 570 engage the leading edge of a relatively narrow board 10 so as to urge such board 10 backwardly against the driving blocks 84, 88, bearing against the trailing edge of such board 10, whereby such board 10 is registered in a longitudinal sense in the inspecting zone $Z_5$. When the detents 580 are actuated, the detents 580 engage the leading edge of a relatively wide board 10' so as to urge such board 10' backwardly against the driving blocks 84, 88, bearing against the trailing edge of such board 10', whereby such board 10' is registered in a longitudinal sense in the inspecting zone $Z_5$. The detents 580 are shown in FIG. 33 as engaging the leading edge of a relatively wide board 10' (with its punched holes omitted to simplify illustration) along with two driving blocks 84, 88, bearing against its trailing edge.

In the inspecting zone $Z_5$, an inspecting unit 590 equipped with four hole-inspecting probes 592 and provided with a removable cover 594 is used (depending upon the set-up of the apparatus 40) to perform a physical measurement of each of the two drilled holes 28 in the farther end 20 of a relatively narrow board 10 or to perform a physical measurement of each of the four drilled holes 28' in the farther end 20' of a relatively wide board 10'. The inspecting unit 590 and the removable cover 594 have beveled surfaces 596 at an inlet end of the inspecting zone $Z_5$. Moreover, an inspecting assembly 600 equipped with four hole-inspecting probes 602 and provided with a removable cover 604 is used (depending upon the set-up of the apparatus 40) to perform a physical measurement of each of the two drilled holes 28 in the nearer end 22 of a relatively narrow board 10 or to perform a physical measurement of each of the four drilled holes 28' in the nearer end 22' of a relatively wide board 10'. The inspecting assembly 600 and the removable cover 604 have beveled surfaces 606 at the inlet end of the inspecting zone $Z_5$.

The beveled surfaces 596 or the beveled surfaces 606 cam each board 10 (or 10') to an approximately centered position between the inspecting units 590, 600, if such board 10 (or 10') is displaced transversely but not excessively when conveyed into the inspecting zone $Z_5$.

The inspecting units 590, 600, are controllable (depending upon the set-up of the apparatus 0) such that none of the probes 592, 602, are advanced, such that two of the probes 592 and two of the probes 02 (such probes corresponding to the holes 28 drilled into each of the opposite ends 20, 22, of a relatively narrower board 10) are advanced, or such that all of the probes 592 and all of the probes 602 (such probes corresponding to the holes 28' drilled into each of the opposite ends 20', 22', of a relatively wide board 10') are advanced.

Except for where the beveled surfaces 596, 606, are located, the inspecting units 590, 600, are similar to each other. As shown in FIGS. 34, 35, and 36, the inspecting assembly 600 is to be next described in further detail.

The inspecting assembly 600 is mounted fixedly on a structural angle 610, which has a transverse flange 612 supporting the inspecting assembly 600 and a vertical flange 614. Two sleeves 616 are welded to the vertical flange 614, each so as to be axially aligned with an aperture 618 through the vertical flange 614. Two transverse rods 620, which are similar to the transverse rods 136, are mounted fixedly to the framework 62. One of the transverse rods 620 passes through each sleeve 616, and through the associated aperture 618 through the vertical flange 614, such that the inspecting assembly 600 is mounted adjustably on the transverse rods 620. Each sleeve 616 is positioned on the transverse rod 620 passing through such sleeve 616 by such a detent 622 carried by such sleeve 616 and coacting with a recess 624 in such rod 620. Clamping means 626 of a known type are used to clamp such sleeve 616 to such rod 620.

The inspecting assembly 600 comprises a lower base 630, which is bolted on the transverse flange 612 of the structural angle 610. The base 630 is bored so as to define four hollow cylinders 632, each hollow cylinder 632 corresponding to one of the probes 602 of the inspecting assembly 600. A piston 634, from which one of the probes 602 extends axially, is disposed operatively in each cylinder 632. Each probe 602 extends through an aperture 636 in an elongate strip 638 closing each cylinder 632 (where the base 630 is bored so as to define such cylinder 632) and being attached by recessed screws 640 (as shown) to the base 630. One of the beveled surfaces 606 is formed on the elongate strip 638, which is made of the polymeric material used for the blocks 84 and for the rails 86, such material tending to be inherently lubricious.

At each cylinder 632, a pneumatic fitting 642 is mounted to the base 630 at a threaded connection 644 so as to communicate with the outer end of such cylinder 632. Moreover, a pneumatic fitting 646 is mounted to the base 630 at a threaded connection 648 so as to communicate with the inner end of such cylinder 632.

A switch-actuating member 650 extends upwardly from each piston 634, through a slot 652 in the base 630.

Two limit switches 654, 656, are associated with each member 650. The limit switches 654, 656, are mounted on the base 630. Each member 650 is arranged to actuate the limit switch 654 associated with such member 650 when the associated piston 634 is displaced within the associated cylinder 632 so as to reach the outer end of the associated cylinder 632. Such member 650 is arranged to actuate the limit switch 656 associated with displaced within the associated cylinder 632 so as to reach the inner end of the associated cylinder 632.

Thus, as shown in FIGS. 35 and 36, if the inspecting assembly 600 is actuated so as to advance each probe 602, the member 650 associated with such probe 602 deactuates the associated limit switch 654. Thereupon, if such probe 602 is received by a drilled hole 28 (or 28 ) in a board 10 (or 10') to a sufficient minimum depth, the associated member 650 actuates the associated limit switch 656. However, no such hole is positioned to receive such probe 602, or if a hole positioned to receive such probe 60 does not receive such probe 602 to a sufficient minimum depth, the associated member 650 deactuates the associated limit switch 654 but does not actuate the associated limit switch 656.

As shown in FIGS. 11 and 12, the indexing drive 70 comprises a variable-speed, direct current motor 670, a high-speed clutch-brake combination 672 connected operatively to the motor 670, and a speed reducer 674 connected operatively to the clutch-brake 672. A Camco TM parallel series index drive available commercially from Emerson Power Transmission Corporation of Wheeling, Ill., is suitable for the indexing drive 70.

Two timing cams 676, 678, are connected to the speed reducer 674 so as to be conjointly driven by the motor 670, via the clutch-brake 672. A cam follower 680 is arranged to follow the timing cam 676. A cam follower 682 is arranged to follow the timing cam 678.

As shown in FIGS. 8 and 10, the apparatus 40 is arranged to be rolled from an operative position (between the pressing ram 54 and the pressing bed 52) to an inoperative position (away from the pressing ram 54 and the pressing bed 52) so as to facilitate servicing and changes in the set-up of the apparatus 40. The framework 62 includes a lower plate 690, which is adapted to be firmly rested on the pressing bed 52. On each side of the framework 62, two grooved rollers 692 are mounted operatively, and an inverted V-shaped rail 694 is mounted in a U-shaped channel 696, which is mounted on a flat beam 698 mounted on the pressing bed 52, so as to extend longitudinally beneath the grooved rollers 692 on such side of the frameword 62. Each flat beam 698 is supported by a vertical prop 700 at a distal end 702 of such beam 698.

Each rail 694 is arranged to be vertically movable between a lower position, in which such rail 694 and the associated channel 696 rest on the associated beam 698, and an upper position, in which such rail 694 is elevated so as to engage the associated rollers 692, and so as to support the apparatus 40 above and in spaced relation to the pressing bed 52. Thus, when each rail 694 has been moved to its upper position, the apparatus 40 may be then rolled between its operative and inoperative positions. At each end of each rail 694, a flange 704 is provided, which accommodates a jack screw 706 coacting with the associated beam 698. The jack screws 706 are used to move the rails 694 vertically between their lower and upper positions.

Electrical System

The preferred embodiment of a machine in accordance with the present invention is based on (i) a punch press, preferably a Niagara 150 ton punch press #PN 150-108-30, (ii) a board conveyor, (iii) an end drill unit, (iv) a programmable logic controller (PCL), (v) a parallel indexer, and (vi) a "punch through" die set.

The (PCL is preferably an Allen-Bradley TM type 1745 including a 1745-LP153 SLC 150 Processor Unit (12 Hard Contact), a 1745-E153 SLC 150 Expansion Unit (12 Hard Contact), a 1745-PCK PC Interface Kit, a 1745-PT1 Pocket Programmer, and a 1745-M EE-PROM Memory Module.

The parallel indexer is preferably a Camco TM parallel indexer type #387P2H28-180 with a 1 HP D.C. Motor and Speed Reducer.

As previously explained, the purpose of the machine is (1) to punch up to 99 holes through a piece of laminated particle board and (ii) to drill 0, 2, or 4 blind holes in the ends of the particle board. Typical board sizes are approximately 42"×16"×$\frac{1}{2}$" (wide), 32"×16"×$\frac{1}{2}$" (wide), or 32"×12"×$\frac{1}{2}$" (narrow).

Figure 37:
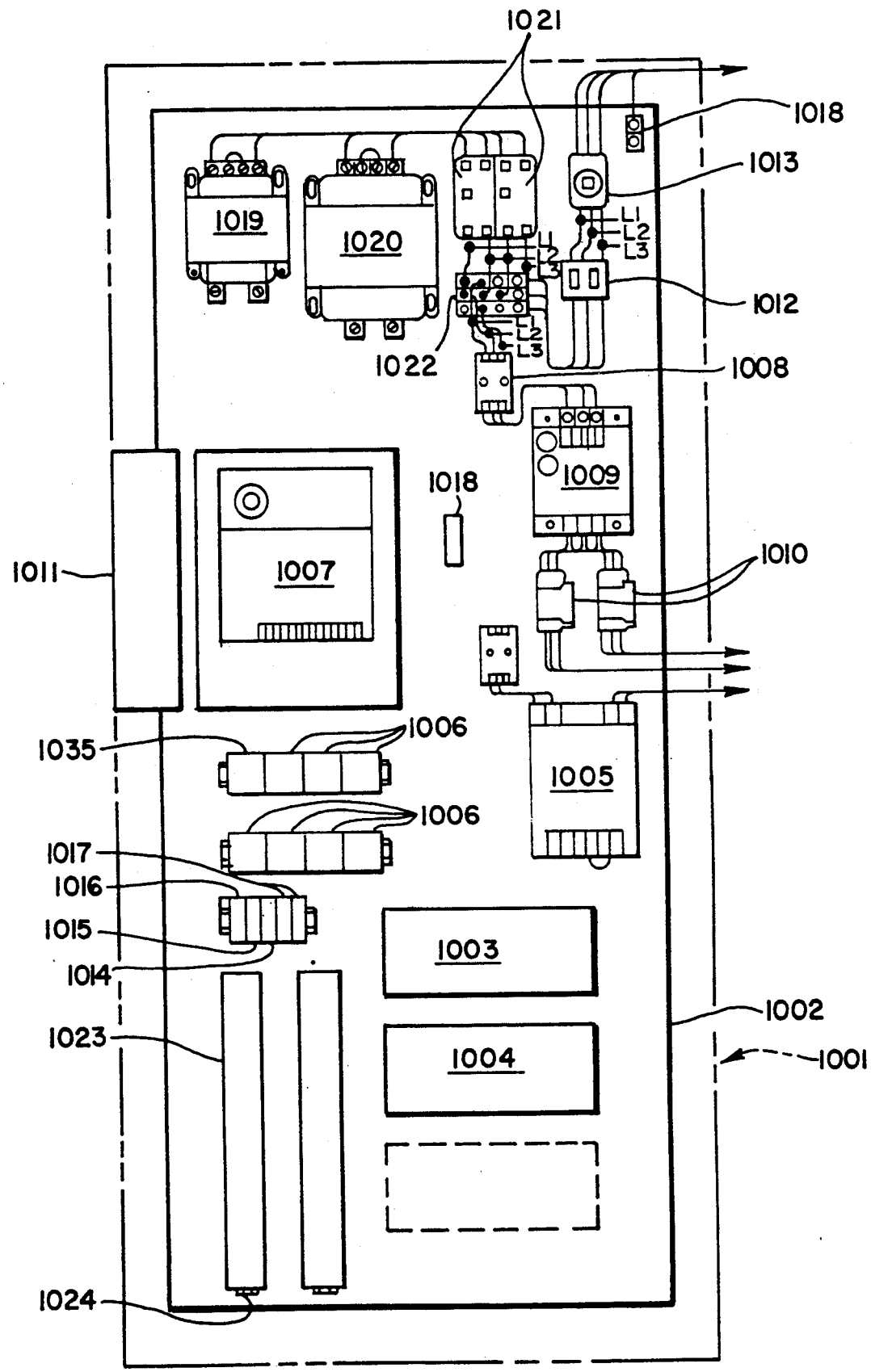
FIG. 37 is a diagrammatic layout of certain electrical components of the apparatus shown in FIGS. 6 through 8.
Figure 38:
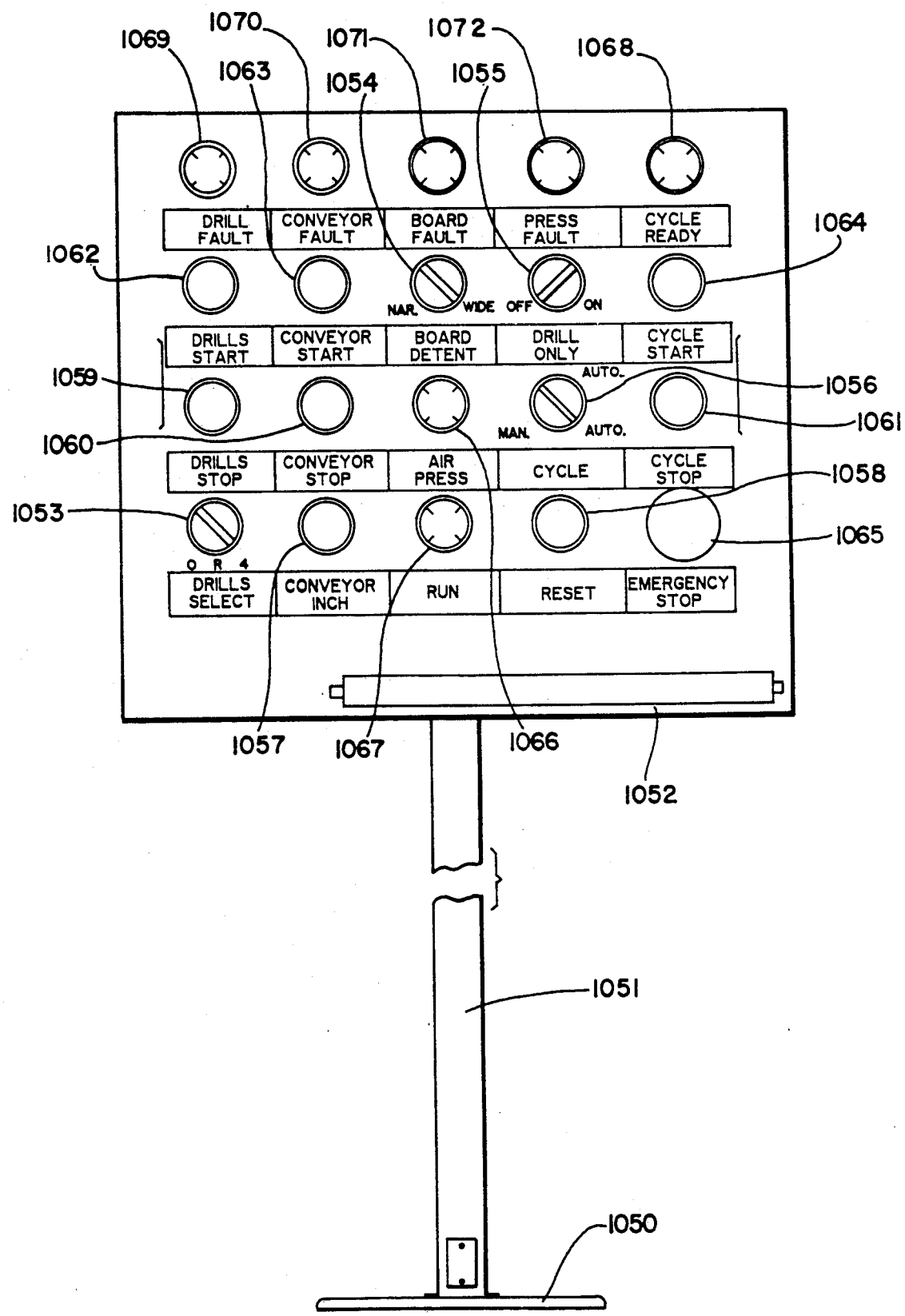
FIG. 38 is an elevational view of a control module for the same apparatus.
Figure 39:
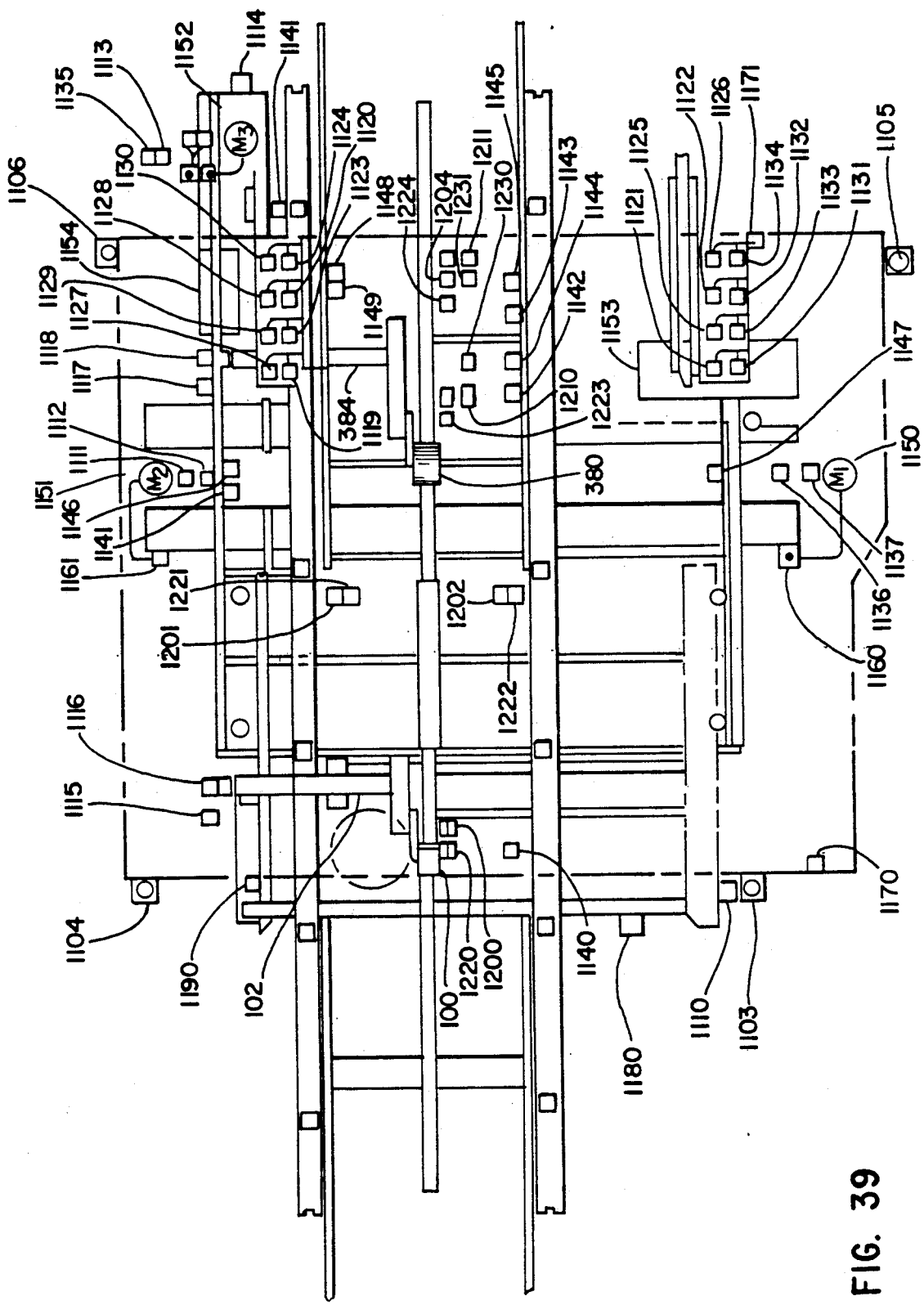
FIG. 39 is a view similar to FIG. 7 but simplified and modified to show certain electrical switches of the same apparatus.

The electrical components of the machine are shown in FIGS. 37, 38, and 39. A preferred physical layout of the machine's control panel, showing the (PCL and certain other components involved in electrically controlling machine operation, is shown in FIG. 37. A single-door enclosure 1001, typically 30"×72", contains a full panel 1002, typically 26"×60". The panel 1002 supports a DIN Mounting Rail 1025; a four terminal end stop 1024, preferably WAGO type 209-101; a forty 2-position terminal block 1023, preferably WAGO type 280-001; and three terminal blocks 1022, for 480 VAC Distribution, preferably WAGO type 284-621 or 624. The panel 1002 further supports two circuit breakers 1021, 15A, 480 VAC for the line and load lugs, preferably General Electric type TED14015WL; a transformer 1020, 3 KVA, L80-120 VAC, 1 Phase, preferably Jefferson type 636-1241; a transformer 1019, 1 KVA, 480-120 VAC, 1 Phase, preferably Jefferson type 630-1211; and two ground busses 1018, preferably ITE Electric type BC-10. The panel 1002 further supports two circuit breakers 1017, 15A, 250 VAC, rail-mounted, preferably Allen-Bradley type 1492-GH 150; a circuit breaker 1016, 1A, 150 VAC, rail mounted, preferably Allen-Bradley type 1492-GH010; a circuit breaker 1014, 10A, 15 VAC, rail-mounted, preferably Allen-Bradley type 1492-1492-GM100; a disconnect switch 1013, preferably ASEA type SEK30N3; and a circuit breaker 1012, 480 V, 3 Phase 20A, preferably Kloeckher Model 2 type PKZM1-16. The panel 1002 further supports a power supply 1011, 120 VAC-24 VDC, preferably Compumech type HE24-72-A; two overload relays 1010, 480V, 3 Phase (1.6–2.5 Amps), preferably Allen-Bradley type 193 BSB 22; a soft start controller 1009, preferably Baldor/Lectron type D70CA' two contactors 1010, size 0, 24 VDC coil ABOV, 3 Phase, preferably Allen-Bradley type 100-A09-ND3; and electric clutch and brake 1007, Ultra Fase, 90V, preferably Warner Electric Brake & Clutch type MCS-124; seven relays 1006, each 4 poles, 24 VDC Coil, preferably Allen-Bradley type 700DCP400Z24; and one relay 1035, 8 poles, 24 VDC coil, preferably Allen-Bradley type 700 DC PK800224. Moreover, the panel 1002 supports a motor speed controller 1005, preferably Camco type 601 RDM; an SLC-150 programmable controller expansion unit 1004, preferably Allen-Bradley type 1745-E153; and an SLC-150 programmable controller processor unit 1003, preferably Allen-Bradley type 1745-LP153.

A preferred physical layout of the machine's control console is shown in FIG. 38. A pedestal base 1050 secured to the floor supports a pedestal column 1051 that is topped with an operator's console 1052. The operator's console 1052 has prepunched holes to mount lights, pushbutton switches, and selector switches, all of which are available from Allen-Bradley. The operator's console 1052 houses a selector switch 1053, 3-Position, 2 N.O./2 N.C., preferably Allen-Bradley type 800T-KC7B; three selector switches 1054–1056, 2-Position, 2 N.O./2 N.C., preferably Allen-Bradley type 800T-H28' two pushbutton switches 1057, 1058 type black head, 2 N.O./2 N.C., preferably Allen-Bradley type 800T-A26; three pushbutton switches 1059–1061 start type, flush, green, 1 N.O./1 N.C. preferably Allen-Bradley type 800T-A1A; three pushbutton switches 1062–1064, stop type, extended head, red, 1 N.O./1 N.C. preferably Allen-Bradley type type 800T-B6A; a pushbutton switch 1065, mushroom head, push-to-stop/pull-to-enable, preferably Allen-Bradley type 800T-FX6A5; a light 1066, indicating amber type, 24 VDC, push-to-test, preferably Allen-Bradley type 800T-QT4A; two lights, 1067, 1068, indicating green type, 24 VDC, push-to-test, preferably Allen-Bradley type 800T-QT24C; and four lights 1069–1072, indicating red type, 24 VDC, push-to-test, preferably Allen-Bradley type 800T-QT24R.

The remaining electrical components (exclusive of interconnection wiring) are mounted to the punch press and to the conveyor and are shown in FIG. 39. Emergency pushbutton switches 1103–1106 for turning the machine off are distributed at all quadrants of the machine. Limit switches 1110–1135 detect the following conditions:

| | |
|---|---|
| 1110 | Safety Interlock 1 |
| 1111 | Drill #2 Backward |
| 1112 | Drill #2 Forward |
| 1113 | Demand Press Cam |
| 1114 | Conveyor Overload |
| 1115 | Board Sense Station #2 Empty |
| 1116 | Board Sense Station #2 Jam |
| 1117 | Board Sense Station #4 Jam |
| 1118 | Board Sense Station #4 Empty |
| 1119–1122 | Tool Detect Holes A Forward |
| 1123–1126 | Tool Detect Holes B Forward |
| 1127–1128 | Tool Detect Holes A Back |
| 1131, 1132 | Tool detect Holes B Back |
| 1129, 1130, 1133, 1134 | |
| 1135 | Conveyor Dwell Cam |

The solenoid values 1140–1149 control the following:

| | |
|---|---|
| 1140 | Detents 1 UP |
| 1141 | Detents 2 and 3 UP |
| 1142 | Detent 4 UP |
| 1143 | Detent 5 UP |
| 1144 | Detent W1 UP |
| 1145 | Detent W2 UP |
| 1146 | Drill #2 Forward |
| 1147 | Drill #1 Forward |
| 1148 | Tool Detect A Forward |
| 1149 | Tool Detect B Forward |

Conveyor junction box 1153 and detent junction box 1154 collect some of the interconnecting wiring. Receptacle 1160 and 1161 respectively pluggably connect actuating power to the drill motors. Safety interlocks and 1171 are provided. A pressure switch 1180 monitors pneumatic pressure.

The detent "up" position detectors 1200–1204 and 1210–1211 monitor the "up" positions of the respective normal- and wide-board detents, as indicated. The detent "down" position detectors 1220–1224 and 1230–1231 monitor the "down" positions of the respective normal- and wide-board detents, as illustrated.

The entire machine, including its conveyor, operates under control of a program running in the (PCL 1003. The program serves to control the conveyor, the punch, the drills, and the hole-checking mechanism.

The conveyor moves the board 18" in the feed direction during the index period. The conveyor allows the board to remain stationary at each of five (5) stations during the dwell period. The time required to index the board is equal to the time the board dwells at each station. The index period is defined as 180°.

TINDEX=TDWELL (seconds)

The time required to index plus the time at dwell is equal to one cycle.

TINDEX+TDWELL=TCYCLE

At maximum production rates:

TINDEX=TDWELL=0.6 sec

TCYCLE=0.6 sec+0.6 sec=1.2 sec or 50 boards/minute

The boards are indexed through the following five stations.

At Station 1, which defines the loading zone $Z_1$, one board is loaded onto conveyor.

At Station 2, which defines the sensing zone $Z_2$, the following three conditions are checked. First, it is checked whether no board is present. Next, it is checked whether one board is present and properly positioned (the goal). Finally, it is checked whether two boards are present or one board is improperly positioned (jam condition).

At Station 3, which defines the punching zone which defines the punching $Z_3$, up to 99 holes are punched through the board, in two or more linear arrays.

At Station 4, which defines the drilling zone the board is checked for proper positioning during the index period, and the board is drilled with 0, 2 or 4 blind holes in each end during the dwell period.

At Station 5, which defines the inspecting zone $Z_5$, the drilled, blind holes are checked for presence and proper depth.

The boards are offloaded at a "half station", which defines the unloading zone $Z_6$, at the end of the conveyor.

Figure 40:
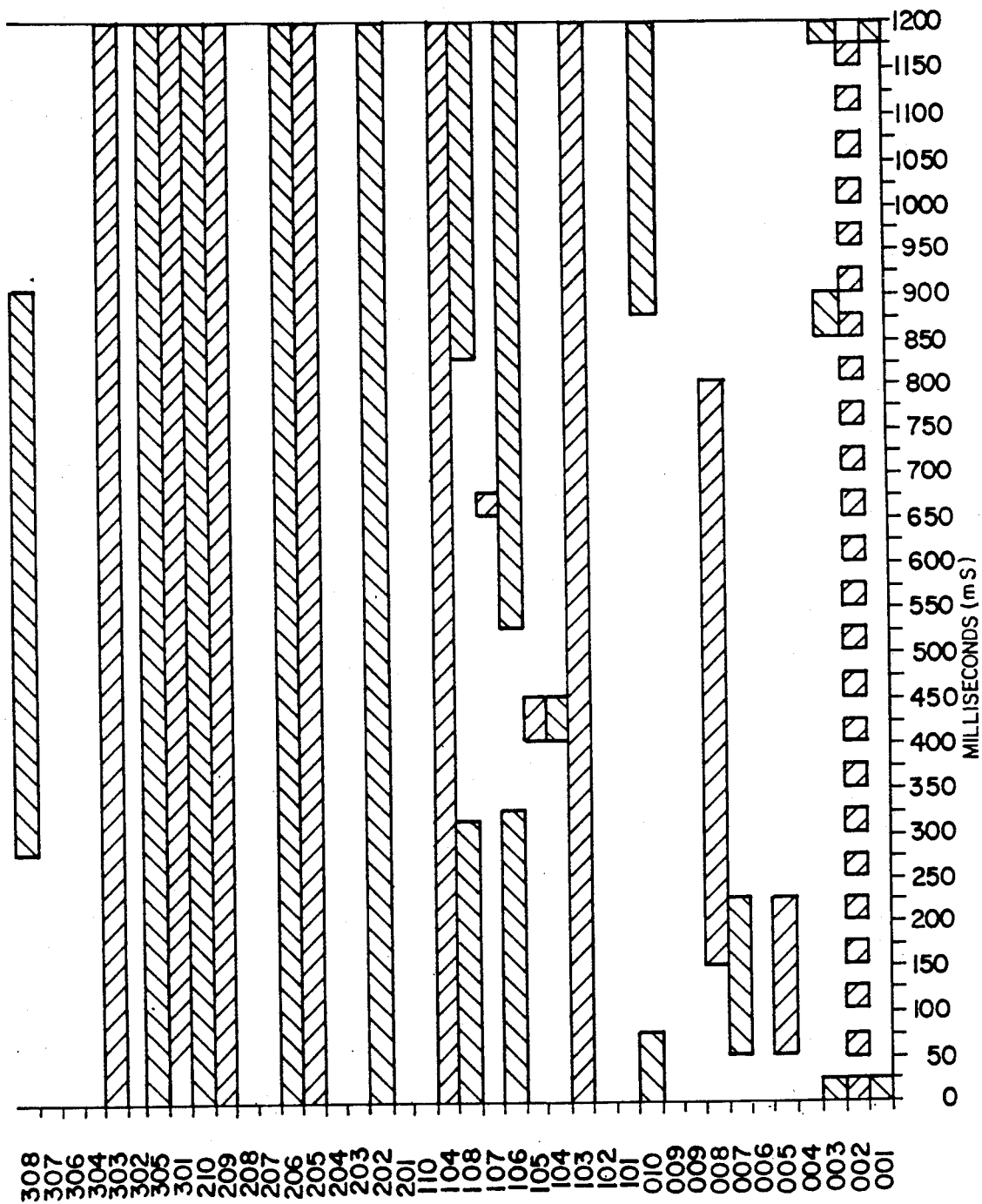
FIGS. 40 and 41 are timing diagrams for the same apparatus.

The input signals to the (PCL 1003—that permit this control to transpire, as designated in FIG. 40, are as follows.

Input signal 1301 indicates "PRESS TOP OF STROKE". A proximity sensor (not shown, on press) inputs a positive voltage when the press is at the top of its stroke (0°±10°)

Input signal 1302 indicates "PRESS ANGLE COUNTER". A proximity sensor (not shown, on press) inputs a positive voltage at each notch on a square tooth wheel. The shaft angle is encoded at 40 counts per revolution.

Input signal 1303 indicates "END DWELL AND DEMAND PRESS CAM". A normally open (N/O) limit switch closes when the conveyor is leaving the dwell period and half-way through the index period.

Input signal 1304 indicates "CONVEYOR OVERLOAD". A normally closed (N/C) limit switch 1114 opens when conveyor drive torque exceeds 2,000 inch lbs., indicating a conveyor fault (0 voltage).

Input signal 1305 indicates "BOARD SENSE #1 EMPTY". A normally closed (N/C) limit switch 1115 opens when no board is present beneath detector roller at section 2 (0 voltage)

Input signal 1306 indicates "BOARD SENSE JAM". Two (2) normally closed (N/C) limit switches 1116, 1117 are connected in series. One or both switches (stations 2 and 4) open if a jam occurs or if (2) boards are loaded into one conveyor slot (0 voltage).

Input signal 1307 indicates "BOARD SENSE #2 EMPTY". A normally closed (N/C) limit switch 1118 opens with no board is present beneath sensing roller at station 4 (0 voltage).

Input signal 1308 indicates "BOARD DETENTS 1, 2, 3, 4, and 5 UP". Each detent switch 1200–1203 inputs a positive voltage when (5) Hall-effect switches (ganged) detect the associated magnetic pistons of (5) air cylinders, indicating that the board detents are in place to accept narrow boards.

Input signal 1309 indicates "BOARD DETENTS 6 and 7 UP". Each detent switch 1210 and 1211 inputs a positive voltage when (2) Hall-effect switches (ganged) detect the associated magnetic pistons of (2) air cylinders, thereby indicating that the board detents are in place to accept wide boards.

Input signal 1310 indicates BOARD DETENTS 1, 2, 3, 4, 5, 6, and 7 DOWN". Each detent switch 1220–1223 and 1230, 1231 inputs a positive voltage when (7) Hall-effect switches (ganged) detect the associated magnetic pistons of (7) air cylinders, thereby indicating that all board detents are retracted and ready for conveyor to index.

Input signal 1401 indicates "SELECT 0 HOLES DRILL". This signal is a positive voltage when the 3-position selector switch 1053 on the operators console 1052 labeled "DRILLS SELECT" is set to "0". In this state, the (PCL 1003 does not activate output signal 1716 ("DRILLS FORWARD"), output signal 2012 ("TOOL DETECT A FORWARD"), or output signal 2013 ("TOOL DETECT B FORWARD"). The (PCL 1003 monitors input signal 1406 ("TOOL DETECT A AND B BACK") and signal 1408 ("DRILL 1 AND 2 BACK")/

Input signal 1402 indicate select "2 HOLES DRILL". This signal is a positive voltage when the 3-position selector switch 1053 on the operator's console 1052 labeled "DRILLS SELECT" is set to "2". In this sate, the (PCL 1003 activates output signal 116 ("DRILLS FORWARD"), 1407 ("DRILL FORWARD"), 1408 ("DRILL BACK"), and 1406 ("TOOL DETECTS BACK)".

Input signal 1403 indicates "SELECT 4 HOLES DRILL". This signal is a positive voltage when the 3-position selector switch 1053 on the operators console 1052 labeled "DRILLS SELECT" is set to "4". In this state, the (PCL 1003 activates output signals 1716 ("DRILLS FORWARD"), 2012 ("TOOL DETECT A FORWARD) and 2013 ("TOOL DETECT B FOR- WARD"), and 1406 ("TOOL DETECTS A AND B BACK").

Input signal 1404 indicates "TOOL DETECT A FORWARD". Four (4) normally open (N/O) limit switches 1119–1122 close when pistons and pins actuated by output signal 2012 ("TOOL DETECT A FORWARD") verify the presence and depth of holes "A:.

Input signal 1405 indicates "TOOL DETECT B FORWARD". Four (4) normally open (N/O) limit switches 1123–1126 close when pistons and pins actuated by output signal 2013 ("TOOL DETECT B FORWARD") verify the presence and depth of holes "B".

Input signal 1406 indicates "TOOL DETECT A & B BACK". Eight (8) normally open (N/O) limit switches 1127–1134 close when pistons and pins actuated by output signals 2012 ("TOOL DETECTS A FORWARD") and 2013 ("TOOL DETECT B FORWARD") are fully retracted and ready for the conveyor to index.

Input signal 1407 indicates "DRILLS 1 & 2 FORWARD". This signal is a positive voltage when (2) Hal-effect switches (ganged) detect the associated magnetic pistons of air cylinders, thereby indicating that drill heads 1 and 2 have reached their forward travel limits.

Input signal 1408 indicates "DRILLS 1 & 2 BACK". This signal is a positive voltage when two Hall-effect switches (ganged) detect the associated magnetic pistons of two air cylinders, thereby indicating that drill heads 1 and 2 have retracted fully and are ready for the conveyor to index.

Input signal 1409 indicates "NARROW/WIDE SELECTOR". This signal is a positive voltage when the 2-position selector switch 1054 on the operator console labeled "BOARD SELECT" is set to "NARROW". In this state, the (PCL 1003 actuates output signal 1711 detent 1–5. It monitors input signals 1308 ("DETENTS 1 & 5 UP") and 1310 ("DETENTS 1-5 DOWN").

Input signal 1410 indicates "CYCLE START BUTTON". This signal is a positive voltage when the cycle start pushbutton 1064 on the operator's console 1052 is depressed. If all conditions are ready (cycle ready light lit) then the (PCL 1003 initiates machine cycling.

Input signal 1501 indicates "CYCLE STOP BUTTON". This signal is a positive voltage when, the cycle stop pushbutton 1061 on the operator's console 1052 is depressed. The (PCL 1003 will allow the present cycle to be completed and will then inhibit further machine cycling.

Input signal 1502 indicates "AUTO/MANUAL SELECTOR". This signal is a positive voltage when the cycle switch 1056 on the operator's console 1052 is set to "AUTO". If all conditions are ready, the (PCL 1003 will respond with the cycle ready light 1068, at which time the cycle start pushbutton switch 1064 can initiate cycling.

Input signal 1503 indicates "CONVEYOR INCH". This signal is a positive voltage when the conveyor inch pushbutton 1057 on the operator's console 1052 is depressed. The press must be in "INCH" mode, and both the press and conveyor must be in "MANUAL" mode with the conveyor motor running. The conveyor is jogged by output signal 2014 conveyor clutch when the conveyor inch pushbutton switch 1057 is depressed.

Input signal 1504 indicates "EMERGENCY STOP AND INTERLOCKS FEED-BACK." It is a zero voltage when the emergency stop button 1065 on the operator's console ,2 is depressed, or when the normally closed (N/C) interlock switches 1103–1106 are open.

Input signal 1505 indicates "DRILL MOTORS FEED-BACK". It is a positive voltage when the drill motors 1150, 1151, are energized.

Input signal 1506 indicates "CONVEYOR MOTOR FEED-BACK". It is a positive voltage when the conveyor motor 1153 is energized.

Input signal 1507 indicates "PRESS-IN-INCH-MODE FEED-BACK". It is a positive voltage when the press selector switch (not shown) on the press is set to "INCH" mode.

Input signal 1508 indicates "PRESS-IN-SINGLE-STROKE-MODE FEED-BACK". It is a positive voltage when the press selector switch (not shown) on the press is set to "SINGLE STROKE" mode.

Input signal 1509 indicates "PRESS-IN-CONTINUOUS-MODE FEED-BACK". It is a positive voltage when the press selector switch (not shown on the press) is set to "CONTINUOUS" mode.

Input signal 1510 indicates "AIR PRESSURE OK". It is a positive voltage when the air pressure detected by pressure sensor 1180 is above 70 psig.

Input signal 1601 "SAFETY INTERLOCK #1". It is an 0 voltage when a magnetic reed switch detects the opening of a safety door (not shown). This switch is a back-up for limit switch interlocks on the safety doors of the control panel.

Input signal 1602 indicates "SELECT DRILL ONLY". It is a positive voltage when the switch 1055 on the operator's console 1052 labeled "FUNCTION SELECT" is set to "DRILL ONLY". The conveyor operates as normal, but does not demand a press cycle, and the press must be stopped on top.

Input signal 1603 indicates "PRESS MOTOR ON FEED-BACK". It is a positive voltage when the motor (not shown) of the press) is energized.

Input signal 1604 indicates "RESET PUSHBUTTON". It is a positive voltage when the pushbutton 1058 on the operator's console 1052 labeled "RESET" is pressed. This energizes the system at power up and signals an update of status lights on the console to reflect any changed status; i.e., achknowledge removal of board jam, etc.

Input signal 1605 indicates "SAFETY INTERLOCK #2". It is an 0 voltage when a Hall-effect switch detects the opening of a safety door (not shown). This switch is a back-up for limit switch interlocks on the safety doors of the control panel.

Input signal 1606 indicates "PRESS NOT CYCLING FEED-BACK". It is a positive voltage when the press has stopped cycling.

Input signal 1607 indicates "PRESS-FAULT EMERGENCY FEED-BACK". It is a positive voltage when the press has stopped for an emergency condition.

Input signal 1608 indicates "CONVEYOR DWELL CAM FEED-BACK". It is a positive voltage when a normally open (N/O) limit switch 1135 is engaged by the cam on indexer only when the conveyor is at dwell.

The output signals produced by the (PCL 1003, as designated in 41, are as follows.

Output signal 1711 controls "DETENT 1, 2, 3 4, and 5 UP (NARROW BOARD)". When energized, four 24 VDC solenoid valves 1040–1043 activate air cylinders to position narrow boards in the conveyor. The solenoid valves are de-energized to retract the detents.

Output signal 1712 controls "DETENT W1 and W2 UP (WIDE BOARD)". When energized, two 24 VDC solenoid valves 1134, 1135, activate air cylinders to position wide boards in the conveyor. The solenoid valves are de-energized to retract the detents.

Output signal 1713 controls "DRILL MOTOR 1 & 2 ENABLE". This signal will energize motor 1150 to allow the two 480 vac 3-phase drill motors 1150, 1151, to be started only by the manual pushbutton 1062 on operators console 1052 that is labeled "DRILLS START".

The drill motors 1150, 1151, can be stopped by manual pushbutton 1059, on operator's console 1052 labeled "drills stop", or by manual pushbutton 1065 labeled "E-STOP".

Output signal 1714 controls "CONVEYOR MOTOR ENABLE". This signal energizes a relay M2 for motor 1152 to allow this 90 VDC conveyor motor to be started only by the manual pushbutton 1063 on the operator's console 1052 labeled "CONVEYOR START".

The conveyor motor 1053 can be stopped by manual pushbutton 1060 on the operator's console 1052 labeled "CONVEYOR STOP", or by manual pushbutton 1065 labeled "E-STOP".

Output signal 1715 controls "DEMAND PRESS CYCLE". This signal initiates continuous cycling of press The press is initially stopped on top (0°)

When cycling, the press can be stopped by (a) de-energizing output signal 2015 (press "E-STOP") to thereby cause immediate (25 to 50 ms) stoppage by disengaging the press clutch and energizing its brake, or (b) energizing output signal 2016 (press "CYCLE STOP) to cause the press to stop on top (0°), or (c) pressing the "E-STOP" pushbutton (not shown) on the press, which stops the press and which interrupts the power to the press motor (not shown), or (d) pressing the "TOP STOP" button (not shown) on the press, which stops the press at top (0°), or (e) pressing the "CLUTCH STOP" button (not shown) on the press, which stops the press immediately, or (f) depressing the "MOTOR STOP" button (not shown) on the press.

Output signal 1716 indicates "DRILLS FORWARD". When energized, two solenoid valves 1146, 1147, activate air cylinders to move the drill heads forward, beginning a drill sequence. De-energizing the solenoids causes the drill heads to retract.

Output signal 1811 indicates "PRESS INCH ENABLE". When energized, this signal permits the press to inch using that pushbutton on the side of the press console that is labeled "INCH" (not shown).

Output signal 1812 indicates "PRESS SINGLE STROKE ENABLE". When energized, this signal permits the press to single stroke on demand by pressing that pushbutton on the side of the press console marked "SINGLE STROKE" (not shown). Releasing the pushbutton between 0° and 180° immediately stops the press. Holding the pushbutton in until passing 180 will stop the press on top 0°. Releasing the pushbutton before sliding past 180° will de-activate the single stroke mode. To re-activate the single stroke mode, the inch mode is used to inch the press to a point just past top.

Output signal 1813 indicates "PRESS CONTINUOUS ENABLE". When energized, this signal permits the press to run continuously in response to the "conveyor motor enable" signal 1714 (if the press and the conveyor have "AUTO" selected), or by pressing "CONTINUOUS SETUP" and then pressing both "CONTINUOUS" buttons simultaneously (if the press has "MANUAL" selected and the conveyor has "AUTO" selected).

Output signal 1814 indicates "PRESS CONTINUOUS SETUP". When energized, this signal permits output signal 1715 ("DEMAND PRESS") to start the press cycling.

Output signal 1911 indicates "FAULT LIGHT 1 (BOARD FAULT)". It turns on a light 1071 on the operator's console 1052 labeled "BOARD FAULT" when a board jam condition is detected at station 2 or 4 (input signal 1306).

Output signal 1912 indicates "FAULT LIGHT 2 (DRILL FAULT)". It turns on a light 1069 on the operator's console 1052 labeled "DRILL FAULT" when (a) drill motors are not running when required, or (b) drill unit forward-to-limit time is up, or (c) drill unit return to back position time is up, or the (d) tool detect a or b finds missing holes at station 5.

Output signal 1913 indicates "FAULT LIGHT 3 (PRESS FAULT)". It turns on a light 1072 on the operator's console 1052 labeled "PRESS FAULT" when (a) the press and conveyor are too far out of synchronization or (b) the press switches are not set for continuous operation. The light 1072 blinks when the press is at top of stroke (0°) when it is set for "INCH" or "SINGLE STROKE" mode.

Output signal 1914 indicates "FAULT LIGHT 4 (CONVEYOR FAULT)". It turns on a light 1070 on the operator's console 1052 labeled "CONVEYOR FAULT" when (a) the conveyor overload switch is activated (disabling conveyor clutch and press in "AUTOMATIC" mode) or (b) the detent up or down switches time out or malfunction.

Output signal 1915 indicates "STATUS LIGHT 1 (CYCLE READY)". It turns on a light 1068 on the operator's console 1052 labeled "CYCLE READY" when the conveyor and press are ready to begin processing boards. The signal is conditional on the press selector switch "AUTO/MANUAL" being set to "AUTO".

Output signal 1916 controls "STATUS LIGHT 2 (RUN LIGHT)". It turns on a light 1067 on the operator's console 1052 labeled "RUN" when the conveyor and press are processing boards.

Output signal 2011 indicates "CONVEYOR CLUTCH ENGAGE". When energized, it causes the clutch between the conveyor motor 1152 and the speed reducer to engage, causing indexer to cycle. It cannot be energized unless the conveyor motor 1152 is running. When de-energized, a brake automatically engages.

Output signal 2012 indicates "TOOL DETECT A FORWARD". When energized, one 24 VDC solenoid valve 1148 activates pistons and pins which verify hole "A" presence. The signal is energized only when drills selector switch 1053 on the operator's console 1052 is set to (a) "2 HOLES DRILL" or (b) "4 HOLES DRILL". The signal is de-energized to retract the drills.

Output signal 2013 indicates "TOOL DETECT B FORWARD". When energized, one 24 VDC solenoid valve 1149 activates pistons and pins which verify hole "B" presence. This signal is energized only when the drill selector is set to "4 HOLES DRILL". This signal is de-energized to retract the drills the drills.

Output signal 2014 indicates "STATUS LIGHT 3 (AIR PRESSURE OK)". It turns on a light 1066 on the operator's console 1052 labeled "AIR PRESSURE OK". When the air pressure is sufficient, the input signal 1510 gives an "OK" signal. The light turns off when the air pressure drops below 70 psi.

Output signal 2015 indicates "PRESS EMERGENCY". The signal is de-energized to stop the press immediately (in 25 to 50 ms). It is so de-energized for the following conditions:

a. Drill time out error.
  b. Tool detect time out error.
  c. Conveyor over-load input signal 1304 press 0° to 180°.
  d. Board jam input signal 1306.
  e. Detents time out error.
  f. Safety interlock 1 input signal 1601.
  g. Safety interlock 2 input signal 1602.
  h. E-stop pushbutton input signal 1504.
  i. Press emergency shut down input signal 1607.
  j. Press faster than conveyor.

Output signal 316 indicates "PRESS CYCLE STOP". When this signal is energized, it stops the press at top of cycle. It is so energized for the following conditions:

a. Detents down time out.
  b. Low air pressure input signal 1510.
  c. Tool a or b forward or a and b back time out error.
  d. Drill motors not running when needed (2 or 4 holes)
  e. Drill time out error.
  f. Conveyor overload input signal 1304 with press past 180° C.
  g. Cycle stop button pressed input signal 1501.
  h. Clutch disengaged for more than 2 seconds.
  i. Press running and no board at station 2.

With the signals so defined, the input conditions for machine startup are defined by the following Table 1, in which each input signal is designated by 1300 in excess of its designation in FIG. 40:

TABLE 1

| INPUT CONDITIONS FOR MANUAL OPERATION | | | | |
|---|---|---|---|---|
| | INPUT NAME | POSITION | VOLTAGE | STATE |
| 1301 | PRESS TOP OF STROKE | ON -OR- OFF | +24 -OR- 0 | 1 -OR- 0 |
| 1302 | PRESS ANGLE COUNTER | ON -OR- OFF | +24 -OR- 0 | 1 -OR- 0 |
| 1303 | END DWELL/DEMAND PRESS | ON -OR- OFF | +24 -OR- 0 | 1 -OR- 0 |
| 1304 | CONVEYOR OVER/LOAD | ON -OR- OFF | 0 -OR- +24 | 1 -OR- 0 |
| 1305 | BOARD SENSE #1 EMPTY | ON -OR- OFF | 0 -OR- +24 | 1 -OR- 0 |
| 1306 | BOARD SENSE JAM | OFF | +24 | 0 |
| 1307 | BOARD SENSE #2 EMPTY | ON -OR- OFF | 0 -OR- +24 | 1 -OR- 0 |
| 1308 | BOARD DETENT 1-5 UP | OFF | 0 | 0 |
| 1309 | BOARD DETENT W1 & W2 UP | OFF | 0 | 0 |
| 1310 | BOARD DETENTS ALL DOWN | ON | +24 | 1 |
| 1401 | SELECT 0 HOLES DRILL | OFF -OR- ON | 0 -OR- +24 | 0 -OR- 1 |
| 1402 | SELECT 2 HOLES DRILL | OFF -OR- ON | 0 -OR- +24 | 0 -OR- 1 |
| 1403 | SELECT 4 HOLES DRILL | OFF -OR- | 0 -OR- | 0 -OR- |

TABLE 1-continued

| INPUT CONDITIONS FOR MANUAL OPERATION | | | | |
|---|---|---|---|---|
| | INPUT NAME | POSITION | VOLTAGE | STATE |
| | | ON | +24 | 1 |
| 1404 | TOOL DETECT A FWD | OFF | 0 | 0 |
| 1405 | TOOL DETECT B FWD | OFF | 0 | 0 |
| 1406 | TOOL DETECT A & B BACK | ON | +24 | 1 |
| 1407 | DRILL FWD | OFF | 0 | 0 |
| 1408 | DRILL BACK | ON | +24 | 1 |
| 1409 | NARROW/WIDE SELECT | OFF (WD) -OR- ON | 0 -OR- +24 | 0 -OR- 1 |
| 1410 | CYCLE START BUTTON | OFF | 0 | 0 |
| 1501 | CYCLE STOP BUTTON | OFF | +24 | 0 |
| 1502 | AUTO/MAN SELECTOR | ON = AUTO | +24 | 1 |
| 1503 | CONVEYOR INCH BUTTON | OFF | 0 | 0 |
| 1504 | E-STOP/INTERLOCKS | OFF | +24 | 0 |
| 1505 | DRILL MOTORS 'ON' | ON | +24 | 1 |
| 1506 | CONVEYOR MOTOR 'ON' | ON | +24 | 1 |
| 1507 | PRESS SSW = 'INCH' | OFF | 0 | 0 |
| 1508 | PRESS SSW = 'SINGLE' | OFF | 0 | 0 |
| 1509 | PRESS SSW = 'CONTINUOUS' | ON | +24 | 1 |
| 1510 | AIR PRESSURE | ON | +24 | 1 |
| 1601 | SAFETY INTERLOCK #1 | ON | +24 | 1 |
| 1602 | DRILL ONLY SSW | OFF -OR- ON | 0 -OR- +24 | 0 -OR- 1 |
| 1603 | PRESS MOTOR 'ON' | ON | +24 | 1 |
| 1604 | RESET | OFF | 0 | 0 |
| 1605 | SAFETY INTERLOCK #2 | ON | +24 | 1 |
| 1606 | PRESS NOT CYCLING | ON | +24 | 1 |
| 1607 | PRESS STOPPED EMERG-F/B | OFF | +24 | 0 |
| 1608 | CONVEYOR DWELL CAM | ON | +24 | 1 |

Figure 41:
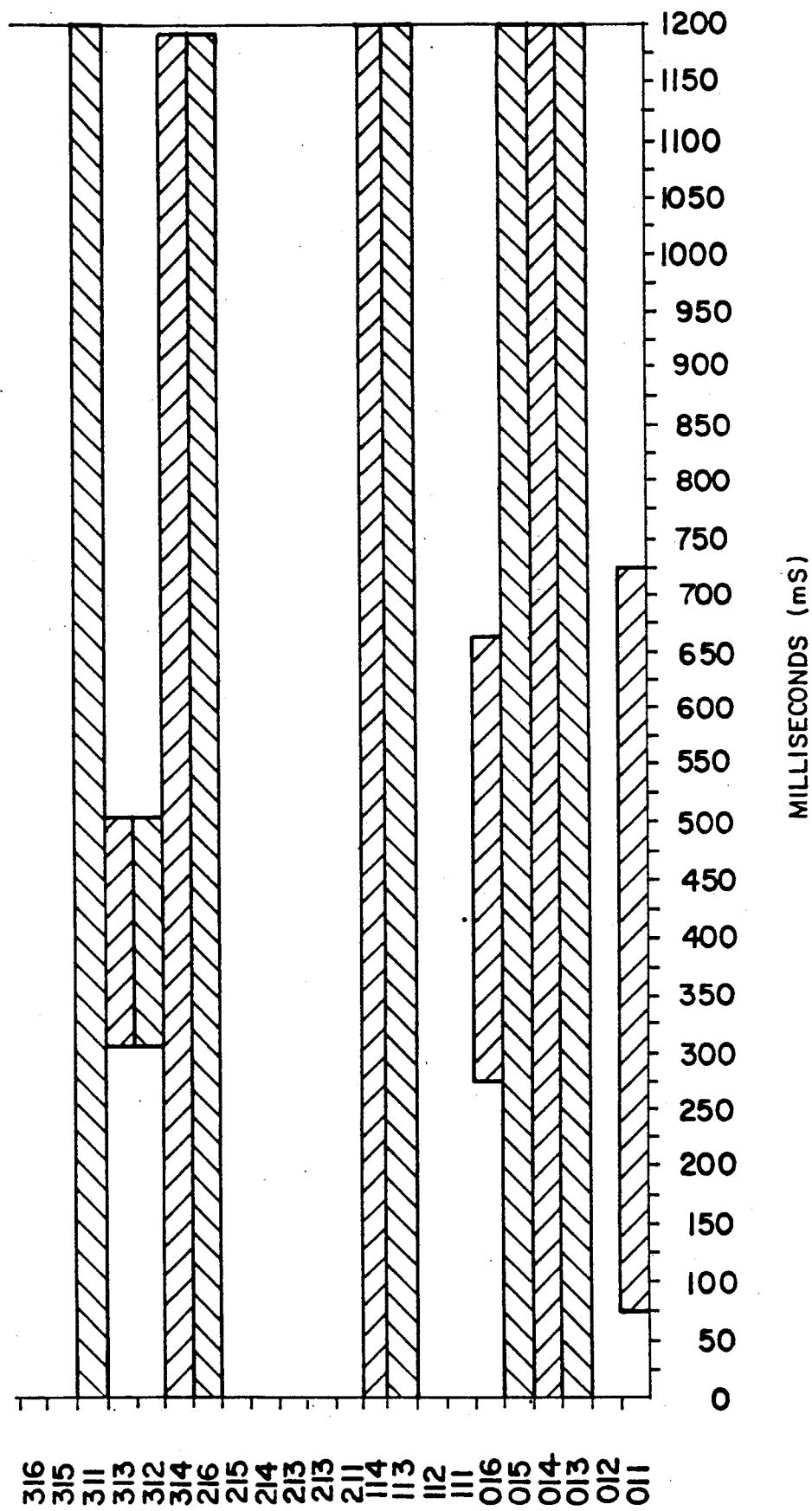

At such time as machine startup is enabled, the output signals will be generated are as shown in the following Table 2, in which each output signal is designated by 1700 plus its designation in FIG. 41:

TABLE 2

| OUTPUT CONDITIONS FOR MACHINE STARTUP | | | | | |
|---|---|---|---|---|---|
| | OUTPUT NAME | | POSITION | VOLTAGE | STATE |
| 1711 | DETENT 1-5 UP | (SV1-4) | DOWN | 0 | 0 |
| 1712 | DETENT W1 & W2 UP | (SV5-6) | DOWN | 0 | 0 |
| 1713 | DRILL MOTORS ENABLE | (1M) | ON | +24 | 1 |
| 1714 | CONVEYOR MOTOR ENABLE | (2M) | ON | +24 | 1 |
| 1715 | DEMAND PRESS CYCLE | (CR 62) | OFF | 0 | 0 |
| 1716 | DRILLS FORWARD | (SV7-8) | BACK | 0 | 0 |
| 1811 | MANUAL PRESS INCH ENABLE | (CR 66) | OFF | 0 | 0 |
| 1812 | PRESS SINGLE STROKE ENABLE | (CR 68) | OFF | 0 | 0 |
| 1813 | PRESS CONTINUOUS ENABLE | (CR 70) | ON | +24 | 1 |
| 1814 | PRESS CONTINUOUS SETUP | (CR 72) | OFF | 0 | 0 |
| 1911 | BOARD FAULT LIGHT 1 | | OFF | 0 | 0 |
| 1912 | DRILL FAULT LIGHT 2 | | OFF | 0 | 0 |

TABLE 2-continued

| OUTPUT CONDITIONS FOR MACHINE STARTUP | | | | |
|---|---|---|---|---|
| | OUTPUT NAME | | POSITION | VOLTAGE | STATE |
| 1913 | PRESS FAULT LIGHT 3 | | OFF | 0 | 0 |
| 1914 | CONVEYOR FAULT LIGHT 4 | | OFF | 0 | 0 |
| 1915 | CYCLE READY LIGHT | | ON | +24 | 1 |
| 1916 | RUN LIGHT | | OFF | 0 | 0 |
| 2011 | CONV CLUTCH ENGAGE | (CR 122) | OFF | 0 | 0 |
| 1012 | TOOL DETECT A FWD | (SV7) | BACK | 0 | 0 |
| 2013 | TOOL DETECT B FWD | (SV8) | BACK | 0 | 0 |
| 2014 | AIR PRESSURE OK LIGHT | | ON | +24 | 1 |
| 2015 | PRESS-EMERG STOP | (CR 124) | OFF | 0 | 0 |
| 2016 | PRESS-CYCLE STOP | (CR 126) | OFF | 0 | 0 |

This machine can be manually operated, or cycled. The input signal conditions for manual operation are as shown in the following Table 3, in which each input signal is designated by 1300 plus its designation in FIG. 40:

TABLE 3

| INPUT CONDITIONS FOR MANUAL OPERATION | | | | |
|---|---|---|---|---|
| | INPUT NAME | POSITION | VOLTAGE | STATE |
| 1301 | PRESS TOP OF STROKE | ON -OR- OFF | +24 -OR- 0 | 1 -OR- 0 |
| 1302 | PRESS ANGLE COUNTER | ON -OR- OFF | +24 -OR- 0 | 1 -OR- 0 |
| 1303 | END DWELL/DEMAND PRESS | ON -OR- OFF | +24 -OR- 0 | 1 -OR- 0 |
| 1304 | CONVEYOR OVER/LOAD | ON -OR- OFF | 0 -OR- +24 | 1 -OR- 0 |
| 1305 | BOARD SENSE #1 EMPTY | ON -OR- OFF | 0 -OR- +24 | 1 -OR- 0 |
| 1306 | BOARD SENSE JAM | OFF | +24 | 0 |
| 1307 | BOARD SENSE #2 EMPTY | ON -OR- OFF | 0 -OR- +24 | 1 -OR- 0 |
| 1308 | BOARD DETENT 1-5 UP | OFF | 0 | 0 |
| 1309 | BOARD DETENT W1 & W2 UP | OFF | 0 | 0 |
| 1310 | BOARD DETENTS ALL DOWN | ON | +24 | 1 |
| 1401 | SELECT 0 HOLES DRILL | OFF -OR- ON | 0 -OR- +24 | 0 -OR- 1 |
| 1402 | SELECT 2 HOLES DRILL | OFF -OR- ON | 0 -OR- +24 | 0 -OR- 1 |
| 1403 | SELECT 4 HOLES DRILL | OFF -OR- ON | 0 -OR- +24 | 0 -OR- 1 |
| 1404 | TOOL DETECT A FWD | OFF | 0 | 0 |
| 1405 | TOOL DETECT B FWD | OFF | 0 | 0 |
| 1406 | TOOL DETECT A & B BACK | ON | +24 | 1 |
| 1407 | DRILL FWD | OFF | 0 | 0 |
| 1408 | DRILL BACK | ON | +24 | 1 |
| 1409 | NARROW/WIDE SELECT | OFF (WD) -OR- ON | 0 -OR- +24 | 0 -OR- 1 |

TABLE 3-continued

| INPUT CONDITIONS FOR MANUAL OPERATION | | | | |
|---|---|---|---|---|
| | INPUT NAME | POSITION | VOLTAGE | STATE |
| 1410 | CYCLE START BUTTON | OFF | 0 | 0 |
| 1501 | CYCLE STOP BUTTON | OFF | +24 | 0 |
| 1502 | AUTO/MAN SELECTOR | OFF = MANUAL | 0 | 0 |
| 1503 | CONVEYOR INCH BUTTON | OFF -OR- ON | 0 -OR- +24 | 0 -OR- 1 |
| 1504 | E-STOP/INTERLOCKS | OFF | +24 | 0 |
| 1505 | DRILL MOTORS 'ON' | ON -OR- OFF | +24 -OR- 0 | 1 -OR- 0 |
| 1056 | CONVEYOR MOTOR 'ON' | ON -OR- OFF | +24 -OR- 0 | 1 -OR- 0 |
| 1507 | PRESS SSW = 'INCH' | ON -OR- OFF | +24 -OR- 0 | 1 -OR- 0 |
| 1508 | PRESS SSW = 'SINGLE' | ON -OR- OFF | +24 -OR- 0 | 1 -OR- 0 |
| 1509 | PRESS SSW = 'CONTINUOUS' | OFF | 0 | 0 |
| 1510 | AIR PRESSURE | ON | +24 | 1 |
| 1601 | SAFETY INTERLOCK #1 | ON | +24 | 1 |
| 1602 | DRILL ONLY SSW | OFF -OR- ON | 0 -OR- +24 | 0 -OR- 1 |
| 1603 | PRESS MOTOR 'ON' | OFF -OR- ON | 0 -OR- +24 | 0 -OR- 1 |
| 1604 | RESET | OFF | 0 | 0 |
| 1605 | SAFETY INTERLOCK #2 | ON | +24 | 1 |
| 1606 | PRESS NOT CYCLING | ON | +24 | 1 |
| 1607 | PRESS FAULT EMERG-STOP | OFF | 0 | 0 |
| 1608 | CONVEYOR DWELL CAM | ON | +24 | 1 |

During manual operation the output signal conditions will be as shown in the following Table 4, in which each output signal is designated by 1700 plus its designation in FIG. 41:

TABLE 4

| OUTPUT CONDITIONS FOR MANUAL OPERATION | | | | | |
|---|---|---|---|---|---|
| | OUTPUT NAME | | POSITION | VOLTAGE | STATE |
| 1711 | DETENT 1-5 UP | (SV1-4) | DOWN | 0 | 0 |
| 1712 | DETENT W1 & W2 UP | (SV5-6) | DOWN | 0 | 0 |
| 1713 | DRILL MOTORS ENABLE | (1M) | ON | +24 | 1 |
| 1714 | CONVEYOR MOTOR ENABLE | (2M) | ON | +24 | 1 |
| 1715 | DEMAND PRESS CYCLE | (CR 62) | OFF | 0 | 0 |
| 1716 | DRILLS FORWARD | (SV7-8) | BACK | 0 | 0 |
| 1811 | MANUAL PRESS INCH ENABLE | (CR 66) | ON/ OFF | +24/ 0 | 1/ 0 |
| 1812 | PRESS SINGLE STROKE ENABLE | (CR 68) | ON/ OFF | +24/ 0 | 1/ 0 |
| 1813 | PRESS CONTINUOUS ENABLE | (CR 70) | OFF | 0 | 0 |
| 1814 | PRESS CON- | (CR 72) | OFF | 0 | 0 |

TABLE 4-continued
OUTPUT CONDITIONS FOR MANUAL OPERATION

| | OUTPUT NAME | | POSITION | VOLTAGE | STATE |
|---|---|---|---|---|---|
| | TINUOUS SETUP | | | | |
| 1911 | BOARD FAULT LIGHT 1 | | ON/OFF | +24/0 | 1/0 |
| 1912 | DRILL FAULT LIGHT 2 | | ON/OFF | +24/0 | 1/0 |
| 1913 | PRESS FAULT LIGHT 3 | | ON/OFF | +24/0 | 1/0 |
| 1914 | CONVEYOR FAULT LIGHT 4 | | ON/OFF | +24/0 | 1/0 |
| 1915 | CYCLE READY LIGHT | | OFF | 0 | 0 |
| 1916 | RUN LIGHT | | OFF | 0 | 0 |
| 2011 | CONV CLUTCH ENGAGE | (CR 122) | OFF | 0 | 0 |
| 2012 | TOOL DETECT A FWD | (SV7) | BACK | 0 | 0 |
| 2013 | TOOL DETECT B FWD | (SV8) | BACK | 0 | 0 |
| 2014 | AIR PRESSURE OK LIGHT | | ON/OFF | +24/0 | 1/0 |
| 2015 | PRESS-EMERG STOP | (CR 124) | ON | +24 | 1 |
| 2016 | PRESS-CYCLE STOP | (CR 126) | OFF | 0 | 0 |

The machine timing diagram for the input signals is shown in FIG. 31, and for the output signals in FIG. 32. The control microcode of the preferred Allen-Bradley type 1745 Programmable Logic Controller 1003 accomplishing the control of the machine is attached as APPENDIX A.

CONCLUSION

A preferred embodiment of this invention is illustrated in the drawings and has been described. Various modifications may be made in the described embodiment without departing from the scope and spirit of this invention, which is defined by the appended claims.

APPENDIX A

```
AWP #2 PROGRAM
SLC Personal Computer Software        Ladder Diagram                  Page    1

: Rung: 001 LATCH DWELL OVERIDE - UNTILL FIRST DWELL AFTER PRESSING RESET
:
: RESET                                                                DWELL
: P/B                                                                  ORIDE
:  304                                                                  744
+--] [-----------------------------------------------------------------( L )----+

: Rung: 002 UNLATCH DWELL OVERIDE AT FIRST DWELL AFTER RESET PRESSED
:
: DWELL                                                                DWELL
: CAM                                                                  ORIDE
:  308                                                                  744
+--] [-----------------------------------------------------------------( U )----+

: Rung: 003 ALLOWS NORMAL ERROR CONDITIONS FOR .5 SEC AFTER RESET IS RELEASED
:
: RESET                                                                ST UP
: P/B                                                                  LI EN
:  304                                                                  928
+--] [-----------------------------------------------------------------(RTF)----+
                                                                      PR 0005

: Rung: 004 LOCK OUT ALL ERRORS AFTER FIRST - UNTILL RESET P/B AND TIME OUT
:
: ST UP  RESET                                                         ST UP
: LI EN  P/B                                                           LI EN
:  928    304                                                           928
+--]\[---]\[-----------------------------------------------------------(RST)----+
                                                                      RE 0000

: Rung: 005 EMERG SYS RELAY 720 MUST BE ENERGIZED AT ALL TIMES TO RUN
:
: RESET  ESTOP   SAFTY  SAFTY                                          EMERG
: P/B    INTLK   INT    INT 2                                          SYS
:  304    204     301    305                                            720
```

```
+ +-] [-+-] [---] [---] [------------------------------,-----------(   )----+
: :       :                                                                :
: :EMERG:                                                                  :
: :SYS  :                                                                  :
: : 720 :                                                                  :
: +-] [-+                                                                  :
:                                                                          :
: Rung: 006 ENERGIZES IF CLUTCH IS NOT ENGAGED AND CONV OK - NOT OVERLOADED :
:                                                                          :
: CLUTH CONV                                                          CONV :
: ENGE  O/L                                                          INTLK :
:  311  004                                                            702 :
+--]\[---]\[--------------------------------------------------------(   )--+
:                                                                          :
: Rung: 007 BOARD SENSE 1 OR 2 JAM                                         :
:                                                                          :
: JAM                                                                BOARD :
: L/S                                                                INTLK :
:  006                                                                 703 :
+--]\[--------------------------------------------------------------(   )--+
:                                                                          :
: Rung: 008 DETENTS IN PROPER POSITION                                     :
:                                                                          :
: DETNT DETNT DETNT                                                  DETNT :
: 1-5UP W12UP DOWN                                                   INTLK :
:  008   009   010                                                     704 :
+--]\[---]\[---] [--------------------------------------------------(   )--+
:                                                                          :
: Rung: 009 DETECT HOLES IN PROPER POSITION                                :
:                                                                          :
: A & B                                                               TOOL :
: BACK                                                               INTLK :
:  106                                                                 705 :
+--] [--------------------------------------------------------------(   )--+
:                                                                          :
: Rung: 010 DRILLS IN PROPER POSITION                                      :
:                                                                          :
: DRILL                                                              DRILL :
: BACK                                                               INTLK :
:  108                                                                 706 :
+ +-] [-+-----------------------------------------------------------(   )--+
: :     :                                                                  :
: :DRILL:                                                                  :
: :BACK :                                                                  :
: : 108 :                                                                  :
: +-]\[-+                                                                  :
:                                                                          :
: Rung: 011 THIS RUNG MEANS EQUIPMENT IS IN POSITION FOR STARTUP           :
:                                                                          :
: TOP   CONV  BOARD DETNT TOOL  DRILL                                EQUIP :
: PRESS INTLK INTLK INTLK INTLK INTLK                                 POSN :
:  001   702   703   704   705   706                                   707 :
+--] [---] [---] [---] [---] [---] [--------------------------------(   )--+
:                                                                          :
: Rung: 012 MOTORS RUNNING OK                                              :
:                                                                          :
: DRILL CONV                                                         EQUIP :
: MTRS  MTRS                                                         RNING :
:  205   206                                                           708 :
+--] [---] [--------------------------------------------------------(   )--+
:                                                                          :
: Rung: 013 PRESS READY FOR OPPERATION                                     :
:                                                                          :
: PRESS CONT   PRESS P NOT                                           PRESS :
: MTRS  MODE   EM SD CYCL                                               OK :
:  303   209    307  306                                               710 :
+--] [---] [---]\[---] [--------------------------------------------(   )--+
:                                                                          :
: Rung: 014 CONTROL PANEL SWITCHES IN CORRECT POSITION                     :
:                                                                          :
: CONV                                                                 CTL :
: IN PB                                                              SW OK :
:  203                                                                 709 :
+--]\[--------------------------------------------------------------(   )--+
```

```
: Rung: 015 ALL INPUT CONDITIONS ARE IN CORRECT POSITION
:
: EQUIP EQUIP CTL   EMERG PRESS RESET                                          INPUT
: POSN  RNING SW OK SYS   OK    P/B                                            OK
:  707   708   709   720   710   304                                            713
+--] [---] [---] [---] [---] [---]\[-------------------------------------(   )----+
:
: Rung: 016 OUTPUTS 1 OK
:
: DTENT DTENT DRILL CONVE DEMND DRILL PRESS PRESS                              OUT 1
: 1-5UP W12UP MENBL MENBL PRESS SVFWD IN EN SI EN                              INTLK
:  011   012   013   014   015   016   111   112                                714
++-]\[-+-]\[-+-] [---] [---]\[---]\[---]\[---]\[---------------------------(   )----+
::     :     :
::DWELL:DWELL:
::CAM  :CAM  :
:: 308 : 308 :
:+-] [-+-] [-+
::     :
::HOLD :
::DETEN:
::  753:
:+-] [-+

:
: Rung: 017 OUTPUTS 2 OK
:
: BOARD DRILL PRESS CONV  RUN   AIR                                            OUT 2
: LGT 1 LGT 2 LGT 3 LGT 4 LGT 6 OK LT                                          INTLK
:  211   212   213   214   216   314                                            715
+--]\[---]\[---]\[---]\[---]\[---] [---------------------------------------(   )----+
:
: Rung: 018 OUTPUTS 3 OK
:
: TL A  TL B  CLUTH PRESS PRESS                                                OUT 3
: SV F  SV F  ENGE  ESTOP CSTOP                                                INTLK
:  312   313   311   315   316                                                  716
+--]\[---]\[---]\[---] [---]\[---------------------------------------------(   )----+
:
: Rung: 019 THIS LINE TESTS IF ALL OUTPUTS ARE OK
:
: OUT 1 OUT 2 OUT 3                                                            OUTPT
: INTLK INTLK INTLK                                                            OK
:  714   715   716                                                              717
+--] [---] [---] [---------------------------------------------------------(   )----+
:
: Rung: 020 ENERGIZES FOR ALL SYSTEMS OK
:
: INPUT OUTPT AIR   TOOL  CONV  PRESS PRESS DRILL CONV  AU/MA                  OK TO
: OK    OK    PRESS CY-ER CY-ER ESTOP CSTOP IM SD IM SD SSW=A                   B CYC
:  713   717   210   724   730   315   316   723   725   202                    718
+--] [---] [---] [---]\[---]\[---] [---]\[---]\[---]\[---] [----------------(   )----+
:
: Rung: 021 ON IMMED STOP, RELAY 214 IS DE-ENERGIZED (OUT 315)-ALWAYS ON
:
: RESET DRILL CONV  EMERG JAM   PRESS PRESS ERR P                              PRESS
: P/B   IM SD IM SD SYS   SET   EM SD FAST  SLOW                               ESTOP
:  304   723   725   720   747   307   927   929                                315
++-] [-+-]\[---]\[-+-] [---]\[---]\[---]\[---]\[---------------------------(   )----+
::     :          :
::PRESS:SEAL      :
::ESTOP:1/2 C     :
:: 315 : 902      :
:+-] [-+-] [------+
:
: Rung: 022 WHEN ENERGIZED-STOP PRESS AT TOP OF CYCLE
:
: DT TO RESET INST                                                             PRESS
: SD CY P/B   OPEN                                                             CSTOP
:  726   304   719                                                              316
++-] [-+-]\[---]\[---------------------------------------------------------(   )----+
```

```
:!        :
::AIR    :
::PRESS:
:: 210   :
:+-]\[-+
::        :
::TOOL  :
::CY-ER:
:: 724   :
:+-] [-+
::        :
::PRESS:
::CSTOP:
:: 316   :
:+-] [-+
::        :
::DRILL:
::IM SD:
:: 723   :
:+-] [-+
::        :
::CONV  :
::IM SD:
:: 725   :
:+-] [-+
::        :
::STOP  :
::PB HD:
:: 741   :
:+-] [-+
::        :
::CONV  :
::OF TM:
:: 921   :
:+-] [-+
::        :
::PSTOP:
::AT CY:
:: 755   :
:+-] [-+

: Rung: 023
:
: CLUTH PERMT AU/MA EMERG                                              CONV
: ENGE  RUN   SSW=A SYS                                                OF TM
:  311   727   202   720                                                921
+--]\[---] [---] [---] [---------------------------------------------(RTO)----+
:                                                                      PR 0020
:

: Rung: 024
:
: CLUTH                                                                CONV
: ENGE                                                                 OF TM
:  311                                                                  921
+--] [---------------------------------------------------------------(RST)----+
:                                                                      RE 0000
:

: Rung: 025 CHECK CONDITIONS FOR MANUAL OPERATION - LINE 1 OF 4
:
: DETNT DETNT DETNT DTENT DTENT DRILL CONVE DEMND DRILL                 MAN
: 1-5UP W12UP DOWN  1-5UP W12UP MENBL MENBL PRESS SVFWD                 OK-1
:  008   009   010   011   012   013   014   015   016                  731
+--]\[---]\[---] [---]\[---]\[---] [---] [---]\[---]\[-----------------(   )----+
:
: Rung: 026                                           LINE 2 OF 4
:
: A & B DRILL START CYCLE                                               MAN
: BACK  BACK  CYCLE STOPP                                               OK-2
:  106   108   110   201                                                732
+--] [---] [---]\[---]\[--------------------------------------------(   )----+
```

```
: Rung: 027                                            LINE 3 OF 4
:
: RUN   RESET PRESS P NOT EMERG                                      MAN
: LGT 6 P/B   EM SD CYCL  SYS                                        OK-3
:  216   304   307   306   720                                        733
+--]\[---]\[---]\[-+-] [-+-] [------------------------------------(   )----+
:                   :     :
:                   :MAN  :
:                   :OK-3 :
:                   : 733 :
:                   +-] [-+
:
: Rung: 028                                            LINE 4 OF 4
:
: TL A  TL B  CLUTH PRESS PRESS                                      MAN
: SV F  SV F  ENGE  ESTOP CSTOP                                      OK-4
:  312   313   311   315   316                                        734
+--]\[---]\[---]\[---] [---]\[------------------------------------(   )----+
:
: Rung: 029 ALL CONDITIONS OK FOR MANUAL OPERATION
:
: MAN   MAN   MAN   MAN                                              MANUL
: OK-1  OK-2  OK-3  OK-4                                             OK
:  731   732   733   734                                              735
+--] [---] [---] [---] [------------------------------------------(   )----+
:
: Rung: 030 OK TO SELECT PRESS INCH ENABLE
:
: MANUL AU/MA EMERG DWELL                                            PRESS
:  OK   SSW=A SYS   CAM                                              IN EN
:  735   202   720   308                                              111
++-] [-+-]\[---] [---] [------------------------------------------(   )----+
:: :
::PRESS:
::IN EN:
:: 111 :
:+-] [-+
:
: Rung: 031 OK TO SELECT PRESS SINGLE CYCLE ENABLE
:
: MANUL AU/MA EMERG DWELL                                            PRESS
:  OK   SSW=A SYS   CAM                                              SI EN
:  735   202   720   308                                              112
++-] [-+-]\[---] [---] [------------------------------------------(   )----+
:: :
::PRESS:
::SI EN:
:: 112 :
:+-] [-+
:
: Rung: 032 OK TO SELECT PRESS CONTINUOUS ENABLE
:
: OK TO AU/MA EMERG CONT                                             PRESS
: B CYC SSW=A SYS   MODE                                             CO EN
:  718   202   720   209                                              113
++-] [-+-] [---] [---] [------------------------------------------(   )----+
:: :
::PRESS:
::CO EN:
:: 113 :
:+-] [-+
:
: Rung: 033 CONVEYOR ENABLE (WHEN PLC RUNNING)
:
: RESET EMERG                                                        CONVE
: P/B   SYS                                                          MENBL
:  304   720                                                          014
++-] [-+-] [-----------------------------------------------------(   )----+
:: :
::CONVE:
::MENBL:
:: 014 :
:+-] [-+
```

```
: Rung: 034 THE CONVEYOR IS IN MANUAL MODE
:
: AU/MA CONV  INCH  EMERG                                              CONV
: SSW=A MTRS  MODE  SYS                                                MANUL
:  202   206   207   720                                                736
+--]\[---] [-+-] [-+-] [-------------------------------------------(   )----+
:             :     :
:           :SSTRK:
:           :MODE :
:           : 208 :
:           +-] [-+
:
: Rung: 035 BEGIN CONVEYOR INDEX
:
: START OK TO DRILL CONV  EMERG RESET CYCLE AU/MA                      PERMT
: CYCLE B CYC  IM SD IM SD SYS   P/B  STOPP SSW=A                       RUN
:  110   718   723   725   720   304   201   202                        727
++-] [---] [-+-]\[---]\[---] [---]\[---]\[---] [------------------(   )----+
:: :
::PERMT
::RUN
:: 727
:+-] [-------+
:
: Rung: 036 IMMEDIATE SHUT-DOWN INTERLOCKS
:
: DRILL CONV  EMERG                                                    INTL
: IM SD IM SD SYS                                                      IM SD
:  723   725   720                                                      749
+--]\[-+-]\[-+-] [-------------------------------------------------(   )----+
:     :     :
:     :CONV :
:     :MANUL:
:     : 736 :
:     +-] [-+
:
: Rung: 037 ENGAGE CLUTCH TO INDEX CONVEYOR
:
: PERMT AU/MA       RESET CLUTH INTL  SD CY EMERG ERR P                CLUTH
: RUN   SSW=A       P/B   SD TM IM SD @ 308 SYS   SLOW                 ENGE
:  727   202         304   751   749   742   720   929                  311
++-] [---] [--------+-]\[---]\[---] [---]\[---] [---]\[-----------(   )----+
:: :
::INCH  CONV  CONV :
::MODE  IN PB MANUL:
:: 207   203   736 :
:+-] [---] [---] [-+
:: :
::CLUTH AU/MA
::ENGE  SSW=A
:: 311   202
:+-] [---] [-------+
:: :
::PERMT DWELL AU/MA:
::RUN   ORIDE SSW=A:
:: 727   744   202 :
:+-] [---] [---] [-+
:: :
::CLUTH AU/MA
::SD TM SSW=A
:: 751   202
:+-] [---] [-------+
:
: Rung: 038 THIS CYCLE DE-ENERGIZES INSTANTLY - ENERGIZES WHEN CYCLE STARTS
:
: START OK TO CYCLE                                                    INST
: CYCLE B CYC  STOPP                                                   OPEN
:  110   718   201                                                      719
++-] [---] [-+-]\[-----------------------------------------------(   )----+
:: :
::INST
::OPEN
:: 719
:+-] [-------+
```

```
: Rung: 039 CYCLE STOP P/B PRESSED - HOLD TO STOP CONV AT NEXT CYCLE
:
: CYCLE RESET                                                         STOP
: STOPP P/B                                                           PB HD
:  201   304                                                           741
++-] [-+-]\[------------------------------------------------------------( )----+
:  :   :
: :STOP :
: :PB HD:
: : 741 :
: +-] [-+

: Rung: 040 STOP CONVEYOR AT NEXT DWELL FOR CYCLE STOP.
:
: STOP  DWELL RESET                                                   SD CY
: PB HD CAM   P/B                                                     @ 308
:  741   308   304                                                     742
++-] [---] [-+-]\[-----------------------------------------------------( )----+
:  :        :
: :SD CY    :
: :@ 308    :
: : 742     :
: +-] [-----+

: Rung: 041 SETUP PRESS AT LEAVING DWELL (003) + (308)
:
: AU/MA CLUTH DWELL LEVNG RESET PRESS                                 PRESS
: SSW=A ENGE  ORIDE DWELL P/B   WAIT                                  SETUP
:  202   311   744   745   304   754                                   114
++-] [---] [---]\[---] [-+-]\[---]\[-----------------------------------( )----+
:  :                    :
: :PRESS                :
: :SETUP                :
: : 114                 :
: +-] [-----------------+

: Rung: 042 COUNTS UP FROM TOP OF PRESS GOES TRUE AT COUNT OF 10
:
: ANGLE                                                               TOP P
: COUNT                                                               COUNT
:  002                                                                 912
+--] [----------------------------------------------------------------(CTU)---+
:                                                                     PR 0010

: Rung: 043 RESET AT TOP AND CONTINUE IF NOT TIMED OUT - ELSE S/D
:
: TOP                                                                 TOP P
: PRESS                                                               COUNT
:  001                                                                 912
+--] [----------------------------------------------------------------(RST)---+
:                                                                     RE 0000

: Rung: 044 S/D IF > 20 COUNTS PASS AFTER LEAVING DWELL AND NO TOP OF PRESS
:
: ANGLE DWELL                                                         PRESS
: COUNT CAM                                                           FAST
:  002   308                                                           927
+--] [---]\[----------------------------------------------------------(CTU)---+
:                                                                     PR 0020

: Rung: 045 RESET AT TOP & CONTIUE IF NOT TIMED OUT.
:
: TOP                                                                 PRESS
: PRESS                                                               FAST
:  001                                                                 927
+--] [----------------------------------------------------------------(RST)---+
:                                                                     RE 0000

: Rung: 046 LOGIC COND OF CAMS TO ADVISE END OF DWELL
:
: DWELL PRESS                                                         LEVNG
: CAM   CAM                                                           DWELL
:  308   003                                                           745
+--] [---] [----------------------------------------------------------( )----+
```

```
: Rung: 047 LOGIC COND OF CAMS TO BEGIN PRESS CYCLE
:                                                                              DMAND
: DWELL PRESS                                                                  CAM
: CAM   CAM                                                                    746
:  308  003
+--]\[---] [--------------------------------------------------------------(   )----+

: Rung: 048 DEMAND PRESS CYCLE PRESS MUST BE SETUP FIRST!
:
: DMAND PRESS DRILL PRESS PRESS P NOT PRESS PRESS PERMT RESET PRESS           DEMND
: CAM   CO EN ONLY  ESTOP EM SD CYCL  MTRS  CSTOP RUN   P/B   SETUP           PRESS
:  746   113  302   315   307  306   303   316   727   304   114              015
++-] [-+-] [---]\[---] [---]\[-+-] [-+-] [---]\[---] [---]\[---] [----(   )----+
::       :                      :
::DEMND:                        :DEMND:
::PRESS:                        :PRESS:
:: 015 :                        : 015 :
:+-] [-+                        +-] [-+

: Rung: 049 STARTS COUNTING TEETH OF GEAR- COUNTS HALFWAY DOWN
:
:                                                                              SEAL
: ANGLE                                                                        1/2 C
: COUNT                                                                        902
:  002
+--] [-----------------------------------------------------------------(CTU)----+
                                                                              PR 0020

: Rung: 050 TOOTH COUNTER RESETS AT TOP OF PRESS
:
:                                                                              SEAL
: TOP                                                                          1/2 C
: PRESS                                                                        902
:  001
+--] [-----------------------------------------------------------------(RST)----+
                                                                              RE 0000

: Rung: 051 HOLD JAM CONDITION TO SHUT DOWN SYS
:
: JAM   RESET                                                                  JAM
: L/S   P/B                                                                    SET
:  006   304                                                                   747
++-] [-+-]\[---------------------------------------------------------------(   )----+
::     :
::JAM  :
::SET  :
:: 747 :
:+-] [-+

: Rung: 052 SIGNALS DETENTS 1-5 UP ON DWELL CAM (308)
:
: WI/NA DWELL JAM   EMERG CLUTH RESET LEVNG                                    DTENT
: SSW N CAM   SET   SYS   ENGE  P/B   DWELL                                    1-5UP
:  109   308   747   720   311   304   745                                     011
+--] [-+-] [-+-]\[---] [-+-] [-+-]\[---]\[-----------------------------(   )----+
       :     :          :     :
       :HOLD :          :DTENT:
       :DETEN:          :1-5UP:
       : 753 :          : 011 :
       +-] [-+          +-] [-+

: Rung: 053 IF SELECTED SIGNALS DETENTS W1 & W2 UP
:
: WI/NA DWELL JAM   EMERG CLUTH RESET LEVNG                                    DTENT
: SSW N CAM   SET   SYS   ENGE  P/B   DWELL                                    W12UP
:  109   308   747   720   311   304   745                                     012
+--]\[---] [---]\[---] [-+-] [-+-]\[---]\[-----------------------------(   )----+
                         :     :
                         :DTENT:
                         :W12UP:
                         : 012 :
                         +-] [-+
```

```
: Rung: 054 WHEN DEMAND PRESS SIGNAL - ENABLE (HOLD DETENTS) UNTILL DWELL

: DMAND DWELL                                                         SETUP
: CAM   CAM                                                           DETEN
:  746   308                                                           752
++-] [-+-]\[------------------------------------------------------(   )----+
: :    :
: :SETUP:
: :DETEN:
: : 752 :
:+-] [-+

: Rung: 055 HOLD DETENTS UP AT END OF DEMAND PRESS UNTILL DWELL

: SETUP PRESS                                                         HOLD
: DETEN CAM                                                           DETEN
:  752   003                                                           753
+--] [---]\[------------------------------------------------------(   )----+

: Rung: 056 WHEN SIGNAL FOR DETENTS UP TIMES OUT THEN IMMED. S/D

: DTENT DTENT RESET                                                   DETNT
: 1-5UP 1-5UP P/B                                                     TM UP
:  011   008   304                                                      904
++-] [---]\[-+-] [-----------------------------------------------(RTO)----+
: :         :                                                        PR 0100
: :DTENT DETNT:
: :W12UP W12UP:
: : 012   009 :
:+-] [---]\[-+

: Rung: 057 RESETS TD(904) IF DETENTS 1-5UP OR W12UP ARE UP IN TIME

: DETNT                                                               DETNT
: 1-5UP                                                               TM UP
:  008                                                                 904
++-] [-+----------------------------------------------------------(RST)----+
: :    :                                                            RE 0000
: :DETNT:
: :W12UP:
: : 009 :
:+-] [-+
: :    :
: :RESET:
: :P/B  :
: : 304 :
:+-] [-+

: Rung: 058 SIGNAL TO DE-EN DETENTS DOWN STARTS TIMER

: DTENT DETNT RESET                                                   SV DT
: 1-5UP DOWN  P/B                                                     DE-EN
:  011   010   304                                                     906
++-]\[---]\[-+-] [-----------------------------------------------(RTO)----+
: :         :                                                        PR 0100
: :DTENT DETNT:
: :W12UP DOWN :
: : 012   010 :
:+-]\[---]\[-+
: :         :
: :SV DT    :
: :DE-EN    :
: : 906     :
:+-] [-------+

: Rung: 059 WHEN DETENTS DN IN TIME, TIMER RESETS BEFORE ALARM

: DETNT                                                               SV DT
: DOWN                                                                DE-EN
:  010                                                                 906
++-] [-+----   ---------------------------------------------------(RST)----+
```

```
 ::     :                                                              RE 0000
 ::RESET:
 ::P/B  :
 :: 304 :
 :+-] [-+
 :
 : Rung: 060 CONVEYOR & DETENT FAULTS - NEED TO S/D PRESS IMMED
 :
 : JAM   RESET                                                         CONV
 : L/S   P/B                                                           IM SD
 : 006   304                                                           725
 +-] [-+-]\[------------------------------------------------------(    )----+
 ::     :
 ::CONV :
 ::O/L  :
 :: 004 :
 :+-] [-+
 ::     :
 ::DETNT:
 ::TM UP:
 :: 904 :
 :+-] [-+
 ::     :
 ::CONV :
 ::IM SD:
 :: 725 :
 :+-] [-+
 :
 : Rung: 061 DETENTS DOWN TIMED OUT - ENERGIZE TO S/D CYCLE
 :
 : SV DT RESET                                                         DT TO
 : DE-EN P/B                                                           SD CY
 : 906   304                                                           726
 +-] [-+-]\[------------------------------------------------------(    )----+
 ::     :
 ::DT TO:
 ::SD CY:
 :: 726 :
 :+-] [-+
 :
 : Rung: 062 DRILL MOTORS 1&2 ENABLE (ON WHEN PLC RUNNING)
 :
 : DRILL EMERG OHOLE                                                   DRILL
 : MENBL SYS   DRILL                                                   MENBL
 : 013   720   101                                                     013
 +-] [-+-] [---]\[------------------------------------------------(    )----+
 ::     :
 ::RESET:
 ::P/B  :
 :: 304 :
 :+-] [-+
 :
 : Rung: 063
 :
 : AU/MA CLUTH DWELL PRESS DWELL RESET OHOLE                           DRILL
 : SSW=A ENGE  CAM   CAM   ORIDE P/B   DRILL                           FWD T
 : 202   311   308   003   744   304   101                             916
 +--] [---] [---] [---]\[---]\[---] [---]\[--------------------------(RTO)---+
                                                                      PR 0001
 :
 : Rung: 064
 :
 : DRILL LEVNG                                                         DRILL
 : LIMIT DWELL                                                         HOLD
 : 107   745                                                           748
 +-] [-+-]\[------------------------------------------------------(    )----+
 ::     :
 ::DRILL:
 ::HOLD :
 :: 748 :
 :+-] [-+
```

```
: Rung: 065
:
: DRILL                                                               DRILL
: HOLD                                                                FWD T
: 748                                                                 916
+--] [-------------------------------------------------------------(RST)----+
:                                                                     RE 0000
:
: Rung: 066 ACTIVATES DRILL HEAD FORWARD
:
: DRILL DRILL OHOLE EMERG DRILL AU/MA DWELL BOARD LEVNG               DRILL
: FWD T HOLD  DRILL SYS   IM SD SSW=A CAM   2 MT  DWELL               SVFWD
: 916   748   101   720   723   202   308   007   745                 016
++-] [-+-]\[---]\[---] [---]\[---] [---] [---]\[---]\[----------------(   )----+
:!    :
::DRILL:
::SVFWD:
:: 016 :
:+-] [-+

: Rung: 067 AFTER DRILL HEAD FORWARD SIGNAL, STARTS TIMER
:
: DRILL RESET                                                         DRILL
: SVFWD P/B                                                           FD TR
: 016   304                                                           903
+--] [---] [-------------------------------------------------------(RTO)----+
:                                                                     PR 0200
:
: Rung: 068 RESETS IF DRILL FWD BEFORE TIMER ENDS OR IMMED S/D
:
: DRILL RESET                                                         DRILL
: LIMIT P/B                                                           FD TR
: 107   304                                                           903
++-] [-+-] [-------------------------------------------------------(RST)----+
:!    :                                                               RE 0000
::RESET:
::P/B  :
:: 304 :
:+-] [-+

: Rung: 069 ACTIVATES TIMER WHEN CYL HITS LIMIT
:
: DRILL RESET                                                         DRILL
: LIMIT P/B                                                           SV TR
: 107   304                                                           910
++-] [-+-] [-------------------------------------------------------(RTO)----+
:!    :                                                               PR 0200
::DRILL:
::SV TR:
:: 910 :
:+-] [-+

: Rung: 070 RESETS IF DRILL BACK IN TIME OR IMMED S/D
:
: DRILL                                                               DRILL
: BACK                                                                SV TR
: 108                                                                 910
++-] [-+-------------------------------------------------------------(RST)----+
:!    :                                                               RE 0000
::RESET:
::P/B  :
:: 304 :
:+-] [-+

:!    :
::DRILL:
::BACK :
:: 108 :
:+-]\[-+
```

```
: Rung: 071 DRILL FAULT - ALARMS AND SHUTDOWN PRESS & CONVEYOR
:
:                                                                            DRILL
: DRILL RESET RESET                                                          IM SD
: MTRS  P/B   P/B                                                            723
:  205  304   304
++-]\[-+-]\[---] [---------------------------------------------------------( )----+
:!         :
:!DRILL!
:!FD TR!
:! 903 !
:+-] [-+
:!         :
:!DRILL!
:!SV TR!
:! 910 !
:+-] [-+
:!         :
:!TOOL !
:!DT TO!
:! 909 !
:+-] [-+
:!         :
:!DRILL!
:!IM SD!
:! 723 !
:+-] [-+
:
: Rung: 072 START TIMER FOR TOOL DETECT FORWARD
:
: AU/MA CLUTH PRESS DWELL DWELL                                              TL A
: SSW=A ENGE  CAM   CAM   ORIDE                                              INIT
:  202   311   003   308   744                                               920
+--] [---] [---]\[---] [---]\[---------------------------------------------(RTO)----+
                                                                            PR 0002
:
: Rung: 073 RESET TOOL DETECT FORWARD TIMER
:
: HOLD                                                                       TL A
: A FWD                                                                      INIT
:  737                                                                       920
+--] [---------------------------------------------------------------------(RST)----+
                                                                            RE 0000
:
: Rung: 074 SV TO VERIFY HOLE 'A' PRESENCE, CANCEL IF OK
:
: TL A  OHOLE 2HOLE HOLD  AU/MA CLUTH                                        TL A
: INIT  DRILL SSW   A FWD SSW=A ENGE                                         SV F
:  920   101   102   737   202   311                                         312
++-] [-+-]\[-+-] [-+-]\[---] [---] [---------------------------------------( )----+
:!       :       :
:!TL A !   !4HOLE!
:!SV F !   !SSW  !
:! 312 !   ! 103 !
:+-] [-+   +-] [-+
:
: Rung: 075 HOLD IN TO PERMIT TOOL 'A' FORWARD
:
: TOT A LEVNG                                                                HOLD
: FWD   DWELL                                                                A FWD
:  104   745                                                                 737
++-] [-+-]\[---------------------------------------------------------------( )----+
:!         :
:!HOLD !
:!A FWD!
:! 737 !
:+-] [-+
:
: Rung: 076 HOLE 'A' SV IN TIMER - IMMED S/D ON TIME-OUT
:
: TL A  RESET                                                                TOL A
: SV F  P/3                                                                  FD TO
:  312   304                                                                 907
+--] [---] [---------------------------------------------------------------(RTO)----+
                                                                            PR 0100
```

```
: Rung: 077 CANCEL TIMER IF TOOL 'A' FORWARD
:
: TOT A                                                                    TOL A
: FWD                                                                      FD TO
:  104                                                                      907
++-] [-+------------------------------------------------------------------(RST)----+
::   :                                                                     RE 0000
::RESET:
::P/B  :
:: 304 :
:+-] [-+

:
: Rung: 078 HOLE 'B' SV IN TIMER - ALARM IF TIME-OUT
:
: TL A  0HOLE 2HOLE 4HOLE HOLD                                             TL B
: INIT  DRILL SSW   SSW   B FWD                                            SV F
:  920   101   102   103  738                                               313
++-] [-+-]\[---]\[---] [---]\[------------------------------------------(  )----+
::   :
::TL B :
::SV F :
:: 313 :
:+-] [-+

:
: Rung: 079 HOLD IN TO PERMIT TOOLS 'B' FORWARD
:
: TOT B LEVNG                                                              HOLD
: FWD   DWELL                                                              B FWD
:  105   745                                                                738
++-] [-+-]\[------------------------------------------------------------(  )----+
::   :
::HOLD :
::B FWD:
:: 738 :
:+-] [-+

:
: Rung: 080 CANCEL TIMER IF TOOL 'B' FORWARD ELSE--- S/D IMMED.
:
: TL B  RESET                                                              TOL B
: SV F  P/B                                                                FD TO
:  313   304                                                                908
+--] [---] [------------------------------------------------------------(RTO)----+
                                                                          PR 0100

:
: Rung: 081 RESET TIMER ---- TOOL 'B' FORWARD IN TIME
:
: TOT B                                                                    TOL B
: FWD                                                                      FD TO
:  105                                                                      908
++-] [-+------------------------------------------------------------------(RST)----+
::   :                                                                     RE 0000
::RESET:
::P/B  :
:: 304 :
:+-] [-+

:
: Rung: 082 TIME IF 'A' OR 'B' L/S FWD ACTIVATED
:
: TOT A RESET                                                              TOOL
: FWD   P/B                                                                DT TO
:  104   304                                                                909
++-] [-+-] [------------------------------------------------------------(RTO)----+
::   :                                                                     PR 0100
::TOT B:
::FWD  :
:: 105 :
:+-] [-+
::   :
::TOOL :
::DT TO:
:: 909 :
:+-] [-+
```

```
: Rung: 083 CANCEL TIMER IF TOOL 'A' OR 'B' BACK IN TIME OR IMMED S/D
:
: A & B                                                              TOOL
: BACK                                                               DT TO
:  106                                                                909
++-] [-+------------------------------------------------------------(RST)----+
:!     !                                                            RE 0000
::RESET:
::P/B  :
::  304 :
:+-] [-+

: Rung: 084 IMMED S/D ON TOOL FAULT (FWD TIMED OUT)
:
: TOL A RESET                                                        TOOL
: FD TO P/B                                                          CY-ER
:  907   304                                                          724
++-] [-+-]\[--------------------------------------------------------(   )----+
:!     !
::TOL B:
::FD TO:
::  908 :
:+-] [-+
:!     !
::TOOL :
::CY-ER:
::  724 :
:+-] [-+
:!     !
::TOOL :
::DT TO:
::  909 :
:+-] [-+

: Rung: 085 BOARD JAM FAULT LIGHT
:
: JAM   RESET DRILL PRESS CONV                                       BOARD
: L/S   P/B   LGT 2 LGT 3 LGT 4                                      LGT 1
:  006   304   212   213   214                                        211
++-] [-+-]\[-+-]\[---]\[---]\[-+------------------------------------(   )----+
:!     !     !
::BOARD:     :BOARD
::LGT 1:     :LGT 1
::  211 :     :  211
:+-] [-+     +-] [-------------+
:           :
:           :ST UP
:           :LI EN
:           :  928
:           +-] [-------------+
:           :
:           :CONT
:           :MODE
:           :  209
:           +-]\[-------------+
```

```
: Rung: 086 DRILL FAULT LIGHT
:
: DRILL RESET BOARD PRESS CONV                                              DRILL
: IM SD P/B   LGT 1 LGT 3 LGT 4                                             LGT 2
:  723   304   211   213   214                                               212
++-] [-+-]\[-+-]\[---]\[---]\[-+-----------------------------------------(   )----+
::    :     :
::DRILL:    :DRILL
::LGT 2:    :LGT 2
:: 212 :    : 212
:+-] [-+    +-] [-------------+
::    :     :
::DRILL:    :ST UP
::MTRS :    :LI EN
:: 205 :    : 928
:+-]\[-+    +-] [-------------+
:          :
:          :CONT
:          :MODE
:          : 209
:          +-]\[-------------+
:
: Rung: 087
:
: CONV  RESET PRESS DRILL BOARD ERR                                         CONV
: IM SD P/B   LGT 3 LGT 2 LGT 1 OFF                                         LGT 4
:  725   304   213   212   211   930                                         214
++-] [-+-]\[-+-]\[---]\[---]\[-+-]\[------------------------------------(   )----+
::    :     :
::CONV :    :CONV
::LGT 4:    :LGT 4
:: 214 :    : 214
:+-] [-+    +-] [-------------+
::    :     :
::DT TO:    :ST UP
::SD CY:    :LI EN
:: 726 :    : 928
:+-] [-+    +-] [-------------+
::    :     :
::CONV :    :ERR P
::CY-ER:    :SLOW
:: 730 :    : 929
:+-] [-+    +-] [-------------+
::    :     :
::CONV :    :CONT
::MTRS :    :MODE
:: 206 :    : 209
:+-]\[-+    +-]\[-------------+
::    :
::ERR P:
::SLOW :
:: 929 :
:+-] [-+
:
: Rung: 088
:
: ERR P RESET                                                               ERR
: SLOW  P/B                                                                 OFF
:  929   304                                                                 930
+--] [---]\[-----------------------------------------------------------(RTO)----+
:                                                                         PR 0005
:
: Rung: 089
:
: ERR                                                                       ERR
: OFF                                                                       ON
:  930                                                                       931
+--] [-----------------------------------------------------------------(RTO)----+
:                                                                         PR 0005
```

```
Rung: 090

ERR                                                             ERR
  ON                                                              ON
  931                                                             931
+--] [----------------------------------------------------------(RST)----+
                                                                  RE 0000

Rung: 091

ERR                                                             ERR
  ON                                                              OFF
  931                                                             930
+--] [----------------------------------------------------------(RST)----+
                                                                  RE 0000

Rung: 092 PRESS & CONV OUT OF SYNCH -OR- PRESS ORG FAULT

CONT  RESET FLSH  BOARD DRILL CONV                              PRESS
  MODE  P/B   OFF   LGT 1 LGT 2 LGT 4                             LGT 3
  209   304   924   211   212   214                               213
+-]\[-+-]\[---]\[-+-]\[---]\[---]\[-+------------------------------(   )----+
  | |         |
  |PRESS|     |PRESS
  |LGT 3|     |LGT 3
  | 213 |     | 213
  +-] [-+     +-] [-------------+
  | |         |
  |P NOT|     |ST UP
  |CYCL |     |LI EN
  | 306 |     | 928
  +-]\[-+     +-] [-------------+
  | |         |
  |PRESS|     |CONT
  |MTRS |     |MODE
  | 303 |     | 209
  +-]\[-+     +-]\[-------------+
  | |
  |PRESS|
  |EM SD|
  | 307 |
  +-] [-+
  | |
  |PRESS|
  |ESTOP|
  | 315 |
  +-]\[-+
  | |
  |PRESS|
  |CSTOP|
  | 316 |
  +-] [-+

Rung: 093 TURN OFF PRESS LIGHT IF NOT CONT MODE AND AT TOP OF PRESS

CONT  TOP                                                       FLSH
  MODE  PRESS                                                     OFF
  209   001                                                       924
+--]\[---] [----------------------------------------------------(RTO)----+
                                                                  PR 0005

Rung: 094 TURN PRESS LIGHT BACK ON AFTER TIME OUT

FLSH                                                            FLSH
  OFF                                                             ON
  924                                                             925
+--] [----------------------------------------------------------(RTO)----+
                                                                  PR 0005
```

```
: Rung: 095 RESET OFF TIMER WHEN TURNED BACK ON
:
: FLSH                                                              FLSH
: ON                                                                OFF
:  925                                                               924
+--] [--------------------------------------------------------------(RST)----+
:                                                                  RE 0000
:
:
: Rung: 096 RESET ON TIMER WHEN TURNED BACK ON
:
: FLSH                                                              FLSH
: ON                                                                ON
:  925                                                               925
+--] [--------------------------------------------------------------(RST)----+
:                                                                  RE 0000
:
:
: Rung: 097 LIGHT- CYCLE READY
:
: OK TO  RUN                                                        CYCLE
: B CYC  LGT 6                                                      LGT 5
:  718    216                                                        215
+--] [---]\[--------------------------------------------------------(   )----+
:
: Rung: 098 LIGHT- RUN
:
: PERMT                                                             RUN
: RUN                                                               LGT 6
:  727                                                               216
+--] [--------------------------------------------------------------(   )----+
:
: Rung: 099 LIGHT AIR PRESSURE
:
: AIR                                                               AIR
: PRESS                                                             OK LT
:  210                                                               314
+--] [--------------------------------------------------------------(   )----+
:
: Rung: 100 MEASURE THE DELTA TIME - TOP OF PRESS <TO> DWELL
:
: DWELL DEMND TOP P AU/MA DRILL TOP                                 MEAS
: CAM   PRESS COUNT SSW=A ONLY  PRESS                               DELTA
:  308   015   912   202   302   001                                 750
+--] [---] [---]\[---] [---]\[---]\[--------------------------------(   )----+
:
: Rung: 101 ONE TENTH OF A SECOND MEASURED
:
: MEAS  .2 M  .3 M  .4 M                                            .1 M
: DELTA SEC   SEC   SEC                                             SEC
:  750   914   915   917                                             913
++-] [-+-]\[---]\[---]\[--------------------------------------------(RTO)----+
::     :                                                           PR 0001
::.1 M :
::SEC  :
:: 913 :
:+-] [-+
:
: Rung: 102 TWO TENTHS OF A SECOND MEASURED
:
: MEAS  .3 M  .4 M                                                  .2 M
: DELTA SEC   SEC                                                   SEC
:  750   915   917                                                   914
++-] [-+-]\[---]\[--------------------------------------------------(RTO)----+
::     :                                                           PR 0002
::.2 M :
::SEC  :
:: 914 :
:+-] [-+
:
```

```
: Rung: 103 THREE TENTHS OF A SECOND MEASURED
:
: MEAS    .4 M                                                              .3 M
: DELTA  SEC                                                                SEC
:  750    917                                                               915
++-] [-+-]\[-------------------------------------------------------------(RTO)----+
::     :                                                                   PR 0003
::.3 M :
::SEC  :
:: 915 :
:+-] [-+

: Rung: 104 FOUR THENTHS OF A SECOND MEASURED
:
: MEAS                                                                      .4 M
: DELTA                                                                     SEC
:  750                                                                      917
++-] [-+------------------------------------------------------------------(RTO)----+
::     :                                                                   PR 0004
::.4 M :
::SEC  :
:: 917 :
:+-] [-+

: Rung: 105 PRESS TOO SLOW ERROR- S/D
:
                                                                           ERR P
: MEAS                                                                     SLOW
: DELTA                                                                    929
:  750                                                                   --(RTO)----+
++-] [-+------------------------------------------------------------------PR 0005
::     :
::ERR P:
::SLOW :
:: 929 :
:+-] [-+

: Rung: 106 PRESS SLOW RESET
:
                                                                           ERR P
: RESET                                                                    SLOW
: P/B                                                                      929
:  304                                                                   --(RST)----+
+--] [--------------------------------------------------------------------RE 0000

: Rung: 107 RESET AT TOP OF PRESS OR NEXT TENTH MEASURED.
:
: .2 M                                                                     .1 M
: SEC                                                                      SEC
:  914                                                                     913
++-] [-+------------------------------------------------------------------(RST)----+
::     :                                                                  RE 0000
::TOP  :
::PRESS:
:: 001 :
:+-] [-+

: Rung: 108  RESET AT TOP OF PRESS OR NEXT TENTH MEASURED.
:
                                                                           .2 M
: .3 M                                                                     SEC
: SEC                                                                      914
:  915                                                                   --(RST)----+
++-] [-+------------------------------------------------------------------RE 0000
::     :
::TOP  :
::PRESS:
:: 001 :
:+-] [-+
```

```
: Rung: 109 RESET AT TOP OF PRESS OR NEXT TENTH MEASURED.
:
:  .4 M                                                         .3 M
: SEC                                                           SEC
:  917                                                          915
++-] [-+--------------------------------------------------------(RST)----+
!!     :                                                       RE 0000
!!TOP  !
!!PRESS!
!! 001 !
!+-] [-+

: Rung: 110 RESET AT TOP OF PRESS.
:
: TOP                                                           .4 M
: PRESS                                                         SEC
:  001                                                          917
+--] [----------------------------------------------------------(RST)----+
:                                                              RE 0000

: Rung: 111 DIS ENGAGE TIME OUT OF .2 SEC AT BOTTOM OF PRESS
:
: SEAL   .1 M                                                   CLTCH
: 1/2 C  SEC                                                    .2SEC
:  902   913                                                    918
+--] [---] [----------------------------------------------------(RTO)----+
:                                                              PR 0002

: Rung: 112 DIS-ENGAGE TIME OUT OF .3 SEC AT BOTTOM OF PRESS
:
: SEAL   .2 M                                                   CLTCH
: 1/2 C  SEC                                                    .3SEC
:  902   914                                                    919
+--] [---] [----------------------------------------------------(RTO)----+
:                                                              PR 0003

: Rung: 113 DIS-ENGAGE TIME OUT OF .4 SEC AT BOTTOM OF PRESS
:
: SEAL   .3 M                                                   CLTCH
: 1/2 C  SEC                                                    .4SEC
:  902   915                                                    922
+--] [---] [----------------------------------------------------(RTO)----+
:                                                              PR 0004

: Rung: 114 DIS-ENGAGE TIME OUT OF .5 SEC AT BOTTOM OF STROKE
:
: SEAL   .4 M                                                   CLTCH
: 1/2 C  SEC                                                    .5SEC
:  902   917                                                    923
+--] [---] [----------------------------------------------------(RTO)----+
:                                                              PR 0005

: Rung: 115 RESET TIMER AT TOP
:
: TOP                                                           CLTCH
: PRESS                                                         .2SEC
:  001                                                          918
+--] [----------------------------------------------------------(RST)----+
:                                                              RE 0000

: Rung: 116 RESET TIMER AT TOP
:
: TOP                                                           CLTCH
: PRESS                                                         .3SEC
:  001                                                          919
+--] [----------------------------------------------------------(RST)----+
:                                                              RE 0000
```

```
: Rung: 117 RESET TIMER AT TOP
:
: TOP                                                                       CLTCH
: PRESS                                                                     .4SEC
:  001                                                                       922
+--] [-------------------------------------------------------------------(RST)----+
                                                                           RE 0000

: Rung: 118 RESET TIMER AT TOP
:
: TOP                                                                       CLTCH
: PRESS                                                                     .5SEC
:  001                                                                       923
+--] [-------------------------------------------------------------------(RST)----+
                                                                           RE 0000

: Rung: 119 DIS-ENGAGE CLUTCH FOR TIME SET FOR MEASURED DELTA AT BOTTOM
:
: SEAL  .1 M  CLTCH                                                         CLUTH
: 1/2 C SEC   .2SEC                                                         SD TM
:  902  913    918                                                           751
+--] [-+-] [---]\[-+----------------------------------------------------(    )----+
       :           :
       :.2 M  CLTCH:
       :SEC   .3SEC:
       : 914   919 :
       +-] [---]\[-+
       :           :
       :.3 M  CLTCH:
       :SEC   .4SEC:
       : 915   922 :
       +-] [---]\[-+
       :           :
       :.4 M  CLTCH:
       :SEC   .5SEC:
       : 917   923 :
       +-] [---]\[-+

: Rung: 120 WAIT TO ACTIVATE PRESS UNTILL A BOARD IS IN STATION 2
:
: NO1ST DWELL PRESS                                                         PRESS
: BOARD CAM   SETUP                                                         WAIT
:  005  308    114                                                           754
+--] [---] [---]\[-----------------------------------------------------(    )----+

: Rung: 121 STOP PRESS IF NO BOARD IS AT STATION 2 AND IT IS RUNNING
:
: NO1ST DWELL DEMND                                                         PSTOP
: BOARD CAM   PRESS                                                         AT CY
:  005  308    015                                                           755
+--] [---] [---] [-----------------------------------------------------(    )----+

+-------------------- End of Ladder --- Words used = 00872 -------------------+
```

AWP #2 PROGRAM
SLC Personal Computer Software          Cross Reference

INPUT

| Address | Element | Rung Number(s) | Instruction Comment |
|---------|---------|----------------|---------------------|
| 001 | -] [- | 011, 043, 045, 050, 088, 101, 102, 103, 104, 109, 110, 111, 112 | TOP   PRESS: NORMALLY CLOSED WHEN PRESS NOT AT TOP, OPEN AT TOP TO CHECK INTLKS |
| 001 | -]\[- | 096 | TOP   PRESS: NORMALLY CLOSED WHEN PRESS NOT AT TOP, OPEN AT TOP TO CHECK INTLKS |
| 002 | -] [- | 042, 044, 049 | ANGLE COUNT: A PROXIMITY SWITCH WHICH SENSES THE PRESENCE OF A GEAR TOOTH |
| 003 | -] [- | 046, 047 | PRESS CAM  : |
| 003 | -]\[- | 055, 063, 072 | PRESS CAM  : |
| 004 | -] [- | 060 | CONV O/L  : |
| 004 | -]\[- | 006 | CONV O/L  : |
| 005 | -] [- | 114, 115 | NO1ST BOARD: |
| 006 | -] [- | 051, 060, 085 | JAM   L/S  : BOARD SENSE 1&2 JAM |
| 006 | -]\[- | 007 | JAM   L/S  : BOARD SENSE 1&2 JAM |
| 007 | -]\[- | 066 | BOARD 2 MT : |
| 008 | -] [- | 057 | DETNT 1-5UP: INPUTS BOARD DETENTS 1-5 UP |
| 008 | -]\[- | 008, 025, 056 | DETNT 1-5UP: INPUTS BOARD DETENTS 1-5 UP |
| 009 | -] [- | 057 | DETNT W12UP: LIMIT SWITCH TO ENSURE DETENTS W1 AND W2 ARE UP |
| 009 | -]\[- | 008, 025, 056 | DETNT W12UP: LIMIT SWITCH TO ENSURE DETENTS W1 AND W2 ARE UP |
| 010 | -] [- | 008, 025, 059 | DETNT DOWN : DETENTS 1,2,3,4,5,W1,W2 DOWN |
| 010 | -]\[- | 058 | DETNT DOWN : DETENTS 1,2,3,4,5,W1,W2 DOWN |
| 101 | -]\[- | 062, 063, 066, 074, 078 | 0HOLE DRILL: SELECTOR SWITCH SET AT 0-HOLE DRILL |
| 102 | -] [- | 074 | 2HOLE SSW  : THE 3 POSITION SELECTOR SW IS SET AT 2 HOLE DRILL |
| 102 | -]\[- | 078 | 2HOLE SSW  : THE 3 POSITION SELECTOR SW IS SET AT 2 HOLE DRILL |
| 103 | -] [- | 074, 078 | 4HOLE SSW  : THE 3 POSITION SSW IS SET AT 4 HOLE DRILL |
| 104 | -] [- | 075, 077, 082 | TOT A FWD  : (4)-L/S TO CONFIRM IF THE DETECT HOLES 'A' FORWARD ARE REACHED |
| 104 | -]\[- | 026 | TOT A FWD  : (4)-L/S TO CONFIRM IF THE DETECT HOLES 'A' FORWARD ARE REACHED |
| 105 | -] [- | 079, 081, 082 | TOT B FWD  : (4)-L/S TO CONFIRM IF THE DETECT HOLES 'B' FORWARD IS REACHED |
| 105 | -]\[- | 026 | TOT B FWD  : (4)-L/S TO CONFIRM IF THE DETECT HOLES 'B' FORWARD IS REACHED |
| 106 | -] [- | 009, 026, 083 | TOOLS BACK : (8)-L/S TO CONFIRM THAT TOOL DETECT HOLES A & B ARE BACK |
| 106 | -]\[- | 026 | TOOLS BACK : (8)-L/S TO CONFIRM THAT TOOL DETECT HOLES A & B ARE BACK |
| 107 | -] [- | 064, 068, 069 | DRILL LIMIT: HALL SWITCHES WHEN DRILLS ARE IN FORWARD POSITION |
| 107 | -]\[- | 026 | DRILL LIMIT: HALL SWITCHES WHEN DRILLS ARE IN FORWARD POSITION |
| 108 | -] [- | 010, 026, 070 | DRILL BACK : HALL SWITCHES WHEN DRILLS ARE IN BACK POSITION |
| 108 | -]\[- | 010, 026, 070 | DRILL BACK : HALL SWITCHES WHEN DRILLS ARE IN BACK POSITION |
| 109 | -] [- | 052 | WI/NA SSW N: NARRO/WIDE SELECTOR SWITCH IN NARROW POSITION WHEN CLOSED |
| 109 | -]\[- | 053 | WI/NA SSW N: NARRO/WIDE SELECTOR SWITCH IN NARROW POSITION WHEN CLOSED |
| 110 | -] [- | 035, 038 | START CYCLE: CYCLE START BUTTON |
| 110 | -]\[- | 026 | START CYCLE: CYCLE START BUTTON |
| 201 | -] [- | 039 | CYCLE STOPP: CYCLE STOP BUTTON, WILL CYCLE TO TOP. |
| 201 | -]\[- | 026, 035, 038 | CYCLE STOPP: CYCLE STOP BUTTON, WILL CYCLE TO TOP. |

```
202 | -] [- | 020, 023, 032, 035, | AU/MA SSW=A: AUTO/MANUAL SEL.SW. CLOSED
    |      | 037, 041, 063, 066, | IN AUTO POSITION
    |      | 072, 074, 096       |
202 | -]\[- | 030, 031, 034      | AU/MA SSW=A: AUTO/MANUAL SEL.SW. CLOSED
    |      |                     | IN AUTO POSITION
203 | -] [- | 037                 | CONV  IN PB: CONVEYOR INCH PUSHBUTTON
203 | -]\[- | 014                 | CONV  IN PB: CONVEYOR INCH PUSHBUTTON
204 | -] [- | 005                 | ESTOP INTLK: EMERG STOP PUSHBUTTONS OR
    |      |                     | SAFETY INTERLOCKS
205 | -] [- | 012                 | DRILL MTRS : DRILL MOTORS ON-AUX
    |      |                     | CONTACT
205 | -]\[- | 071, 086            | DRILL MTRS : DRILL MOTORS ON-AUX
    |      |                     | CONTACT
206 | -] [- | 012, 034            | CONV  MTRS : CONV MOTOR ON-AUX CONTACT
206 | -]\[- | 092                 | CONV  MTRS : CONV MOTOR ON-AUX CONTACT
207 | -] [- | 034, 037            | INCH  MODE : PRESS SELECTOR SWITCH IN
    |      |                     | INCH MODE
208 | -] [- | 034                 | SSTRK MODE : THE PRESS SELECTOR SWITCH
    |      |                     | IN THE SINGLE STROKE POSITION
209 | -] [- | 013                 | CONT  MODE : PRESS SELECTOR SW IN THE
    |      |                     | CONTINUOUS MODE
209 | -]\[- | 087, 088            | CONT  MODE : PRESS SELECTOR SW IN THE
    |      |                     | CONTINUOUS MODE
210 | -] [- | 020, 095            | AIR   PRESS: THE AIR PRESSURE IS CLOSED
    |      |                     | IF ABOVE 71 PSI
210 | -]\[- | 022                 | AIR   PRESS: THE AIR PRESSURE IS CLOSED
    |      |                     | IF ABOVE 71 PSI
301 | -] [- | 005                 | SAFTY INT  : SAFETY INTERLOCKS
302 | -]\[- | 048, 096            | DRILL ONLY : THE SELECTOR SWITCH ON THE
    |      |                     | CONTROL PANEL. CLOSED IN ON POSITION
303 | -] [- | 013, 048            | PRESS MTRS : PRESS MOTOR STATUS (FWD OR
    |      |                     | REV)
303 | -]\[- | 087                 | PRESS MTRS : PRESS MOTOR STATUS (FWD OR
    |      |                     | REV)
304 | -] [- | 001, 003, 005, 021, | RESET P/B  : THIS INPUT IS FROM THE
    |      | 033, 056, 057, 058, | RESET PUSHBUTTON ON THE CONTROL PANEL
    |      | 059, 062, 063, 067, |
    |      | 068, 069, 070, 071, |
    |      | 076, 077, 080, 081, |
    |      | 082, 083            |
304 | -]\[- | 004, 015, 022, 027, | RESET P/B  : THIS INPUT IS FROM THE
    |      | 035, 037, 039, 040, | RESET PUSHBUTTON ON THE CONTROL PANEL
    |      | 041, 048, 051, 052, |
    |      | 053, 060, 061, 071, |
    |      | 084, 085, 086, 087, |
    |      | 092                 |
305 | -] [- | 005                 | SAFTY INT 2: SAFETY INTERLOCK 2
306 | -] [- | 013, 027, 048       | PR NO EMFLT: PRESS FAULT NON-EMERGENCY
306 | -]\[- | 087                 | PR NO EMFLT: PRESS FAULT NON-EMERGENCY
307 | -] [- | 087                 | PRESS EM SD:
307 | -]\[- | 013, 021, 027, 048  | PRESS EM SD:
308 | -] [- | 002, 016, 030, 031, | DWELL CAM  :
    |      | 040, 046, 052, 053, |
    |      | 063, 066, 072, 096, |
    |      | 114, 115            |
308 | -]\[- | 044, 047, 054       | DWELL CAM  :
011 | -] [- | 052, 056            | DTENT 1-5UP: OUTPUT SV1 TO SV4 NARROW
    |      |                     | BOARD DETENTS UP
011 | -]\[- | 016, 025, 058       | DTENT 1-5UP: OUTPUT SV1 TO SV4 NARROW
    |      |                     | BOARD DETENTS UP
011 | -( )- | 052                 | DTENT 1-5UP: OUTPUT SV1 TO SV4 NARROW
    |      |                     | BOARD DETENTS UP
012 | -] [- | 053, 056            | DTENT W12UP: WIDE BOARD DETENTS UP
012 | -]\[- | 016, 025, 058       | DTENT W12UP: WIDE BOARD DETENTS UP
012 | -( )- | 053                 | DTENT W12UP: WIDE BOARD DETENTS UP
013 | -] [- | 016, 025, 062       | DRILL MENBL: DRILL MOTOR ENABLE
013 | -( )- | 062                 | DRILL MENBL: DRILL MOTOR ENABLE
014 | -] [- | 016, 025, 033       | CONVE MENBL:
014 | -( )- | 033                 | CONVE MENBL:
015 | -] [- | 048, 096, 115       | DEMND PRESS: DEMAND PRESS CYCLE ENGAGE
    |      |                     | CR 62
015 | -]\[- | 016, 025            | DEMND PRESS: DEMAND PRESS CYCLE ENGAGE
    |      |                     | CR 62
```

| | | | |
|---|---|---|---|
| 015 | -( )- | 048 | DEMND PRESS: DEMAND PRESS CYCLE ENGAGE CR 62 |
| 016 | -] [- | 066, 067 | DRILL SVFWD: SOLENOID VALVE TO PUSH DRILLS FORWARD |
| 016 | -]\[- | 016, 025 | DRILL SVFWD: SOLENOID VALVE TO PUSH DRILLS FORWARD |
| 016 | -( )- | 066 | DRILL SVFWD: SOLENOID VALVE TO PUSH DRILLS FORWARD |
| 111 | -] [- | 030 | PRESS IN EN: PERMITS THE PRESS PUSHBTN TO OPERATE IN 'INCH' MODE VIA CR66 |
| 111 | -]\[- | 016, 032 | PRESS IN EN: PERMITS THE PRESS PUSHBTN TO OPERATE IN 'INCH' MODE VIA CR66 |
| 111 | -( )- | 030 | PRESS IN EN: PERMITS THE PRESS PUSHBTN TO OPERATE IN 'INCH' MODE VIA CR66 |
| 112 | -] [- | 031 | PRESS SI EN: PERMITS THE PRESS SINGLE STROKE PUSHBUTTON TO WORK VIA CR68 |
| 112 | -]\[- | 016, 032 | PRESS SI EN: PERMITS THE PRESS SINGLE STROKE PUSHBUTTON TO WORK VIA CR68 |
| 112 | -( )- | 031 | PRESS SI EN: PERMITS THE PRESS SINGLE STROKE PUSHBUTTON TO WORK VIA CR68 |
| 113 | -] [- | 032, 048 | PRESS CO EN: PRESS CONTIN. ENABLE VIA CR70 |
| 113 | -( )- | 032 | PRESS CO EN: PRESS CONTIN. ENABLE VIA CR70 |
| 114 | -] [- | 041, 048 | PRESS SETUP: |
| 114 | -]\[- | 114 | PRESS SETUP: |
| 114 | -( )- | 041 | PRESS SETUP: |
| 211 | -] [- | 085 | BOARD LGT 1: TURNS ON LIGHT WHEN THERE IS A FAULT ON THE BOARD, IE. A JAM |
| 211 | -]\[- | 017, 027, 086, 087, 092 | BOARD LGT 1: TURNS ON LIGHT WHEN THERE IS A FAULT ON THE BOARD, IE. A JAM |
| 211 | -( )- | 085 | BOARD LGT 1: TURNS ON LIGHT WHEN THERE IS A FAULT ON THE BOARD, IE. A JAM |
| 212 | -] [- | 086 | DRILL LGT 2: DRILL FAULT LIGHT |
| 212 | -]\[- | 017, 027, 085, 087, 092 | DRILL LGT 2: DRILL FAULT LIGHT |
| 212 | -( )- | 086 | DRILL LGT 2: DRILL FAULT LIGHT |
| 213 | -] [- | 087 | PRESS LGT 3: PRESS FAULT LIGHT |
| 213 | -]\[- | 017, 085, 086, 092 | PRESS LGT 3: PRESS FAULT LIGHT |
| 213 | -( )- | 087 | PRESS LGT 3: PRESS FAULT LIGHT |
| 214 | -] [- | 092 | CONV LGT 4: CONVEYOR FAULT LIGHT |
| 214 | -]\[- | 017, 027, 085, 086, 087 | CONV LGT 4: CONVEYOR FAULT LIGHT |
| 214 | -( )- | 092 | CONV LGT 4: CONVEYOR FAULT LIGHT |
| 215 | -]\[- | 027 | CYCLE LGT 5: CYCLE READY LIGHT |
| 215 | -( )- | 093 | CYCLE LGT 5: CYCLE READY LIGHT |
| 216 | -]\[- | 017, 027, 093 | RUN LGT 6: |
| 216 | -( )- | 094 | RUN LGT 6: |
| 311 | -] [- | 024, 037, 041, 052, 053, 063, 072, 074 | CLUTH ENGE : |
| 311 | -]\[- | 006, 018, 023, 028 | CLUTH ENGE : |
| 311 | -( )- | 037 | CLUTH ENGE : |
| 312 | -] [- | 074, 076 | TL A SV F : SV7 TO VERIFY PRESENCE OF HOLES 'A'. OFF WHEN HOLES OK |
| 312 | -]\[- | 018, 028 | TL A SV F : SV7 TO VERIFY PRESENCE OF HOLES 'A'. OFF WHEN HOLES OK |
| 312 | -( )- | 074 | TL A SV F : SV7 TO VERIFY PRESENCE OF HOLES 'A'. OFF WHEN HOLES OK |
| 313 | -] [- | 078, 080 | TL B SV F : SV8 : VERIFY PRESENCE OF HOLES 'B'. OFF WHEN HOLES OK |
| 313 | -]\[- | 018, 028 | TL B SV F : SV8 : VERIFY PRESENCE OF HOLES 'B'. OFF WHEN HOLES OK |
| 313 | -( )- | 078 | TL B SV F : SV8 : VERIFY PRESENCE OF HOLES 'B'. OFF WHEN HOLES OK |
| 314 | -] [- | 017, 028 | AIR OK LT: ENGAGE CLUTCH TO INDEX CONVEYOR |
| 314 | -( )- | 095 | AIR OK LT: ENGAGE CLUTCH TO INDEX CONVEYOR |
| 315 | -] [- | 018, 020, 021, 028, 048 | PRESS ESTOP: DE-ENERGIZE TO STOP PRESS IMMEDIATELY |
| 315 | -]\[- | 087 | PRESS ESTOP: DE-ENERGIZE TO STOP PRESS IMMEDIATELY |

| | | | |
|---|---|---|---|
| 315 | -( )- | 021 | PRESS ESTOP: DE-ENERGIZE TO STOP PRESS IMMEDIATELY |
| 316 | -] [- | 022, 087 | PRESS CSTOP: DE-ENERGIZE TO STOP PRESS AT TOP OF CYCLE |
| 316 | -]\[- | 018, 020, 028, 048 | PRESS CSTOP: DE-ENERGIZE TO STOP PRESS AT TOP OF CYCLE |
| 316 | -( )- | 022 | PRESS CSTOP: DE-ENERGIZE TO STOP PRESS AT TOP OF CYCLE |
| 702 | -] [- | 011 | CONV INTLK: NO CLUTCH AND NO O/LOAD |
| 702 | -( )- | 006 | CONV INTLK: NO CLUTCH AND NO O/LOAD |
| 703 | -] [- | 011 | BOARD INTLK: ENERGIZES IF BOARDS AREN'T JAMMED. |
| 703 | -( )- | 007 | BOARD INTLK: ENERGIZES IF BOARDS AREN'T JAMMED. |
| 704 | -] [- | 011 | DETNT INTLK: detents in proper position |
| 704 | -( )- | 008 | DETNT INTLK: detents in proper position |
| 705 | -] [- | 011 | TOOL INTLK: detect holes in proper position |
| 705 | -( )- | 009 | TOOL INTLK: detect holes in proper position |
| 706 | -] [- | 011 | DRILL INTLK: drills in proper position |
| 706 | -( )- | 010 | DRILL INTLK: drills in proper position |
| 707 | -] [- | 015 | EQUIP POSN : |
| 707 | -( )- | 011 | EQUIP POSN : |
| 708 | -] [- | 015 | EQUIP RNING: |
| 708 | -( )- | 012 | EQUIP RNING: |
| 709 | -] [- | 015 | CTL SW OK: |
| 709 | -( )- | 014 | CTL SW OK: |
| 710 | -] [- | 015 | PRESS OK : |
| 710 | -( )- | 013 | PRESS OK : |
| 713 | -] [- | 020 | INPUT OK : ALL INPUTS ARE IN CORRECT POSITION FOR CYCLE TO CONTINUE |
| 713 | -( )- | 015 | INPUT OK : ALL INPUTS ARE IN CORRECT POSITION FOR CYCLE TO CONTINUE |
| 714 | -] [- | 019 | OUT 1 INTLK: |
| 714 | -( )- | 016 | OUT 1 INTLK: |
| 715 | -] [- | 019 | OUT 2 INTLK: |
| 715 | -( )- | 017 | OUT 2 INTLK: |
| 716 | -] [- | 019 | OUT 3 INTLK: |
| 716 | -( )- | 018 | OUT 3 INTLK: |
| 717 | -] [- | 020 | OUTPT OK : ALL OUTPUTS FROM THE CONTROLLER ARE CORRECT FOR CYCLE TO CONTINUE |
| 717 | -( )- | 019 | OUTPT OK : ALL OUTPUTS FROM THE CONTROLLER ARE CORRECT FOR CYCLE TO CONTINUE |
| 718 | -] [- | 032, 035, 038, 093 | OK TO B CYC: THIS COIL WILL ENERGIZE IF ALL SYSTEM INTERLOCKS ARE SATISFACTORY |
| 718 | -( )- | 020 | OK TO B CYC: THIS COIL WILL ENERGIZE IF ALL SYSTEM INTERLOCKS ARE SATISFACTORY |
| 719 | -] [- | 038 | INST OPEN : INSTANT OPEN ON = CYCLE RUNNING OFF = CYCLE STOP |
| 719 | -]\[- | 022 | INST OPEN : INSTANT OPEN ON = CYCLE RUNNING OFF = CYCLE STOP |
| 719 | -( )- | 038 | INST OPEN : INSTANT OPEN ON = CYCLE RUNNING OFF = CYCLE STOP |
| 720 | -] [- | 005, 015, 021, 023, 027, 030, 031, 032, 033, 034, 035, 036, 037, 052, 053, 062, 066 | EMERG SYS : THIS COIL IS ENERGIZED UNTILL THE EMERGENCY P/B'S ARE PRESSED |
| 720 | -( )- | 005 | EMERG SYS : THIS COIL IS ENERGIZED UNTILL THE EMERGENCY P/B'S ARE PRESSED |
| 723 | -] [- | 022, 071, 086 | DRILL IM SD: DRILL IMMEDIATE SHUTDOWN CAUSED BY DRILLS-IN TIMED OUT |
| 723 | -]\[- | 020, 021, 035, 036, 066 | DRILL IM SD: DRILL IMMEDIATE SHUTDOWN CAUSED BY DRILLS-IN TIMED OUT |
| 723 | -( )- | 071 | DRILL IM SD: DRILL IMMEDIATE SHUTDOWN CAUSED BY DRILLS-IN TIMED OUT |
| 724 | -] [- | 022, 084 | TOOL CY-ER: THE DRILL IS IN AN ALARM MODE BUT PRESS CAN COMPLETE CYCLE |
| 724 | -]\[- | 020 | TOOL CY-ER: THE DRILL IS IN AN ALARM MODE BUT PRESS CAN COMPLETE CYCLE |

| | | | |
|---|---|---|---|
| 724 | -( )- | 084 | TOOL CY-ER: THE DRILL IS IN AN ALARM MODE BUT PRESS CAN COMPLETE CYCLE |
| 725 | -] [- | 022, 060, 092 | CONV IM SD: CONVEYOR ERROR REQUIRES IMMEDIATE SHUTDOWN |
| 725 | -]\[- | 020, 021, 035, 036 | CONV IM SD: CONVEYOR ERROR REQUIRES IMMEDIATE SHUTDOWN |
| 725 | -( )- | 060 | CONV IM SD: CONVEYOR ERROR REQUIRES IMMEDIATE SHUTDOWN |
| 726 | -] [- | 022, 061, 092 | DT TO SD CY: TIMER TIMES OUT IF DETENTS DOWN IS NOT REACHED. PERMITS CYCLE FIN |
| 726 | -( )- | 061 | DT TO SD CY: TIMER TIMES OUT IF DETENTS DOWN IS NOT REACHED. PERMITS CYCLE FIN |
| 727 | -] [- | 023, 035, 037, 048, 094 | PERMT RUN : THIS IS FINAL STEP BEFORE PRESS IS ASKED TO CYCLE |
| 727 | -( )- | 035 | PERMT RUN : THIS IS FINAL STEP BEFORE PRESS IS ASKED TO CYCLE |
| 730 | -] [- | 092 | CONV CY-ER: THE CONVEYOR IS IN ALARM BUT WILL STOP OPERATION AT TOP OF CYCLE |
| 730 | -]\[- | 020 | CONV CY-ER: THE CONVEYOR IS IN ALARM BUT WILL STOP OPERATION AT TOP OF CYCLE |
| 731 | -] [- | 029 | MAN OK-1 : |
| 731 | -( )- | 025 | MAN OK-1 : |
| 732 | -] [- | 029 | MAN OK-2 : |
| 732 | -( )- | 026 | MAN OK-2 : |
| 733 | -] [- | 027, 029 | MAN OK-3 : |
| 733 | -( )- | 027 | MAN OK-3 : |
| 734 | -] [- | 029 | MAN OK-4 : |
| 734 | -( )- | 028 | MAN OK-4 : |
| 735 | -] [- | 030, 031 | MANUL OK : |
| 735 | -( )- | 029 | MANUL OK : |
| 736 | -] [- | 036, 037 | CONV MANUL: |
| 736 | -( )- | 034 | CONV MANUL: |
| 737 | -] [- | 073, 075 | HOLD A FWD: |
| 737 | -]\[- | 074 | HOLD A FWD: |
| 737 | -( )- | 075 | HOLD A FWD: |
| 738 | -] [- | 079 | HOLD B FWD: |
| 738 | -]\[- | 078 | HOLD B FWD: |
| 738 | -( )- | 079 | HOLD B FWD: |
| 741 | -] [- | 022, 039, 040 | STOP PB HD: HOLD TO STOP CONV AT NEXT CYCLE (DWELL) |
| 741 | -( )- | 039 | STOP PB HD: HOLD TO STOP CONV AT NEXT CYCLE (DWELL) |
| 742 | -] [- | 040 | SD CY @ 308: STOP CONVEYOR AT NEXT DWELL (BEGINING OF NEXT CYCLE). |
| 742 | -]\[- | 037 | SD CY @ 308: STOP CONVEYOR AT NEXT DWELL (BEGINING OF NEXT CYCLE). |
| 742 | -( )- | 040 | SD CY @ 308: STOP CONVEYOR AT NEXT DWELL (BEGINING OF NEXT CYCLE). |
| 744 | -] [- | 037 | DWELL ORIDE: |
| 744 | -]\[- | 041, 063, 072 | DWELL ORIDE: |
| 744 | -( L )- | 001 | DWELL ORIDE: |
| 744 | -( U )- | 002 | DWELL ORIDE: |
| 745 | -] [- | 041 | LEVNG DWELL: |
| 745 | -]\[- | 052, 053, 064, 066, 075, 079 | LEVNG DWELL: |
| 745 | -( )- | 046 | LEVNG DWELL: |
| 746 | -] [- | 048, 054 | DMAND CAM : |
| 746 | -( )- | 047 | DMAND CAM : |
| 747 | -] [- | 051 | JAM SET : |
| 747 | -]\[- | 021, 052, 053 | JAM SET : |
| 747 | -( )- | 051 | JAM SET : |
| 748 | -] [- | 064, 065 | DRILL HOLD : |
| 748 | -]\[- | 066 | DRILL HOLD : |
| 748 | -( )- | 064 | DRILL HOLD : |
| 749 | -] [- | 037 | INTL IM SD: |
| 749 | -( )- | 036 | INTL IM SD: |
| 750 | -] [- | 097, 098, 099, 100 | MEAS DELTA: |
| 750 | -( )- | 096 | MEAS DELTA: |
| 751 | -] [- | 037 | CLUTH SD TM: |
| 751 | -]\[- | 037 | CLUTH SD TM: |
| 751 | -( )- | 113 | CLUTH SD TM: |
| 752 | -] [- | 054, 055 | SETUP DETEN: |
| 752 | -( )- | 054 | SETUP DETEN: |

```
753 |  -] [-  | 016, 052          | HOLD   DETEN:
753 |  -( )-  | 055               | HOLD   DETEN:
754 |  -]\[-  | 041               | PRESS WAIT :
754 |  -( )-  | 114               | PRESS WAIT :
755 |  -] [-  | 022               | PSTOP AT CY:
755 |  -( )-  | 115               | PSTOP AT CY:
902 |  -] [-  | 021, 105, 106, 107,| SEAL  1/2 C:
        |         | 108, 113          |
902 | -(CTU)- | 049               | SEAL  1/2 C:
902 | -(RST)- | 050               | SEAL  1/2 C:
903 |  -] [-  | 071               | DRILL FD TR: IF DRILLS FORWARD LIMIT
        |         |                   | SWITCH NOT REACHED ,TIMER ALARMS
903 | -(RTO)- | 067               | DRILL FD TR: IF DRILLS FORWARD LIMIT
        |         |                   | SWITCH NOT REACHED ,TIMER ALARMS
903 | -(RST)- | 068               | DRILL FD TR: IF DRILLS FORWARD LIMIT
        |         |                   | SWITCH NOT REACHED ,TIMER ALARMS
904 |  -] [-  | 060               | DETNT TM UP: STARTS TIMING.  IF TIMES
        |         |                   | OUT BEFORE DETENTS UP THEN ALARMS
904 | -(RTO)- | 056               | DETNT TM UP: STARTS TIMING.  IF TIMES
        |         |                   | OUT BEFORE DETENTS UP THEN ALARMS
904 | -(RST)- | 057               | DETNT TM UP: STARTS TIMING.  IF TIMES
        |         |                   | OUT BEFORE DETENTS UP THEN ALARMS
906 |  -] [-  | 058, 061          | SV DT DE-EN: S/D AFTER TIMED OUT ENERGI
        |         |                   | ZES 726
906 | -(RTO)- | 058               | SV DT DE-EN: S/D AFTER TIMED OUT ENERGI
        |         |                   | ZES 726
906 | -(RST)- | 059               | SV DT DE-EN: S/D AFTER TIMED OUT ENERGI
        |         |                   | ZES 726
907 |  -] [-  | 084               | TOL A FD TO: TIMER TIMES OUT IF TOOL DE
        |         |                   | TECT A DOES NOT GO FORWARD IN SPEC TIME
907 | -(RTO)- | 076               | TOL A FD TO: TIMER TIMES OUT IF TOOL DE
        |         |                   | TECT A DOES NOT GO FORWARD IN SPEC TIME
907 | -(RST)- | 077               | TOL A FD TO: TIMER TIMES OUT IF TOOL DE
        |         |                   | TECT A DOES NOT GO FORWARD IN SPEC TIME
908 |  -] [-  | 084               | TOL B FD TO: TIMER TIMES OUT IF TOOL DE
        |         |                   | TECT B DOES NOT GO FORWARD IN SPEC TIME
908 | -(RTO)- | 080               | TOL B FD TO: TIMER TIMES OUT IF TOOL DE
        |         |                   | TECT B DOES NOT GO FORWARD IN SPEC TIME
908 | -(RST)- | 081               | TOL B FD TO: TIMER TIMES OUT IF TOOL DE
        |         |                   | TECT B DOES NOT GO FORWARD IN SPEC TIME
909 |  -] [-  | 071, 082, 084     | TOOL  DT TO: THE TIMER TIMES OUT IF THE
        |         |                   | DRILLS DO NOT GO FORWARD IN A SPEC TIME
909 | -(RTO)- | 082               | TOOL  DT TO: THE TIMER TIMES OUT IF THE
        |         |                   | DRILLS DO NOT GO FORWARD IN A SPEC TIME
909 | -(RST)- | 083               | TOOL  DT TO: THE TIMER TIMES OUT IF THE
        |         |                   | DRILLS DO NOT GO FORWARD IN A SPEC TIME
910 |  -] [-  | 069, 071          | DRILL SV TR: ACTIVATES TIMER WHEN DRILL
        |         |                   | IN LIMIT SWITCH HAS BEEN TRIPPED
910 | -(RTO)- | 069               | DRILL SV TR: ACTIVATES TIMER WHEN DRILL
        |         |                   | IN LIMIT SWITCH HAS BEEN TRIPPED
910 | -(RST)- | 070               | DRILL SV TR: ACTIVATES TIMER WHEN DRILL
        |         |                   | IN LIMIT SWITCH HAS BEEN TRIPPED
912 |  -]\[-  | 096               | TOP P COUNT: STARTS COUNTING FROM TOP
        |         |                   | OF PRESS.  AT 10 (90 DEG) IT CONDUCTS
912 | -(CTU)- | 042               | TOP P COUNT: STARTS COUNTING FROM TOP
        |         |                   | OF PRESS.  AT 10 (90 DEG) IT CONDUCTS
912 | -(RST)- | 043               | TOP P COUNT: STARTS COUNTING FROM TOP
        |         |                   | OF PRESS.  AT 10 (90 DEG) IT CONDUCTS
913 |  -] [-  | 097, 105, 113     | .1 M SEC  : IF CTR TAKES > .1 SEC TO
        |         |                   | RESET TIMER, TMR COND & DISEN CL .2 SEC
913 | -(RTO)- | 097               | .1 M SEC  : IF CTR TAKES > .1 SEC TO
        |         |                   | RESET TIMER, TMR COND & DISEN CL .2 SEC
913 | -(RST)- | 101               | .1 M SEC  : IF CTR TAKES > .1 SEC TO
        |         |                   | RESET TIMER, TMR COND & DISEN CL .2 SEC
914 |  -] [-  | 098, 101, 106, 113| .2 M SEC  : RESETS TIMER 913 AFTER .2
        |         |                   | SECONDS
914 |  -]\[-  | 097               | .2 M SEC  : RESETS TIMER 913 AFTER .2
        |         |                   | SECONDS
914 | -(RTO)- | 098               | .2 M SEC  : RESETS TIMER 913 AFTER .2
        |         |                   | SECONDS
914 | -(RST)- | 102               | .2 M SEC  : RESETS TIMER 913 AFTER .2
        |         |                   | SECONDS
```

```
915 |  -] [-   | 099, 102, 107, 113 | .3 M  SEC  : RESETS COUNTER IF CLUTCH
    |          |                    | WAS NOT RELEASED 2ND TIME IN A ROW
915 |  -]\[-   | 097, 098           | .3 M  SEC  : RESETS COUNTER IF CLUTCH
    |          |                    | WAS NOT RELEASED 2ND TIME IN A ROW
915 |  -(RTO)- | 099                | .3 M  SEC  : RESETS COUNTER IF CLUTCH
    |          |                    | WAS NOT RELEASED 2ND TIME IN A ROW
915 |  -(RST)- | 103                | .3 M  SEC  : RESETS COUNTER IF CLUTCH
    |          |                    | WAS NOT RELEASED 2ND TIME IN A ROW
916 |  -] [-   | 066                | DRILL FWD T: AFTER SYSTEM STARTS, TIME
    |          |                    | DELAY THEN SIGNAL FOR DRILL FORWARD.
916 |  -(RTO)- | 063                | DRILL FWD T: AFTER SYSTEM STARTS, TIME
    |          |                    | DELAY THEN SIGNAL FOR DRILL FORWARD.
916 |  -(RST)- | 065                | DRILL FWD T: AFTER SYSTEM STARTS, TIME
    |          |                    | DELAY THEN SIGNAL FOR DRILL FORWARD.
917 |  -] [-   | 100, 103, 108, 113 | .4 M  SEC  :
917 |  -]\[-   | 097, 098, 099      | .4 M  SEC  :
917 |  -(RTO)- | 100                | .4 M  SEC  :
917 |  -(RST)- | 104                | .4 M  SEC  :
918 |  -]\[-   | 113                | CLTCH .2SEC:
918 |  -(RTO)- | 105                | CLTCH .2SEC:
918 |  -(RST)- | 109                | CLTCH .2SEC:
919 |  -]\[-   | 113                | CLTCH .3SEC:
919 |  -(RTO)- | 106                | CLTCH .3SEC:
919 |  -(RST)- | 110                | CLTCH .3SEC:
920 |  -] [-   | 074, 078           | TL A  INIT : AFTER SYSTEM STARTS WAITS
    |          |                    | SPEC TIME AND INITIATES TOOL DET A FWD
920 |  -(RTO)- | 072                | TL A  INIT : AFTER SYSTEM STARTS WAITS
    |          |                    | SPEC TIME AND INITIATES TOOL DET A FWD
920 |  -(RST)- | 073                | TL A  INIT : AFTER SYSTEM STARTS WAITS
    |          |                    | SPEC TIME AND INITIATES TOOL DET A FWD
921 |  -] [-   | 022                | CONV   OF TM:
921 |  -(RTO)- | 023                | CONV   OF TM:
921 |  -(RST)- | 024                | CONV   OF TM:
922 |  -]\[-   | 113                | CLTCH .4SEC:
922 |  -(RTO)- | 107                | CLTCH .4SEC:
922 |  -(RST)- | 111                | CLTCH .4SEC:
923 |  -]\[-   | 113                | CLTCH .5SEC:
923 |  -(RTO)- | 108                | CLTCH .5SEC:
923 |  -(RST)- | 112                | CLTCH .5SEC:
924 |  -] [-   | 089                | FLSH   OFF  :
924 |  -]\[-   | 087                | FLSH   OFF  :
924 |  -(RTO)- | 088                | FLSH   OFF  :
924 |  -(RST)- | 090                | FLSH   OFF  :
925 |  -] [-   | 090, 091           | FLSH   ON   :
925 |  -(RTO)- | 089                | FLSH   ON   :
925 |  -(RST)- | 091                | FLSH   ON   :
927 |  -]\[-   | 021                | PRESS FAST :
927 |  -(CTU)- | 044                | PRESS FAST :
927 |  -(RST)- | 045                | PRESS FAST :
928 |  -] [-   | 085, 086, 087, 092 | ST UP LI EN: AT STARTUP (RESET PRESSED)
    |          |                    | ENABLE ALL ERROR LIGHTS FOR .5 SEC
928 |  -]\[-   | 004                | ST UP LI EN: AT STARTUP (RESET PRESSED)
    |          |                    | ENABLE ALL ERROR LIGHTS FOR .5 SEC
928 |  -(RTF)- | 003                | ST UP LI EN: AT STARTUP (RESET PRESSED)
    |          |                    | ENABLE ALL ERROR LIGHTS FOR .5 SEC
928 |  -(RST)- | 004                | ST UP LI EN: AT STARTUP (RESET PRESSED)
    |          |                    | ENABLE ALL ERROR LIGHTS FOR .5 SEC
```

I claim:

1. A method of forming holes in a board made predominately of wood, wood byproducts, or like material, the board having two expansive faces, two transverse edges, and two opposite ends and being provided optionally with a polymeric veneer on one or both of the expansive faces, the method comprising automated steps of
   (a) conveying the board into a punching zone, in a forward direction with the transverse edges constituting a leading edge and a trailing edge respectively,
   (b) punching one or more holes through the board in the punching zone, through its expansive faces, so that each punched hole extends in a direction perpendicular to the expansive faces of the board,
   (c) conveying the board from the punching zone into a drilling zone, and
   (d) drilling at least one hole into the board in the drilling zone, into at least one of the opposite ends of the board, so that each drilled hole extends in a direction parallel to the expansive faces of the board.

2. The method of claim 1 wherein each punched hole is punched by a punch defining an axis and a die coacting with the punch, wherein the punch and die used to punch each punched hole are mounted operatively in a press, between a pressing ram and a pressing bed, so that relative movement of the pressing ram and the pressing bed toward each other causes each punch to be axially pressed toward the die coacting with such punch, and wherein step (b) is effected by relative movement of the pressing ram and the pressing bed toward each other.

3. The method of claim 1 further comprising an automated step between step (a) and step (b) of registering the board in a predetermined position in the punching zone.

4. The method of claim 3 wherein the board is registered in a longitudinal sense and in a transverse sense.

5. The method of claim 4 wherein the board is registered by engaging its transverse edges and its opposite ends.

6. The method of claim 1 further comprising automated steps of
   (e) conveying the board from the drilling zone into an inspecting zone and
   (f) conducting a physical measurement of each drilled hole, in the inspecting zone, so as to determine whether such drilled hole has been drilled to a minimum depth.

7. The method of claim 6 wherein step (f) includes inserting a probe into each drilled hole.

8. A method of forming holes in a board made predominately of wood, wood byproducts, or like material, the board having two expansive faces, two transverse edges, and two opposite ends and being provided with a polymeric veneer on each of the expansive faces, the method comprising automated steps of
   (a) conveying the board into a punching zone, in a forward direction with the transverse edges constituting a leading edge and a trailing edge respectively, so that the expansive faces of the board are disposed horizontally,
   (b) registering the board in a longitudinal sense and in a transverse sense, in a predetermined position in the punching zone, by engaging its transverse edges and its opposite ends,
   (c) punching two linear arrays of holes simultaneously through the board in the punching zone, through its expansive faces, so that each punching hole extends in a direction perpendicular to the expansive faces of the board, and so that the linear arrays are parallel to each other and to the transverse edges of the board,
   (d) conveying the board from the punching zone into a drilling zone, in the forward direction, and
   (e) drilling at least two holes simultaneously into the board in the drilling zone, into each of the opposite ends of the board, so that each drilled hole extends in a direction parallel to the expansive faces of the board, wherein each punched hole is punched by a punch defining an axis and a die coacting with the punch, wherein the punches and dies used to punch the punched holes are mounted operatively in a press, between a pressing ram and a pressing bed, so that relative movement of the pressing ram and the pressing bed toward each other causes each punch to be axially pressed toward the die coacting with such punch, and wherein step (c) is effected by relative movement of the pressing ram and the pressing bed toward each other.

9. The method of claim 8 further comprising automated steps of
   (f) conveying the board from the drilling zone into an inspecting zone, in the forward direction, and
   (g) conducting a physical measurement of each drilled hole, in the inspecting zone by means comprising a probe insertable into such drilled hole, so as to determine whether such drilled hole has been drilled to a minimum depth.

10. Apparatus for forming holes in a board made predominately of wood, wood byproducts, or like material, the board having two expansive faces, two transverse edges, and two opposite ends and being provided optionally with a polymeric veneer on one or both of the expansive faces, the apparatus comprising
    (a) means for conveying the board into a punching zone, in a forward direction with the transverse edges constituting a leading edge and a trailing edge respectively, and for conveying the board from the punching zone into a drilling zone,
    (b) means for punching at least one hole through the board in the punching zone, through its expansive faces, so that each punched hole extends in a direction perpendicular to the expansive faces of the board, and
    (c) means for drilling at least one hole into the board in the drilling zone, into at least one of the opposite ends of the board, so that each drilled hole extends in a direction parallel to the expansive faces of the board,
wherein the conveying means is arranged to convey the board into the punching zone, in the forward direction with its leading edge leading its trailing edge, and to convey the board from the punching zone into the drilling zone after each punched hole has been punched through the board.

11. The apparatus of claim 10 combined with a press comprising a pressing ram and a pressing bed, as arranged for relative movement of the pressing ram and the pressing bed toward each other, wherein the punching means comprises, for each punched hole, a punch defining an axis and a die coacting with the punch, and wherein the punch and die used to punch each punched hole are mounted operatively in the press, between the pressing ram and the pressing bed, so that relative movement of the pressing ram and the pressing bed toward each other causes each punch to be axially pressed toward the die coacting with such punch, whereby each punched hole is punched through the board upon relative movement of the pressing ram and the pressing bed toward each other.

12. The apparatus of claim 10 further comprising means for registering the board in the punching zone.

13. The apparatus of claim 12 wherein the registering means comprises means for registering the board in a longitudinal sense and means for registering the board in a transverse sense.

14. The apparatus of claim 10 wherein the conveying means is arranged to convey the board into the hole-punching zone, in a forward direction with its leading edge leading its trailing edge, and to convey the board from the punching zone, in the forward direction, after each punched hole has been punched through the board, wherein the conveying means comprises a conveyor arranged to be selectively driven and to be selectively stopped and means carried by the conveyor and arranged to engage the board at its trailing edge so as to convey the board in the forward direction, and wherein the means for registering the board in a longitudinal sense comprises means for bearing against the leading edge of the board, when the conveyor has stopped, so as to urge the trailing edge of the board backwardly.

15. The apparatus of claim 14 wherein the means for bearing against the leading edge of the board comprises a detent movable between an operative position in which the detent bears against the leading edge of the board so as to urge the trailing edge of the board backwardly and an inoperative position in which the detent is displaced so as not to interfere with the board when the board is conveyed from the punching zone.

16. The apparatus of claim 14 wherein the conveyor comprises a pair of flexible elements arranged to be selectively driven in endless loops and to be selectively stopped, wherein the means carried by the conveyor comprises a pair of board-engaging blocks, each block being carried by one of the pair of flexible elements and being arranged to engage the board at its trailing edge so as to convey the board in the forward direction when the pair of flexible elements are driven, and wherein the means for bearing against the leading edge of the board comprises a pair of detents, each detent being movable between an operative position in which such detent bears against the leading edge of the board so as to urge the trailing edge of the board backwardly and an inoperative position in which such detent is displaced so as not to interfere with the board when the board is conveyed from the punching zone.

17. The apparatus of claim 10 wherein the conveying means is arranged to convey the board from the drilling zone into an inspecting zone, in the forward direction after each drilled hole has been drilled into the board, and further comprising
   (d) means for conducting a physical measurement of each drilled hole, in the inspecting zone, so as to determine whether such drilled hole has been drilled to a minimum depth.

18. The apparatus of claim 17 wherein the means for conducting a physical measurement of each drilled hole includes a probe insertable into each drilled hole.

19. Apparatus for forming holes in a board made predominately of wood, wood byproducts, or like material by a series of automated operations, the board having two expansive faces, two transverse edges, and two opposite ends and being provided with a polymeric veneer on each of the expansive faces, the apparatus comprising
   (a) means for conveying the board at successive intervals into a punching zone, from the punching zone into a drilling zone, and from the drilling zone into an inspecting zone, in a forward direction with the transverse edges constituting a leading edge and a trailing edge respectively, so that the expansive faces of the board are disposed horizontally,
   (b) means for registering the board in a longitudinal sense and in a transverse sense, in a predetermined position in the punching zone, by engaging its transverse edges and its opposite ends,
   (c) means for punching two linear arrays of holes simultaneously through the board in the punching zone, through its expansive faces, so that each punched hole extends in a direction perpendicular to the expansive faces of the board, and so that the linear arrays are parallel to each other and to the transverse edges of the board, and
   (d) means for drilling at least two holes simultaneously into the board in the drilling zone, into each of its opposite ends, so that each drilled hole extends in a direction parallel to the expansive faces of the board,
wherein the apparatus is combined with a press comprising a pressing ram and a pressing bed, as arranged for relative movement of the pressing ram and the pressing bed toward each other, wherein the punching means comprises, for each punched hole, a punch defining an axis and a die coacting with the punch, and wherein the punch and die used to punch each punched hole are mounted operatively in the press, between the pressing ram and the pressing bed, so that relative movement of the pressing ram and the pressing bed toward each other causes each punch to be axially pressed toward the die coacting with such punch, whereby each punched hole is punched through the board upon relative movement of the pressing ram and the pressing bed toward each other.

20. The apparatus of claim 19 comprising
   (e) means comprising a probe insertable into each drilled hole for conducting a physical measurement of each drilled hole, in the inspecting zone, so as to determine whether such drilled hole has been drilled to a minimum depth.

21. The apparatus of claim 19 wherein the punching means comprises means for mounting the punches selectively in a selected two of three linear rows, so that spacing between the linear rows of holes punched by the punches and the dies coacting with the punches can be correspondingly varied, whereby the apparatus can be selectively arranged to handle boards of different widths between their transverse edges, namely a relatively wide board and a relatively narrow board.

22. The apparatus of claim 19 wherein the conveying means comprises a conveyor arranged to be selectively driven and to be selectively stopped and means carried by the conveyor and arranged to engage the board at its trailing edge so as to convey the board in the forward direction, and wherein the means for registering the board in a longitudinal sense comprises means for bearing against the leading edge of the board, when the conveyor has stopped, so as to urge the trailing edge of the board backwardly.

23. The apparatus of claim 22 wherein the means for bearing against the leading edge of the board comprises a detent the detent being movable between an operative position in which the detent bears against the leading edge of the board so as to urge the trailing edge of the board backwardly and an inoperative position in which the detent is displaced so as not to interfere with the board when the board is conveyed from the punching zone.

24. The apparatus of claim 22 wherein the conveyor comprises a pair of flexible elements arranged to be selectively driven in endless loops and to be selectively stopped, wherein the means carried by the conveyor comprises a pair of board-engaging blocks, each block being carried by one of the pair of flexible elements and being arranged to engage the board at its trailing edge so as to convey the board in the forward direction when the pair of flexible elements are driven, and wherein the means for bearing against the leading edge of the board comprises a pair of detents, each detent being movable between an operative position in which such cam bears against the leading edge of the board so as to urge the trailing edge of the board backwardly and an inoperative position in which such detent is displaced so as not to interfere with the board when the board is conveyed from the punching zone.

25. The apparatus of claim 19 wherein the means for registering the board in a longitudinal sense comprises a pair of board-engaging arms mounted rigidly to the pressing ram and adapted to engage the trailing edge of the board upon relative movement of the pressing ram and the pressing bed toward each other and a pair of board-engaging arms mounted pivotally to the pressing ram, adapted to engage the leading edge of the board upon relative movement of the pressing ram and the pressing bed toward each other, and biased so as to urge the trailing edge of the board against the pair of board-engaging arms mounted rigidly to the board.

26. The apparatus of claim 21 wherein the conveyor comprises a pair of flexible elements arranged to be selectively driven in endless loops and to be selectively stopped, wherein the means carried by the conveyor comprises a pair of board-engaging blocks, each block being carried by one of the pair of flexible elements and being arranged to engage the board at its trailing edge so as to convey the board in the forward direction when the pair of flexible elements are driven whether the board is a relatively wide board or a relatively narrow board, wherein the means for registering the board in a longitudinal sense comprises a pair of board-engaging arms used whether the board is a relatively wide board or a relatively narrow board and mounted rigidly to the pressing ram and a pair of board-engaging arms used when the board is a relatively wide board and mounted pivotally to the pressing ram, the rigidly mounted arms being adapted to engage the trailing edge of the board upon relative movement of the pressing ram and the pressing bed toward each other whether the board is a relatively wide board or a relatively narrow board, the pivotally mounted arms being adapted to engage the leading edge of the board upon relative movement of the pressing ram and the pressing bed toward each other and being biased so as to urge the leading edge of the board against the rigidly mounted arms when the board is a relatively wide board, and wherein the means for registering the board in a longitudinal sense further comprises a pair of detents used when the board is a relatively narrow board, each detent being movable between an operative position in which such detent bears against the leading edge of the board so as to urge the trailing edge of the board against the rigidly mounted arms upon relative movement of the pressing ram and the pressing bed toward each other when the board is a relatively narrow board and an inoperative position in which such cam is displaced so as not to interfere with the board when the board is conveyed from the punching zone whether the board is a relatively wide board or a relatively narrow board.

* * * * *